United States Patent
Narayanan et al.

(10) Patent No.: US 12,147,579 B2
(45) Date of Patent: Nov. 19, 2024

(54) SECURE PLATFORM FOR THE DISSEMINATION OF DATA

(71) Applicant: Schlumberger Technology Corporation, Sugar Land, TX (US)

(72) Inventors: Alagappan Narayanan, Katy, TX (US); Priya Soni, Houston, TX (US); Julian Anigbogu, Missouri City, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 235 days.

(21) Appl. No.: 17/998,052

(22) PCT Filed: May 7, 2021

(86) PCT No.: PCT/US2021/031348
§ 371 (c)(1),
(2) Date: Nov. 7, 2022

(87) PCT Pub. No.: WO2021/226494
PCT Pub. Date: Nov. 11, 2021

(65) Prior Publication Data
US 2023/0229810 A1    Jul. 20, 2023

Related U.S. Application Data

(60) Provisional application No. 62/704,381, filed on May 7, 2020, provisional application No. 62/704,383, filed (Continued)

(51) Int. Cl.
*H04L 9/40*    (2022.01)
*G01V 1/40*    (2006.01)
(Continued)

(52) U.S. Cl.
CPC ........... *G06F 21/6272* (2013.01); *G01V 1/50* (2013.01); *G06F 21/604* (2013.01);
(Continued)

(58) Field of Classification Search
CPC .............. G06F 21/6272; G06F 21/604; G06F 2221/2141; G01V 1/50; G01V 1/40;
(Continued)

(56) References Cited

U.S. PATENT DOCUMENTS 6,519,568 B1 * 2/2003 Harvey ................ G06Q 20/203
702/14
10,642,856 B1 * 5/2020 Chu ..................... G06F 16/2456
(Continued)

FOREIGN PATENT DOCUMENTS

CN    109063436 A    12/2018
EP    3369233 A1    9/2018
(Continued)

OTHER PUBLICATIONS

Office Action issued in U.S. Appl. No. 17/998,047 dated Jul. 22, 2024, 41 pages.
(Continued)

*Primary Examiner* — Joseph P Hirl
*Assistant Examiner* — Aayush Aryal
(74) *Attorney, Agent, or Firm* — Jeffrey D. Frantz

(57) ABSTRACT

A method including receiving, at a data distribution platform, a selection of a data package comprising a high fidelity data package. The method also includes filtering, automatically by a filtering application of the data distribution platform, the high fidelity data package to form a marketing data package. Filtering includes removing sufficient data from the high fidelity data package such that the marketing
(Continued)

data package is a marketing data package. The method also includes publishing the marketing data package within the data distribution platform.

20 Claims, 30 Drawing Sheets

Related U.S. Application Data on May 7, 2020, provisional application No. 62/704,382, filed on May 7, 2020.

(51) Int. Cl.
| | |
|---|---|
| *G01V 1/50* | (2006.01) |
| *G06F 21/60* | (2013.01) |
| *G06F 21/62* | (2013.01) |
| *G06Q 30/0201* | (2023.01) |
| *G06Q 30/0601* | (2023.01) |
| *G06Q 50/02* | (2012.01) |

(52) U.S. Cl.
CPC ..... *G06Q 30/0201* (2013.01); *G06Q 30/0206* (2013.01); *G06Q 30/0623* (2013.01); *G06F 2221/2141* (2013.01); *G06Q 50/02* (2013.01)

(58) Field of Classification Search
CPC ........... G06Q 30/0206; G06Q 30/0241; G06Q 30/0643; E21B 41/00; H04L 63/101
See application file for complete search history.

(56) References Cited

U.S. PATENT DOCUMENTS

| | | | |
|---|---|---|---|
| 2004/0054717 A1 | 3/2004 | Aubry | |
| 2012/0054270 A1* | 3/2012 | Foreman | G06Q 10/10 709/203 |
| 2012/0204142 A1 | 8/2012 | Rubenstein | |
| 2017/0091478 A1* | 3/2017 | Tiller | G06F 16/29 |
| 2019/0195050 A1 | 6/2019 | Revheim | |
| 2020/0125225 A1* | 4/2020 | Bettles | G06Q 10/06393 |
| 2023/0169529 A1 | 6/2023 | Mukhitov | |

FOREIGN PATENT DOCUMENTS

| | | |
|---|---|---|
| KR | 100982781 B1 | 9/2010 |
| KR | 1020110034743 A | 4/2011 |
| KR | 1020110068545 A | 6/2011 |
| WO | 2017004104 A1 | 1/2017 |
| WO | 2019040712 A1 | 2/2019 |
| WO | 2021226474 A1 | 11/2021 |
| WO | 2021226490 A1 | 11/2021 |

OTHER PUBLICATIONS

International Search Report and Written Opinion issued in PCT Application PCT/US2021/031322, dated Aug. 30, 2021 (13 pages).
International Search Report and Written Opinion issued in PCT Application PCT/US2021/031341, dated Sep. 1, 2021 (13 pages).
International Search Report and Written Opinion issued in PCT Application PCT/US2021/031348, dated Aug. 5, 2021 (13 pages).
International Preliminary Report on Patentability issued in PCT Application PCT/US2021/031322 dated Nov. 17, 2022, 9 pages.
International Preliminary Report on Patentability issued in PCT Application PCT/US2021/031341 dated Nov. 17, 2022, 9 pages.
International Preliminary Report on Patentability issued in PCT Application PCT/US2021/031348 dated Nov. 17, 2022, 9 pages.
Extended Search Report issued in European Patent Application No. 21800146.9 dated Nov. 17, 2023, 9 pages.
Extended Search Report issued in European Patent Application No. 21800441.4 dated Nov. 27, 2023, 11 pages.
Extended Search Report issued in European Patent Application No. 21800531.2 dated Nov. 27, 2023, 8 pages.
Office Action issued in U.S. Appl. No. 17/998,047 dated Sep. 4, 2024, 20 pages.

* cited by examiner

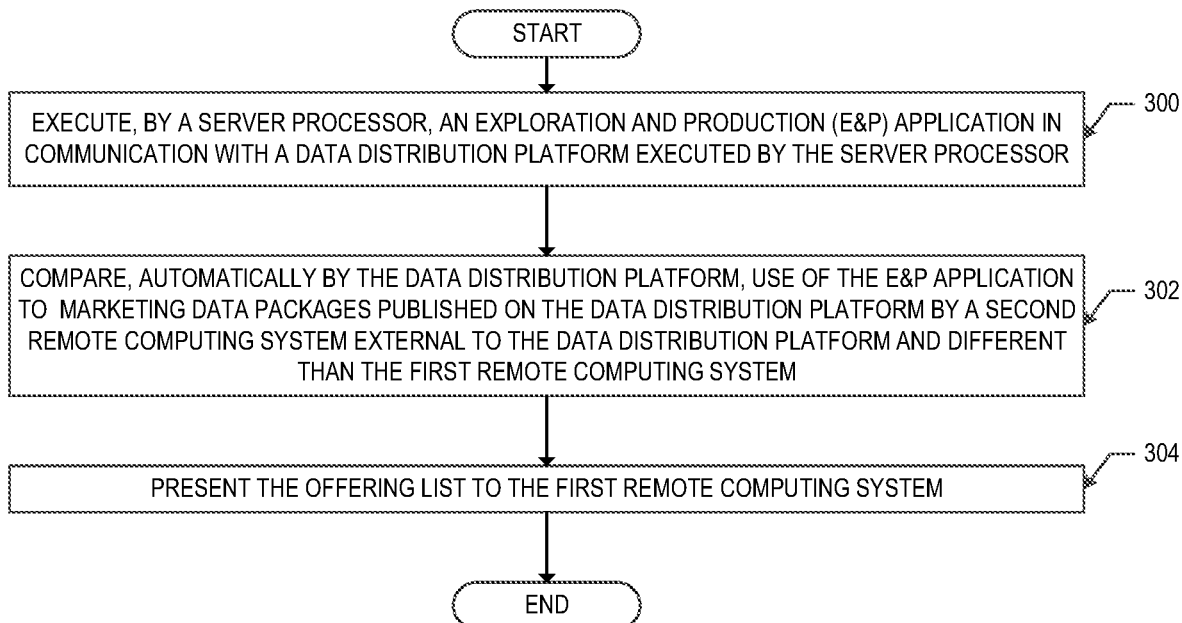
FIG. 3.1
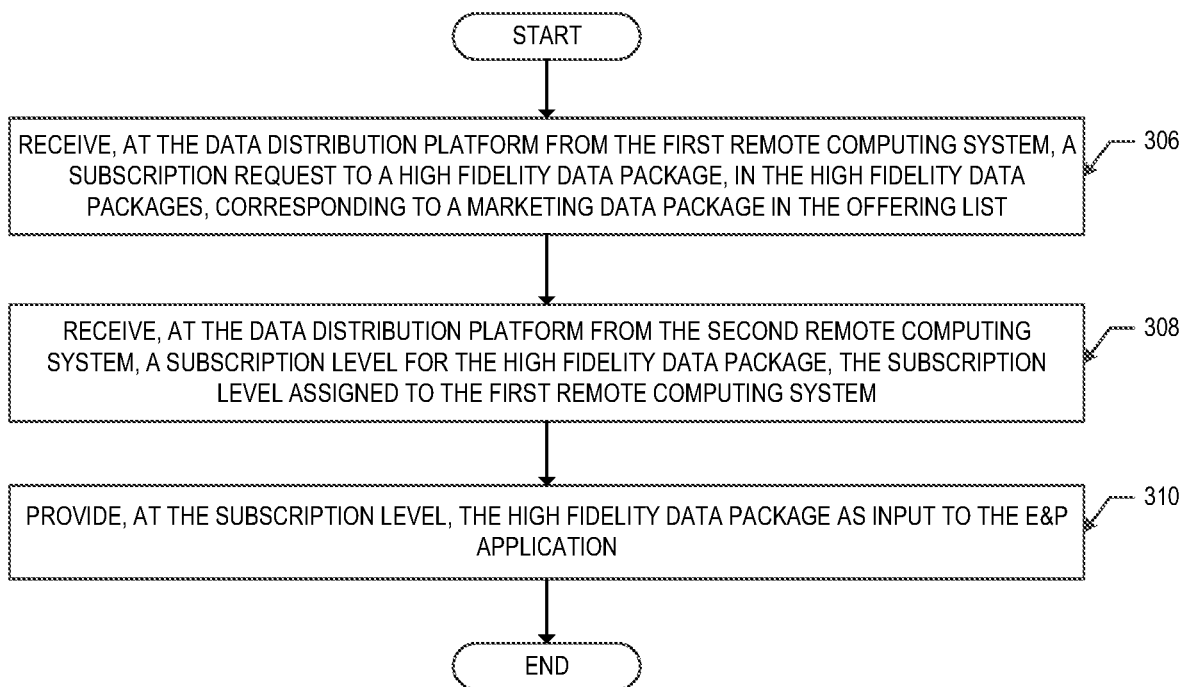
FIG. 3.2

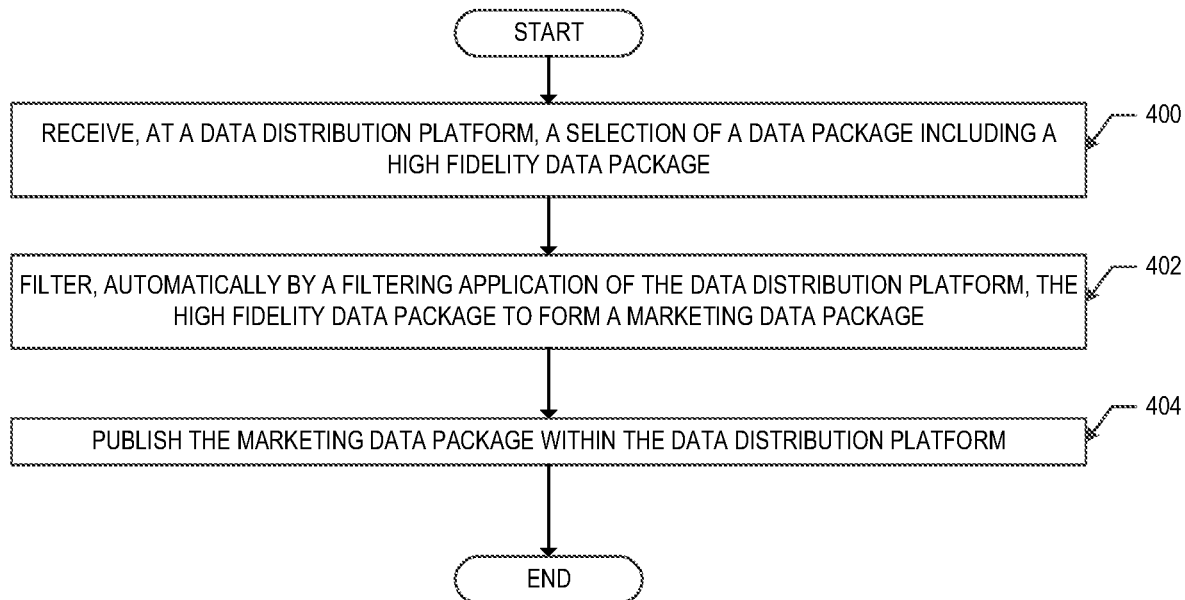
FIG. 4.1
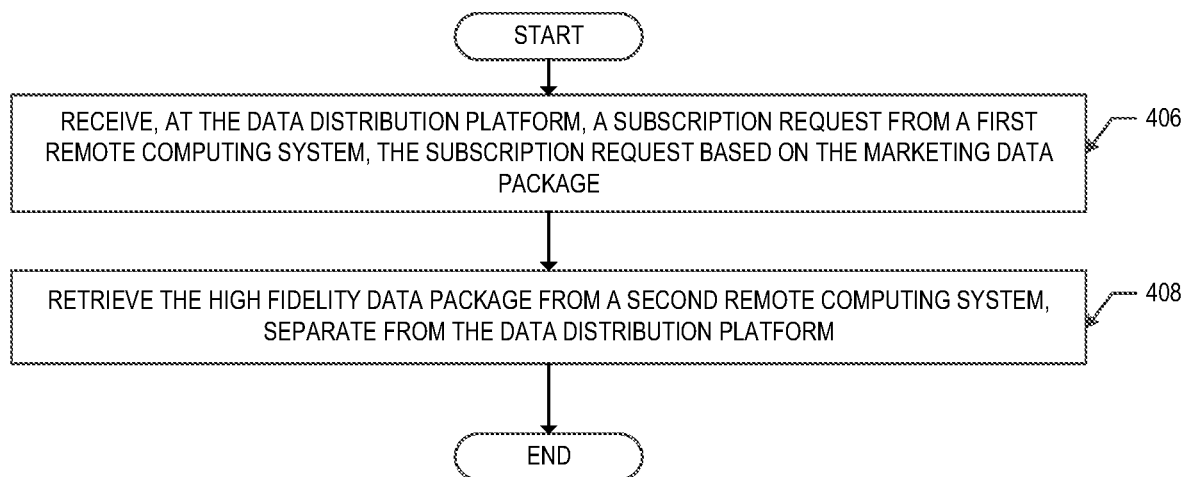
FIG. 4.2

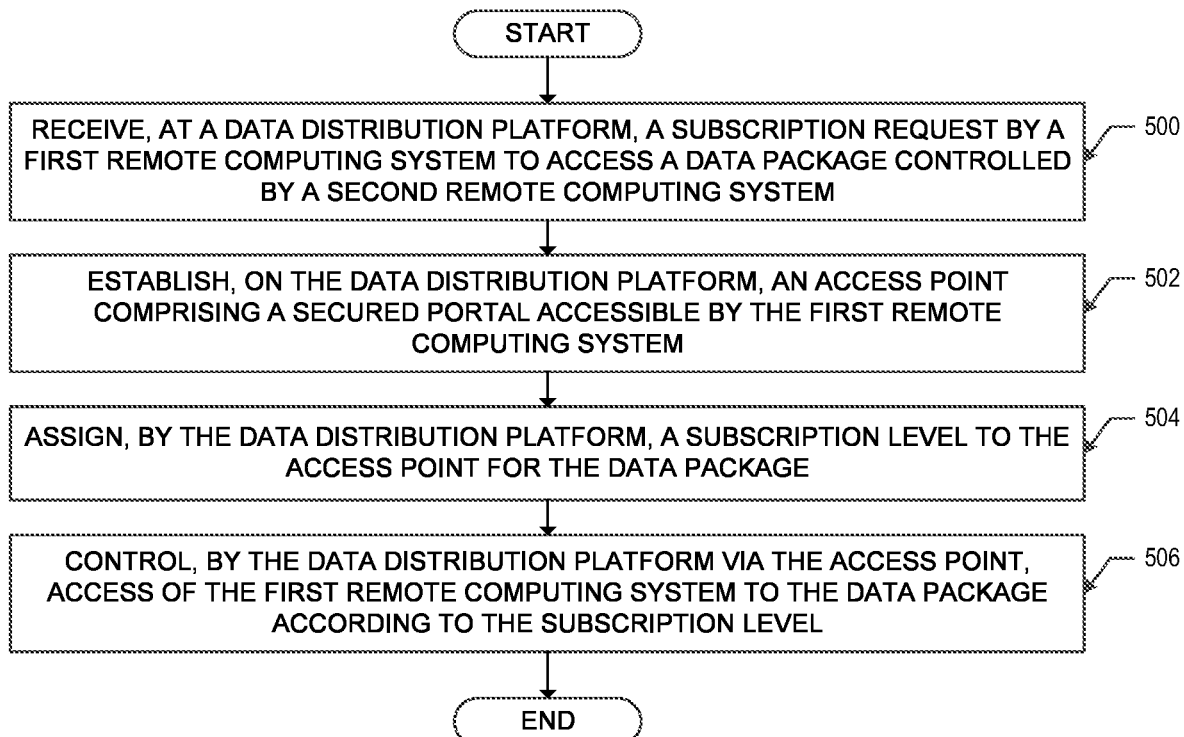
FIG. 5.1
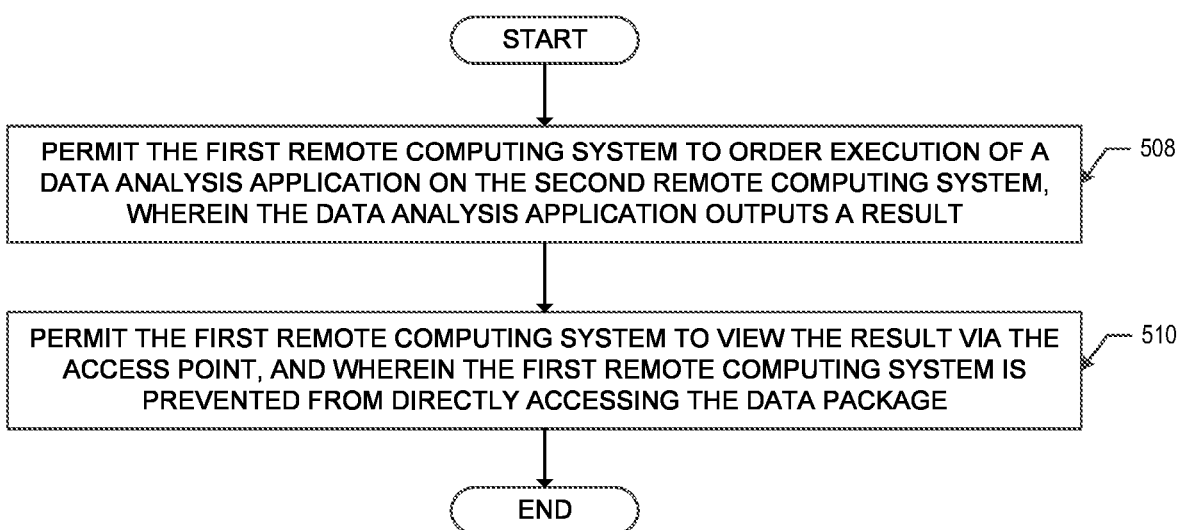
FIG. 5.2

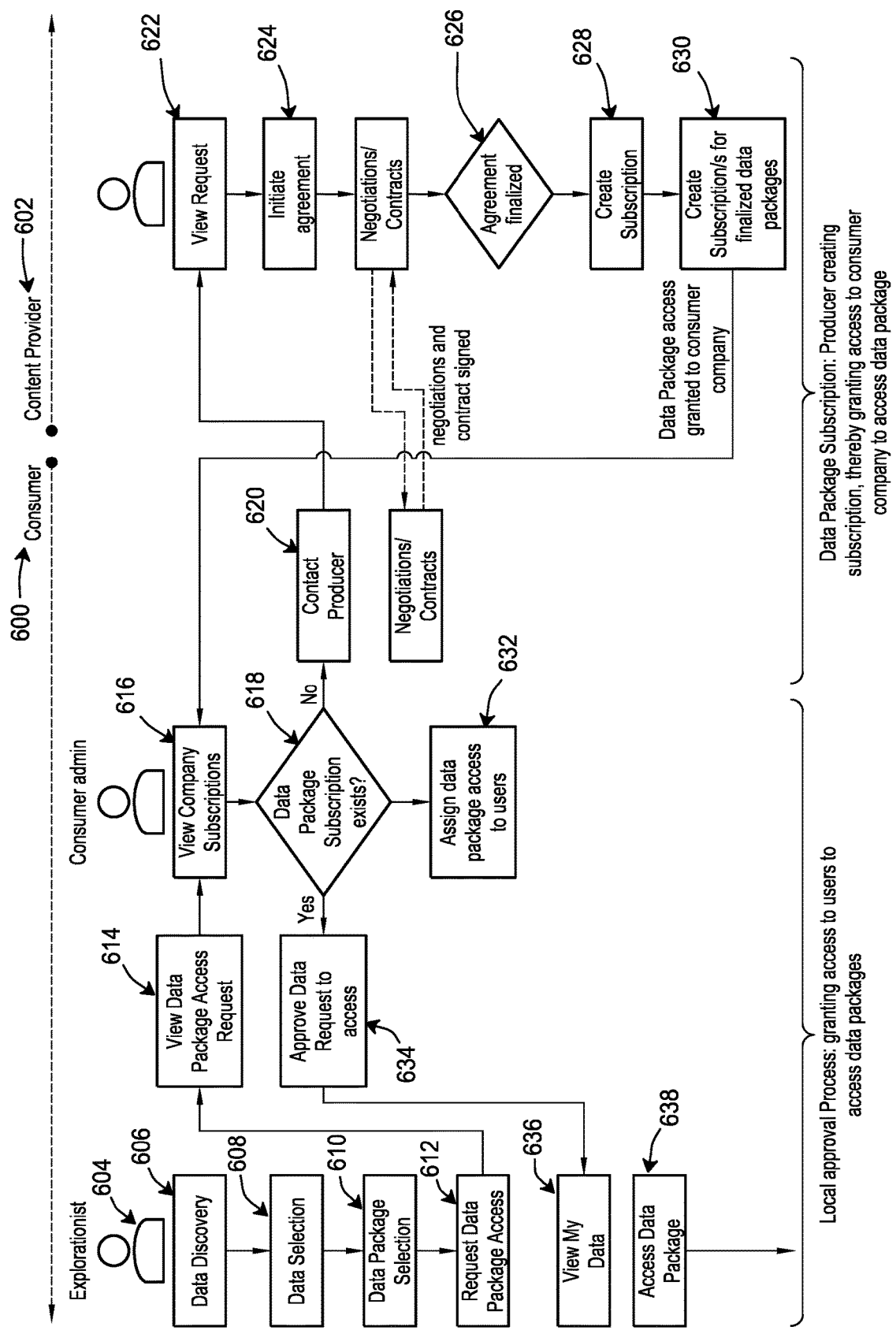
FIG. 6.1

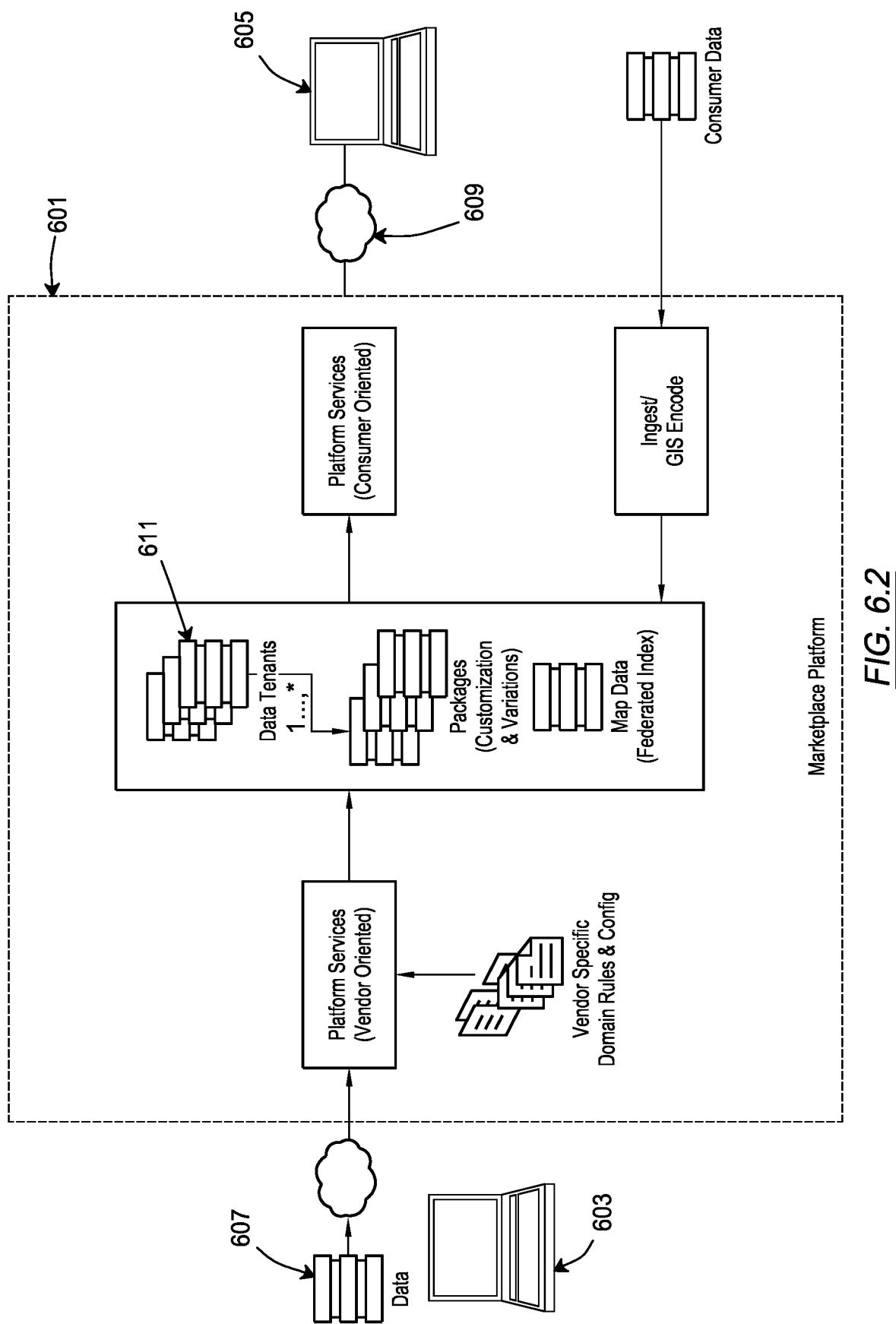
FIG. 6.2

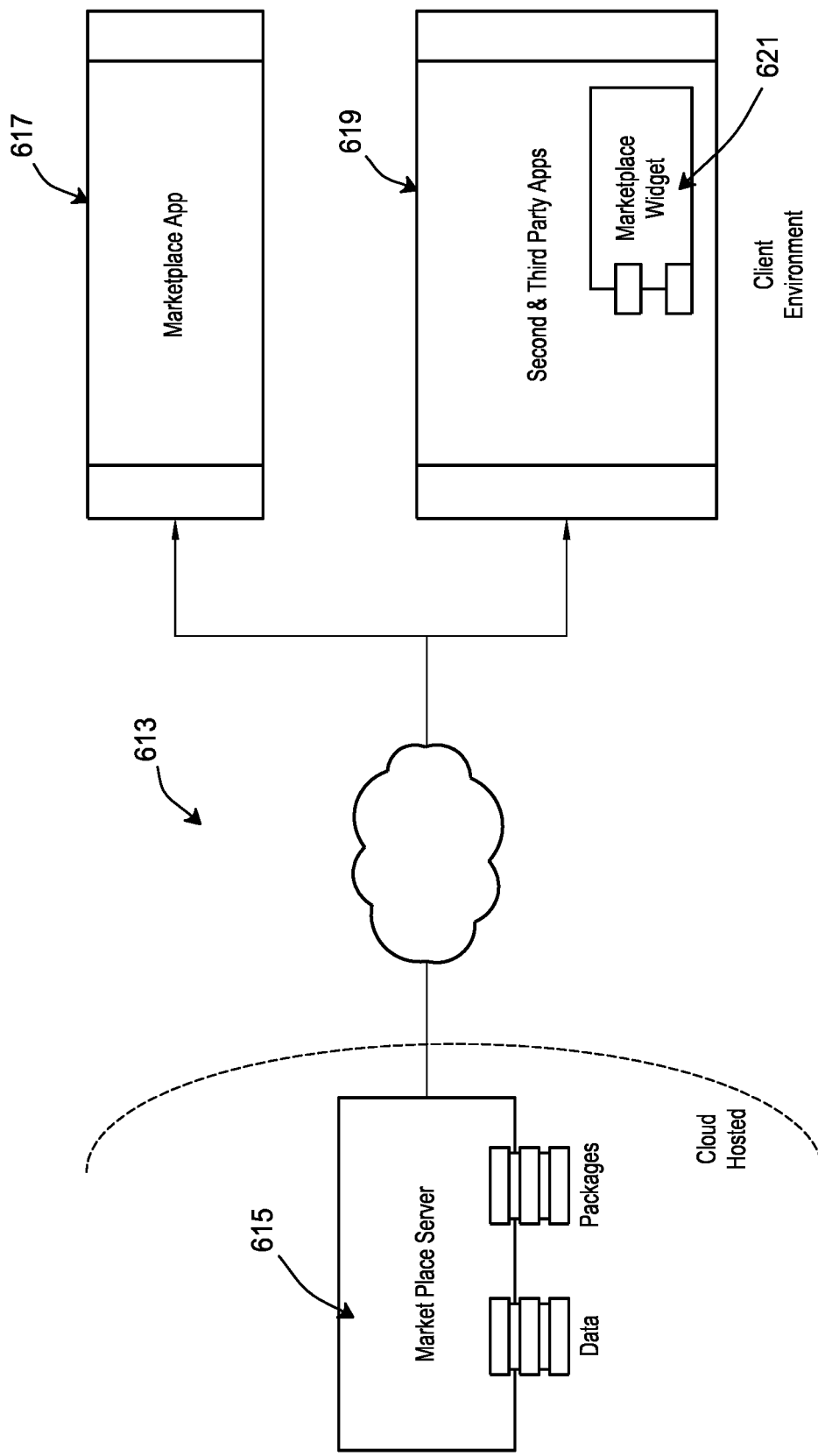
FIG. 6.3

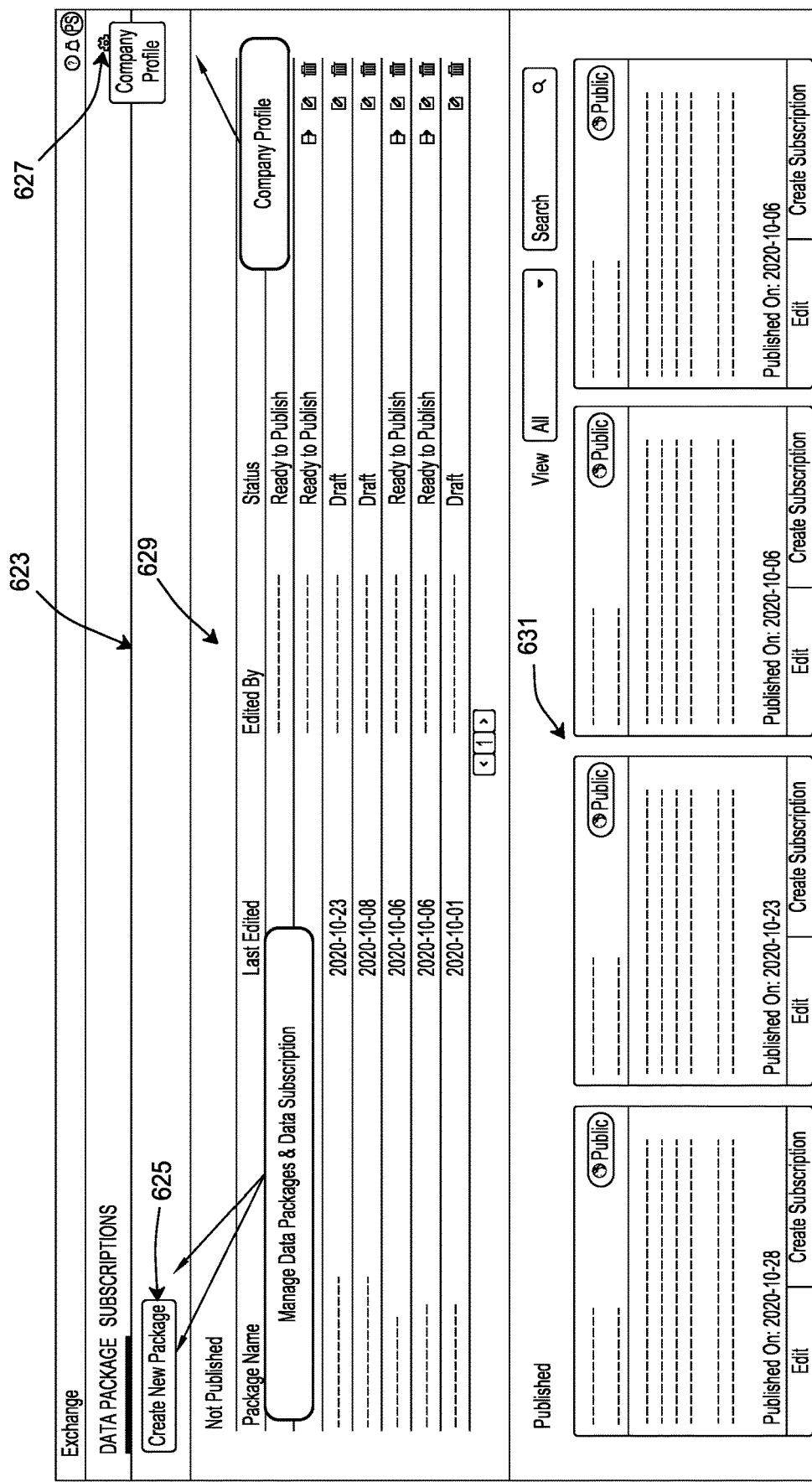
FIG. 6.4

FIG. 6.5

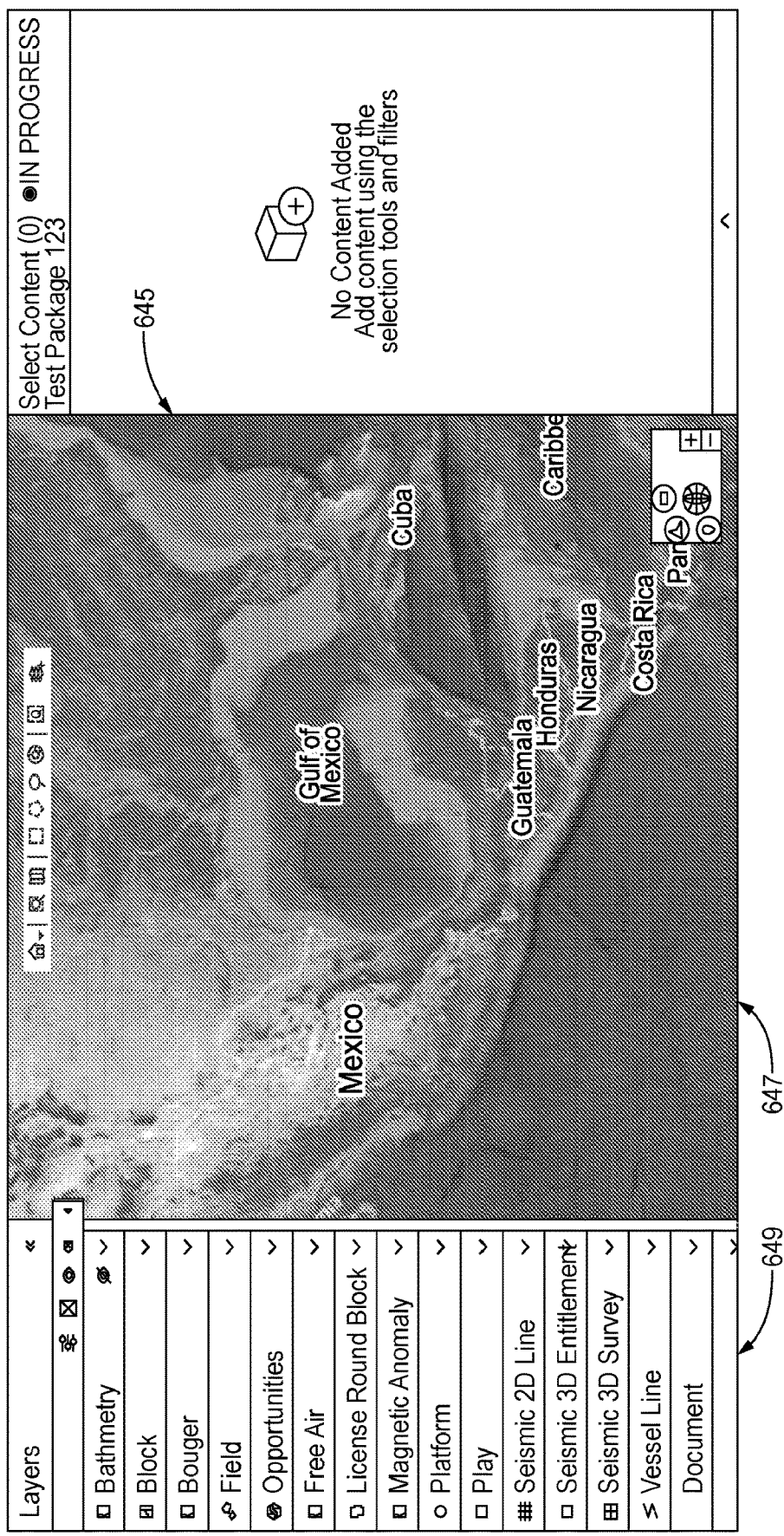
FIG. 6.6

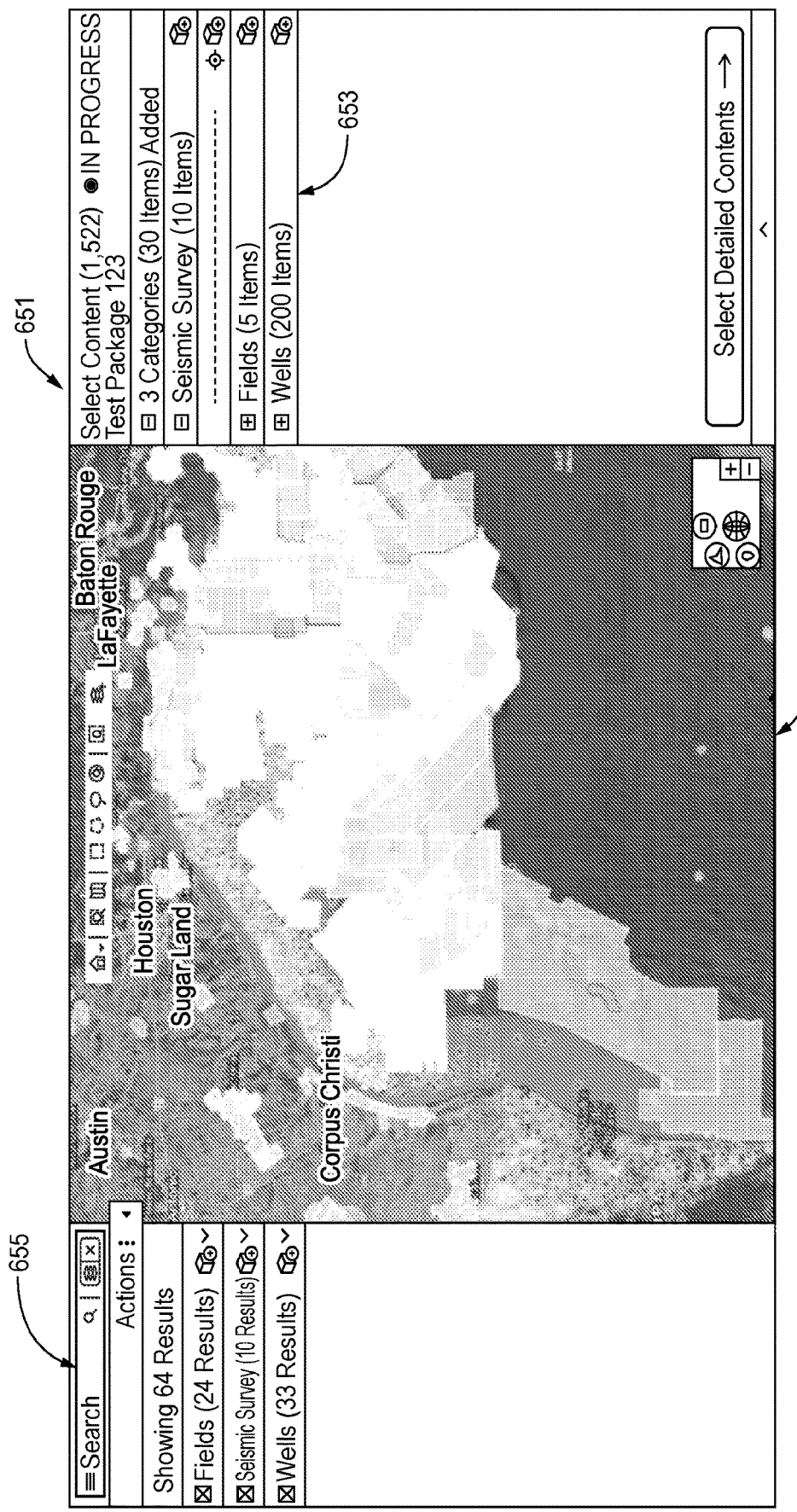
FIG. 6.7

FIG. 6.8

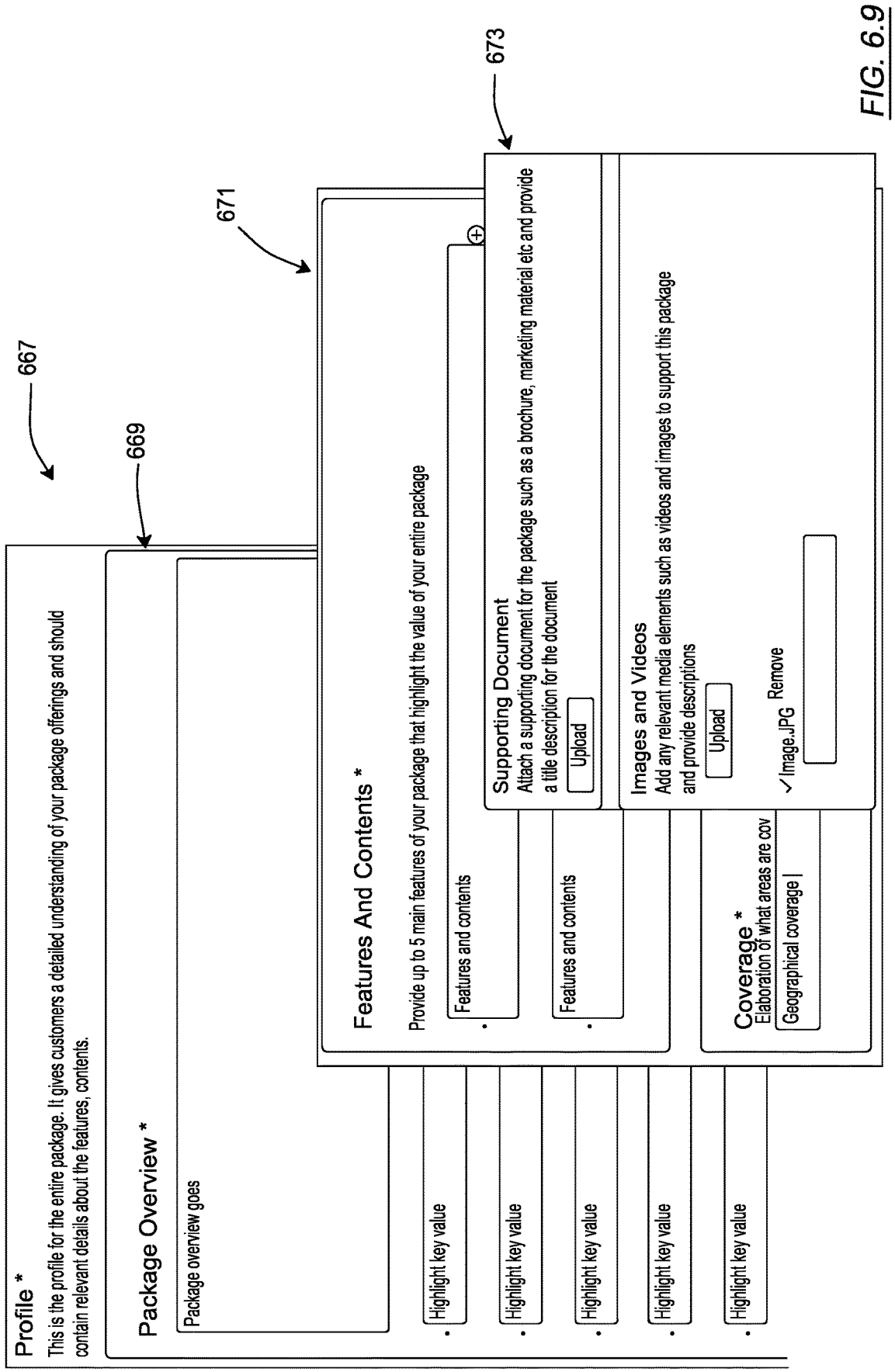
FIG. 6.9

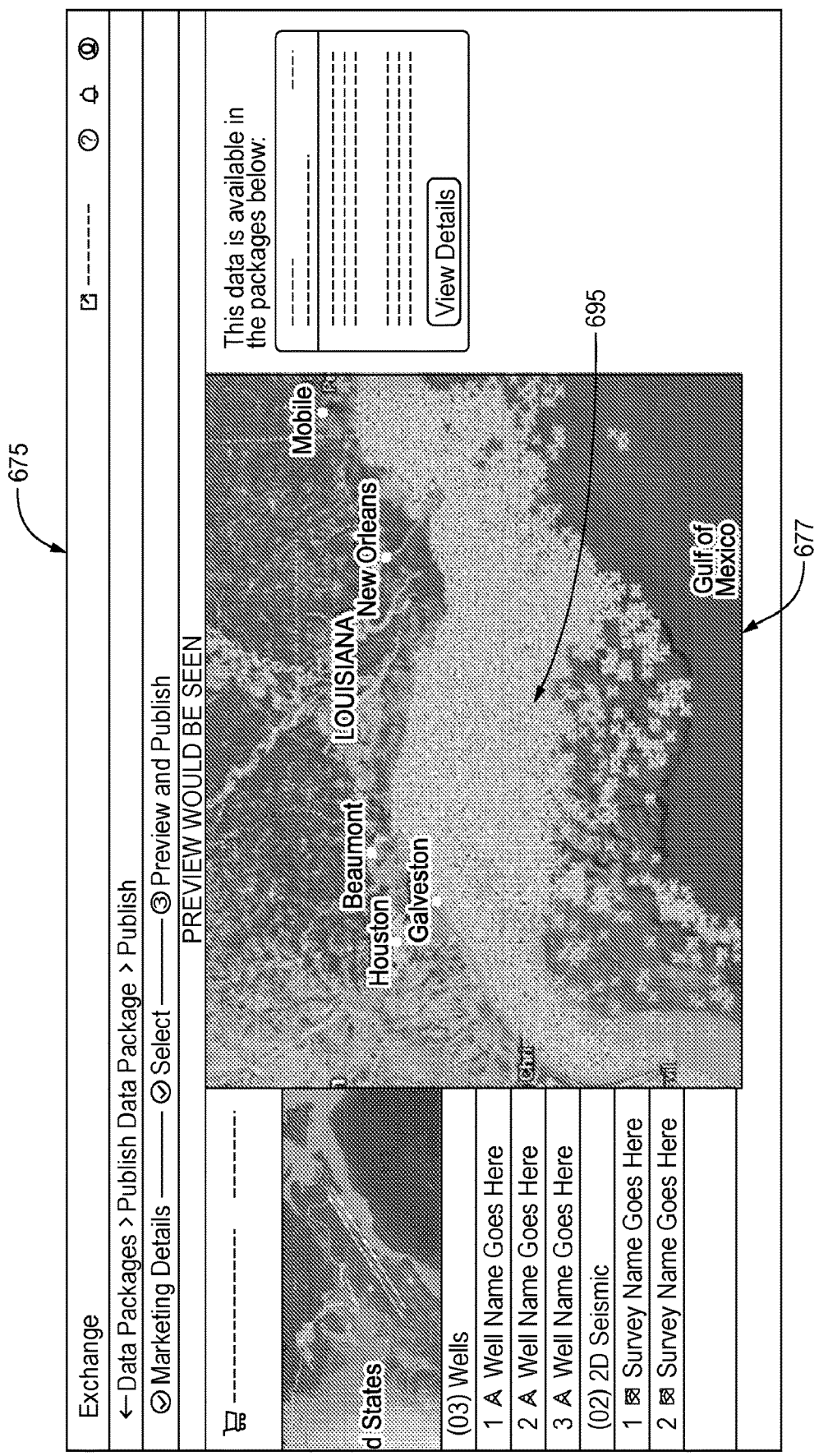
FIG. 6.10

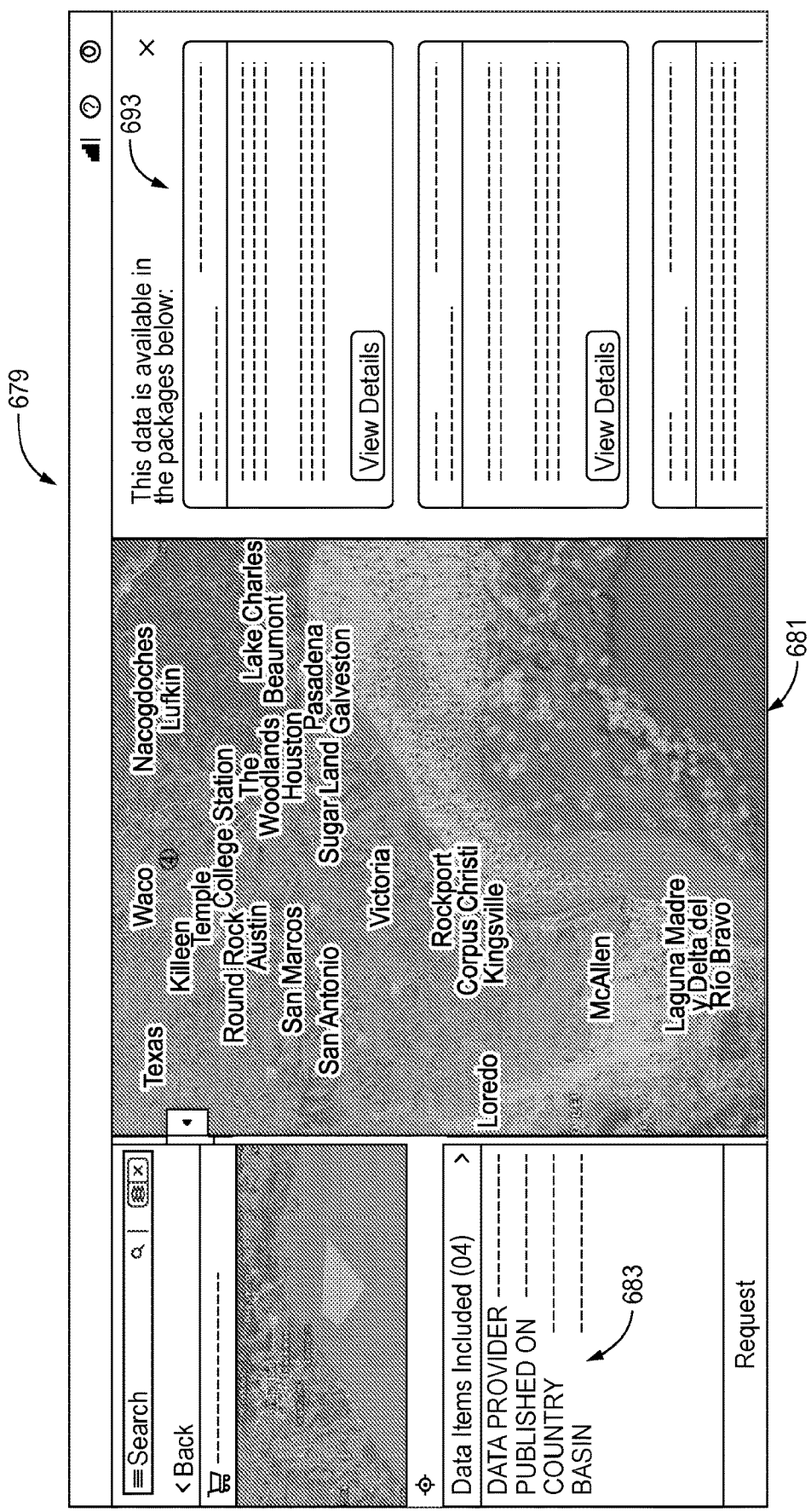
FIG. 6.11

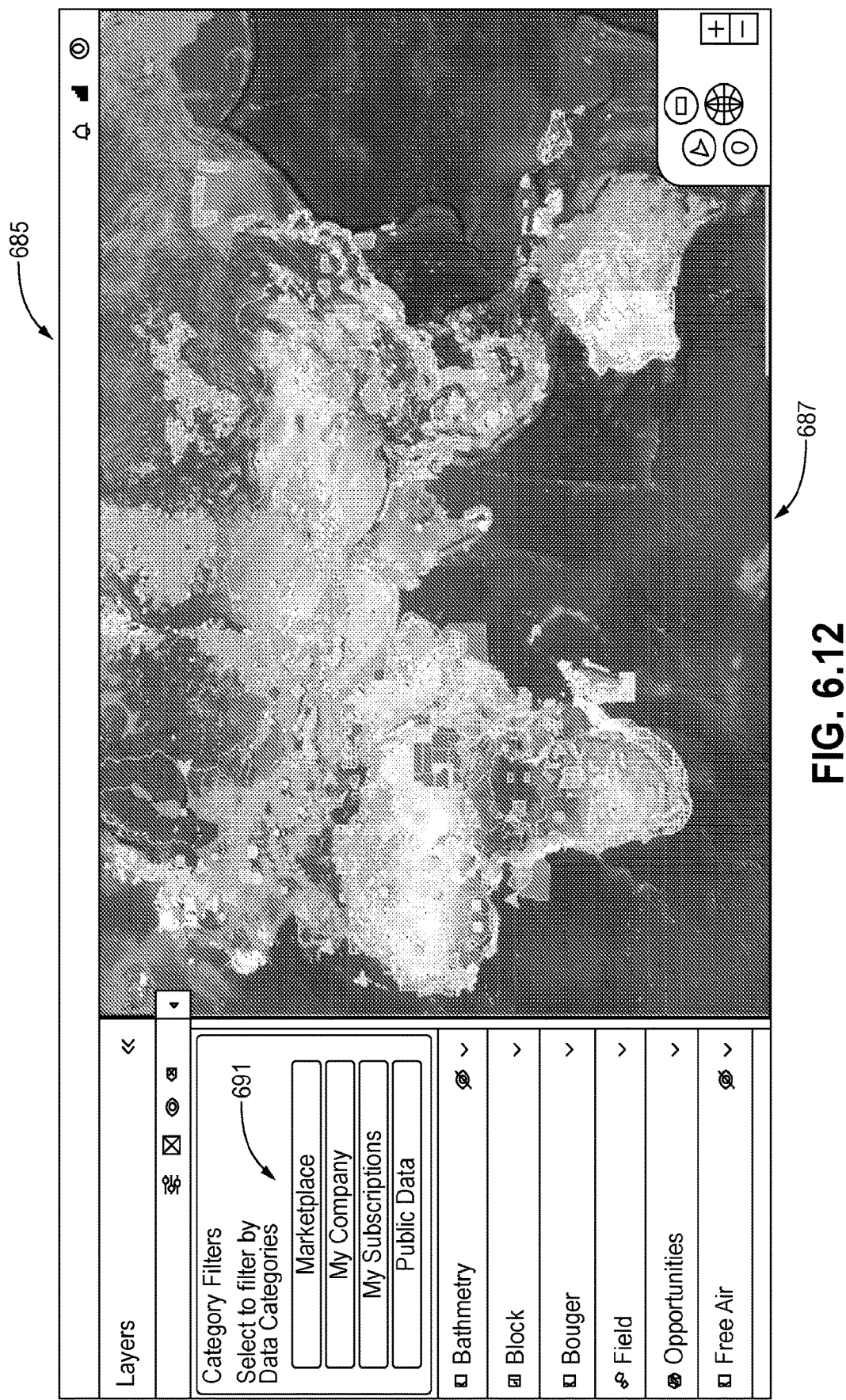
FIG. 6.12

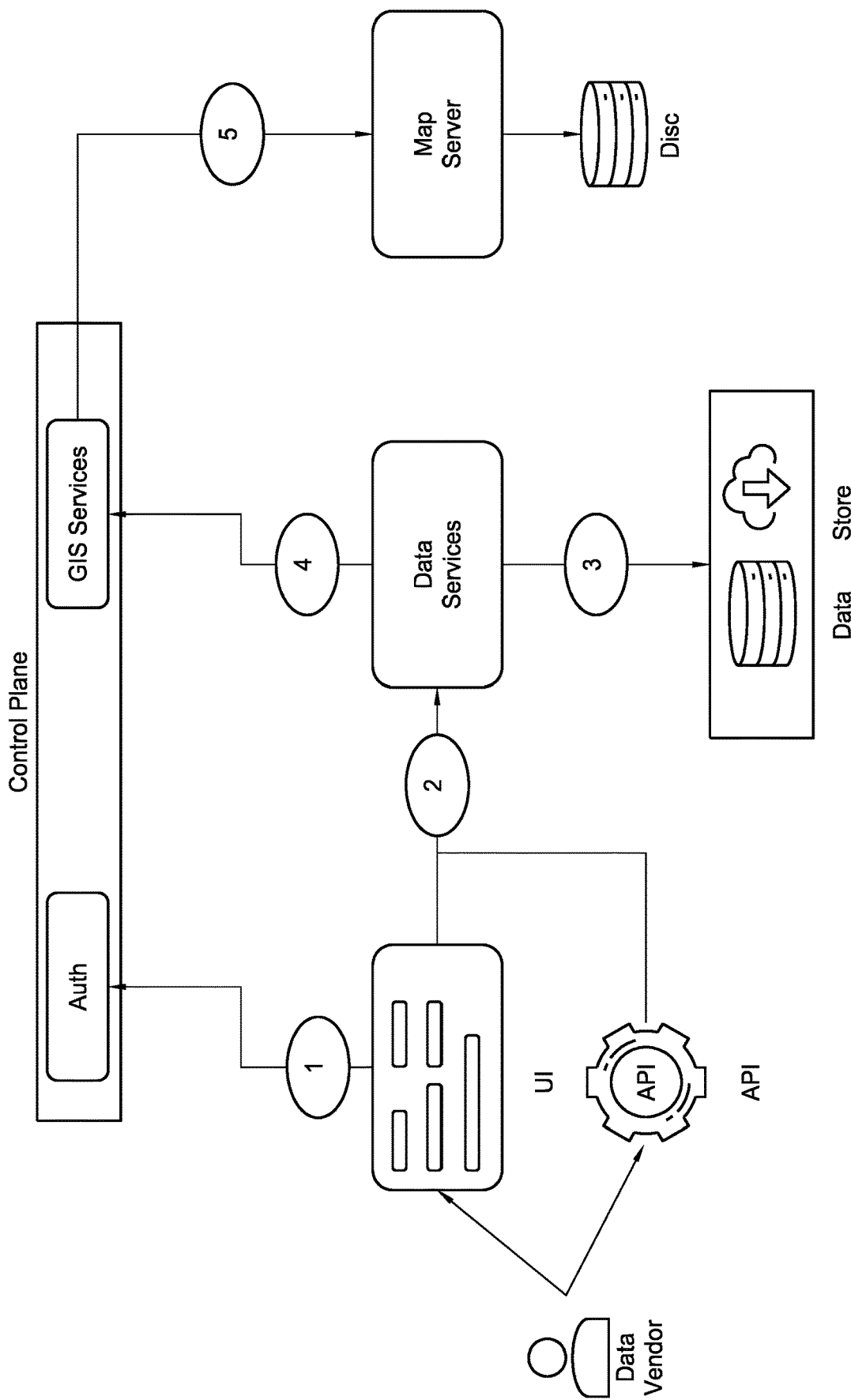
FIG. 6.13

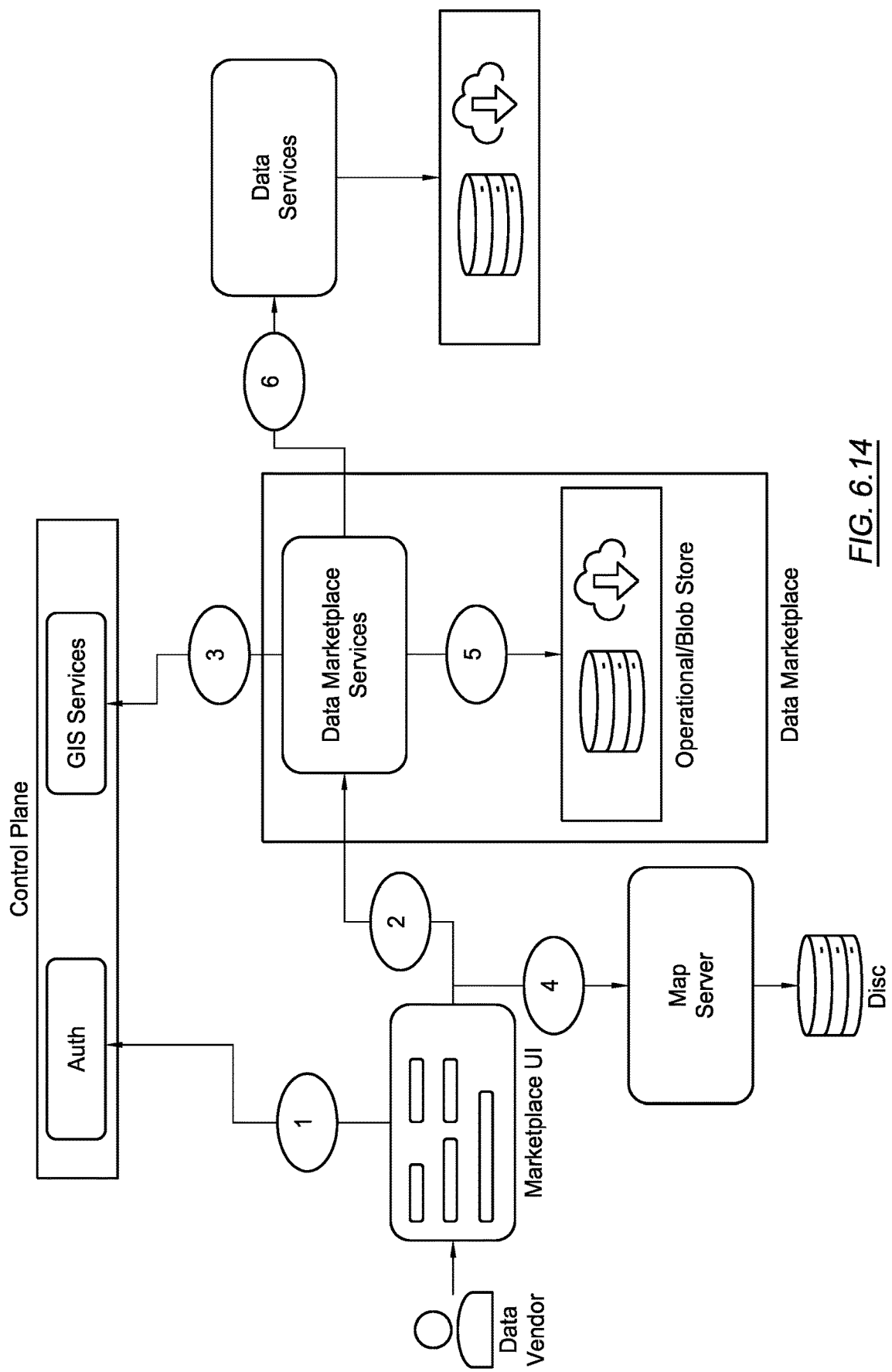
FIG. 6.14

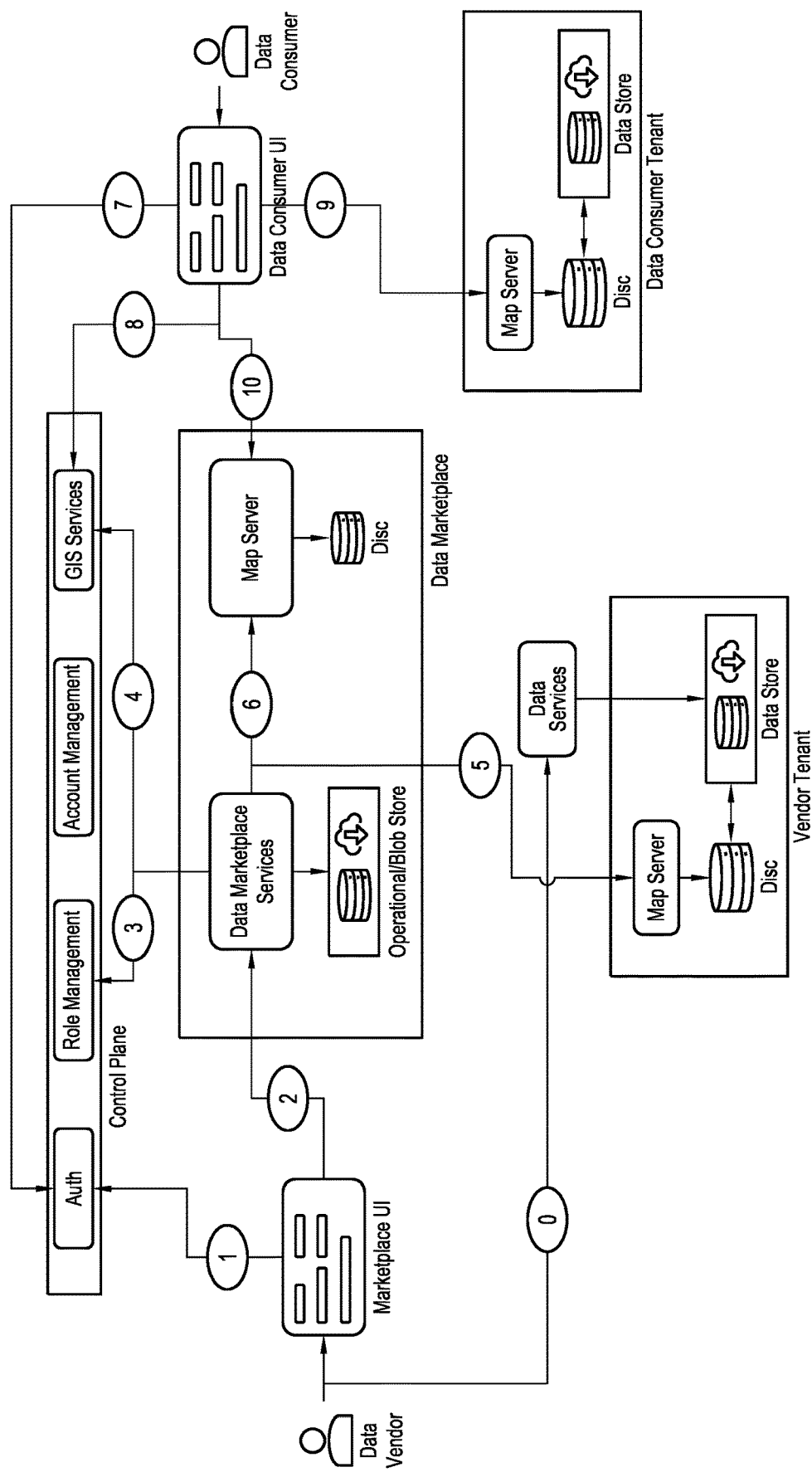
FIG. 6.15

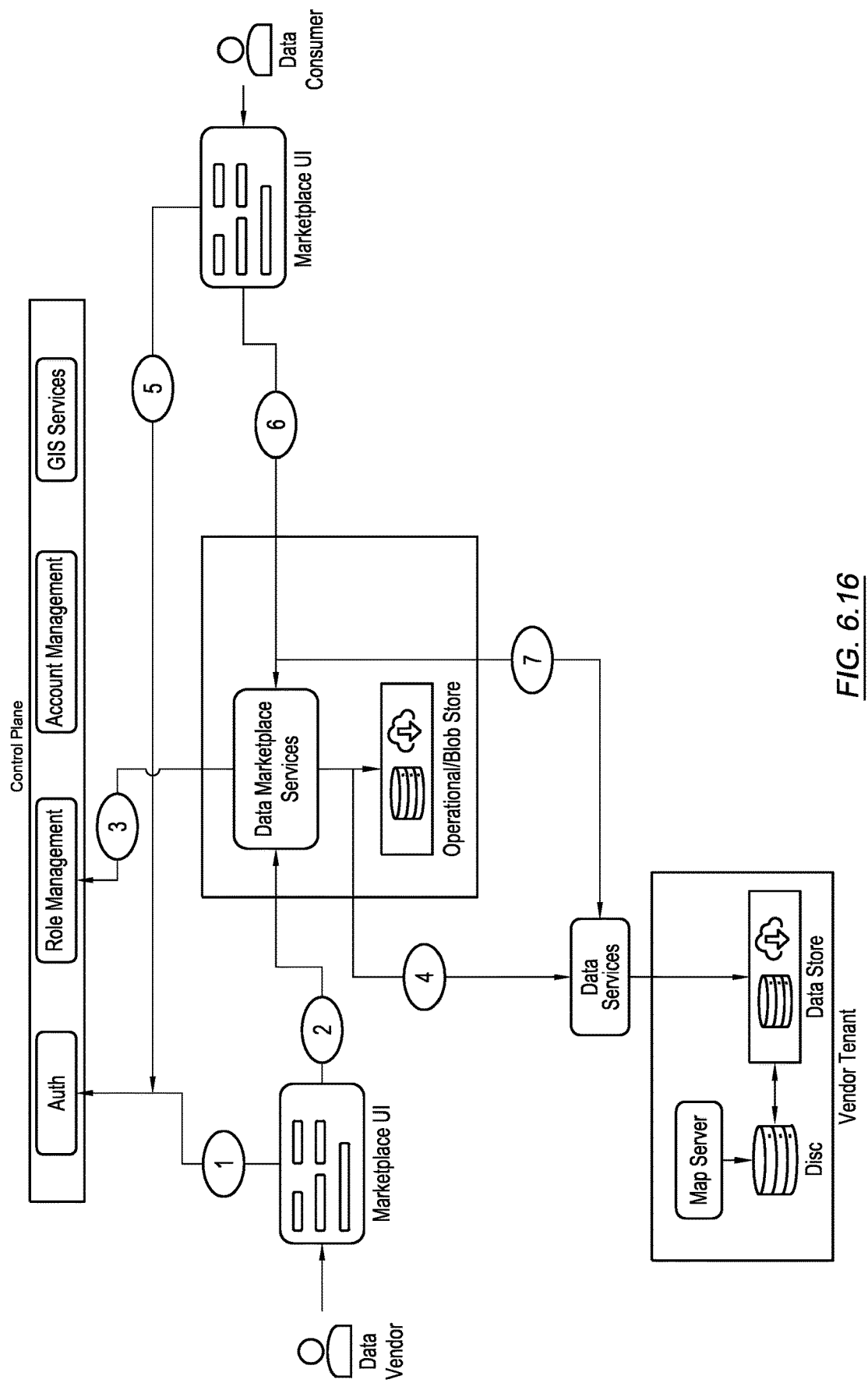
FIG. 6.16

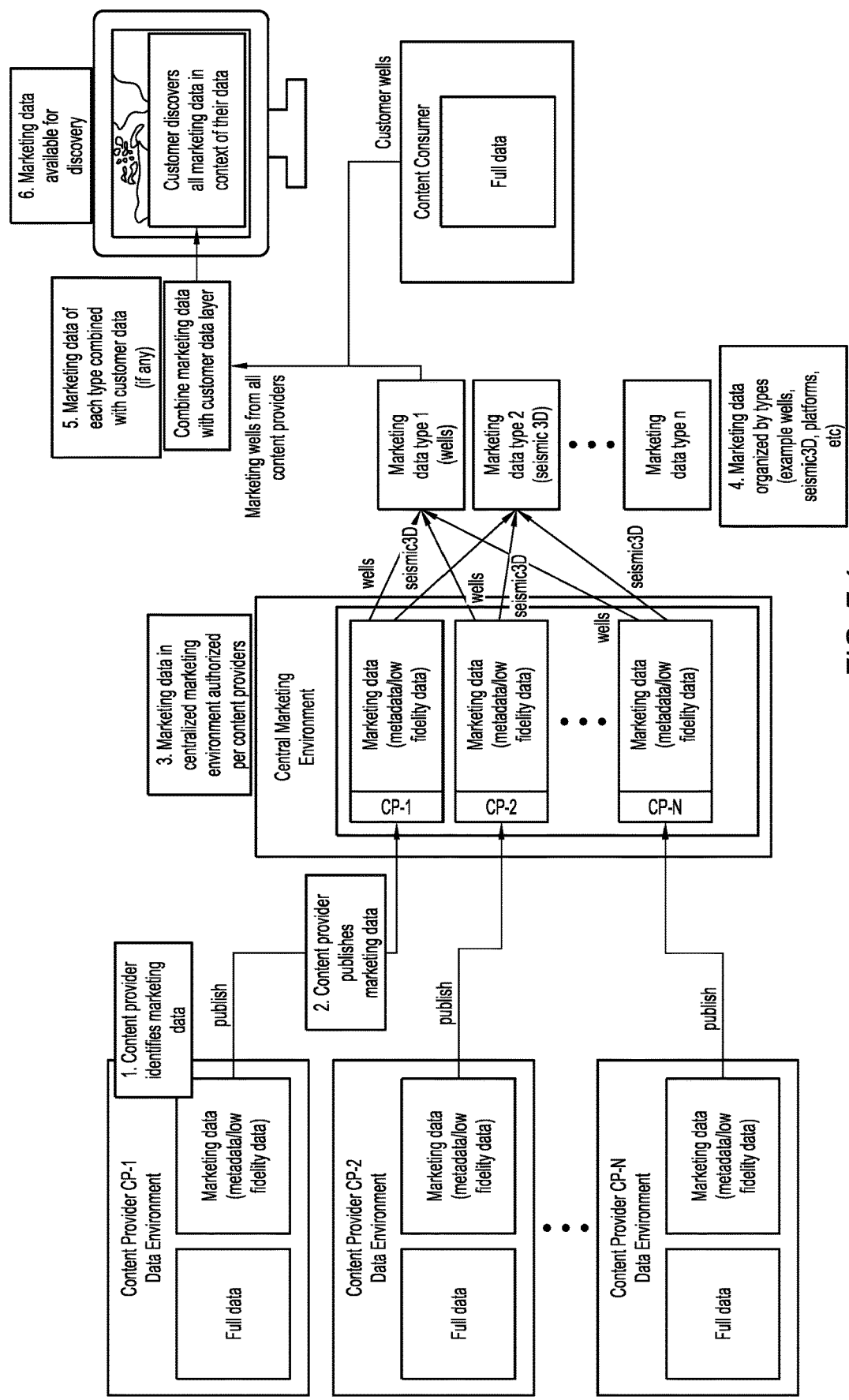
FIG. 7.1

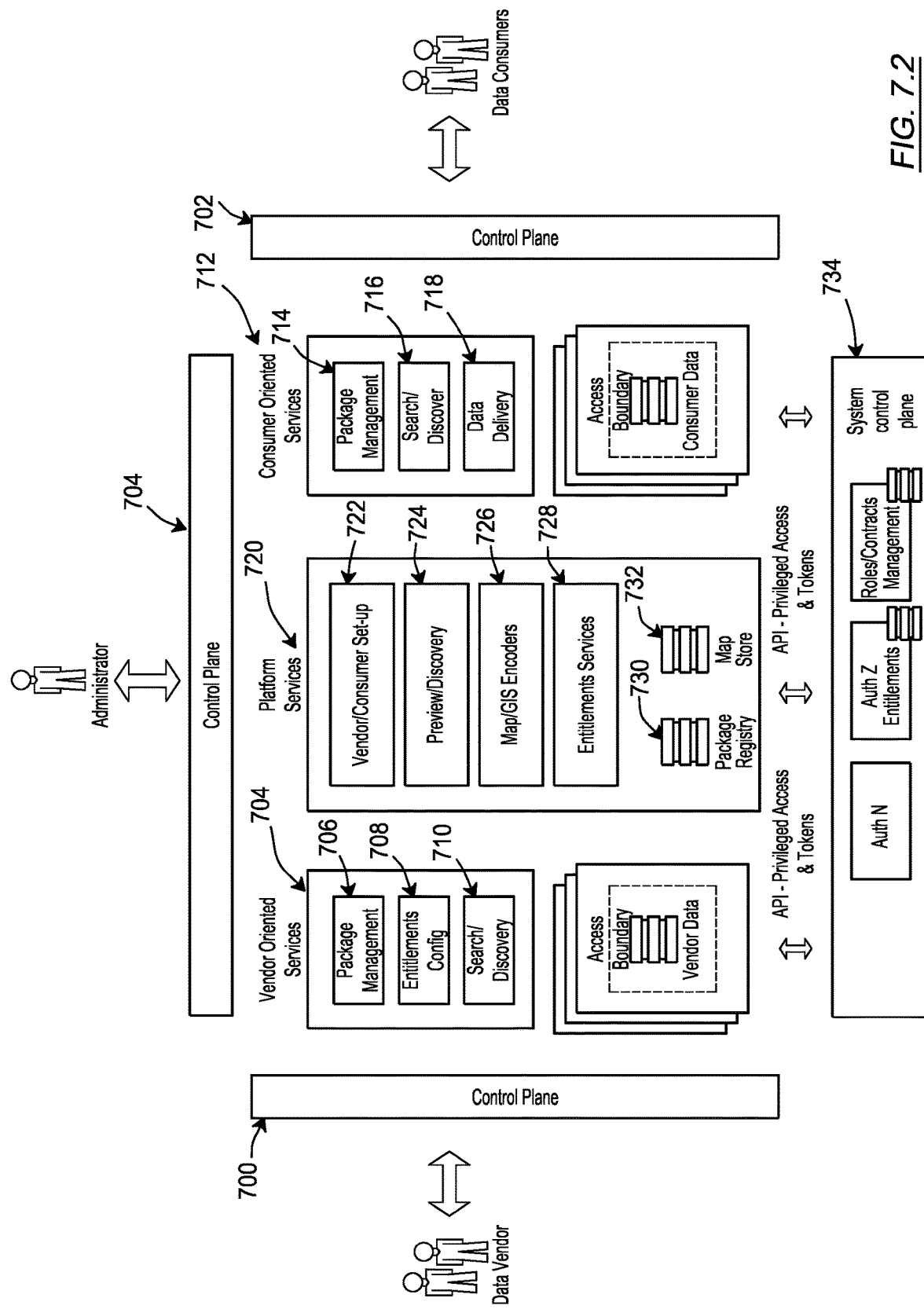
FIG. 7.2

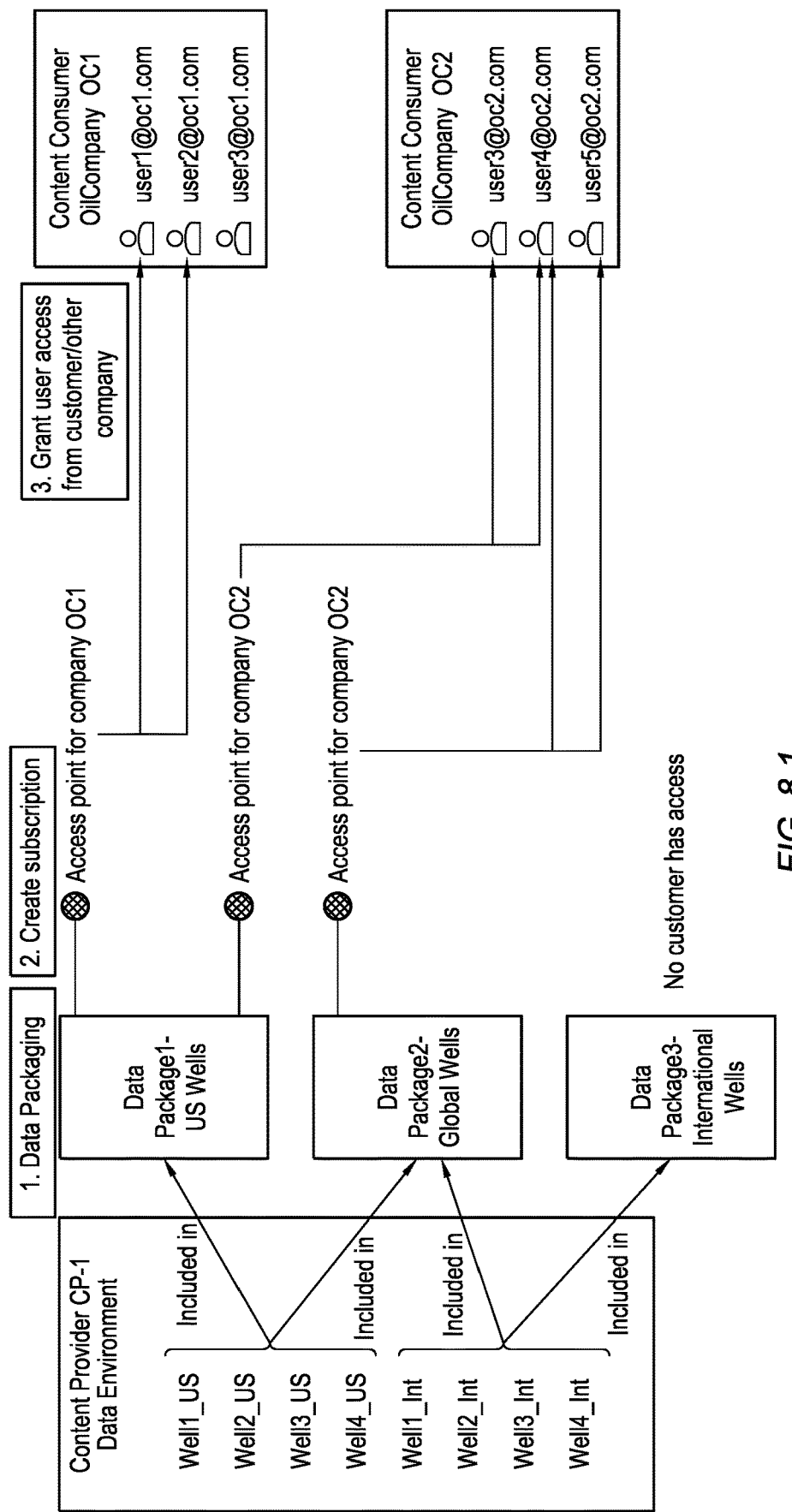
FIG. 8.1

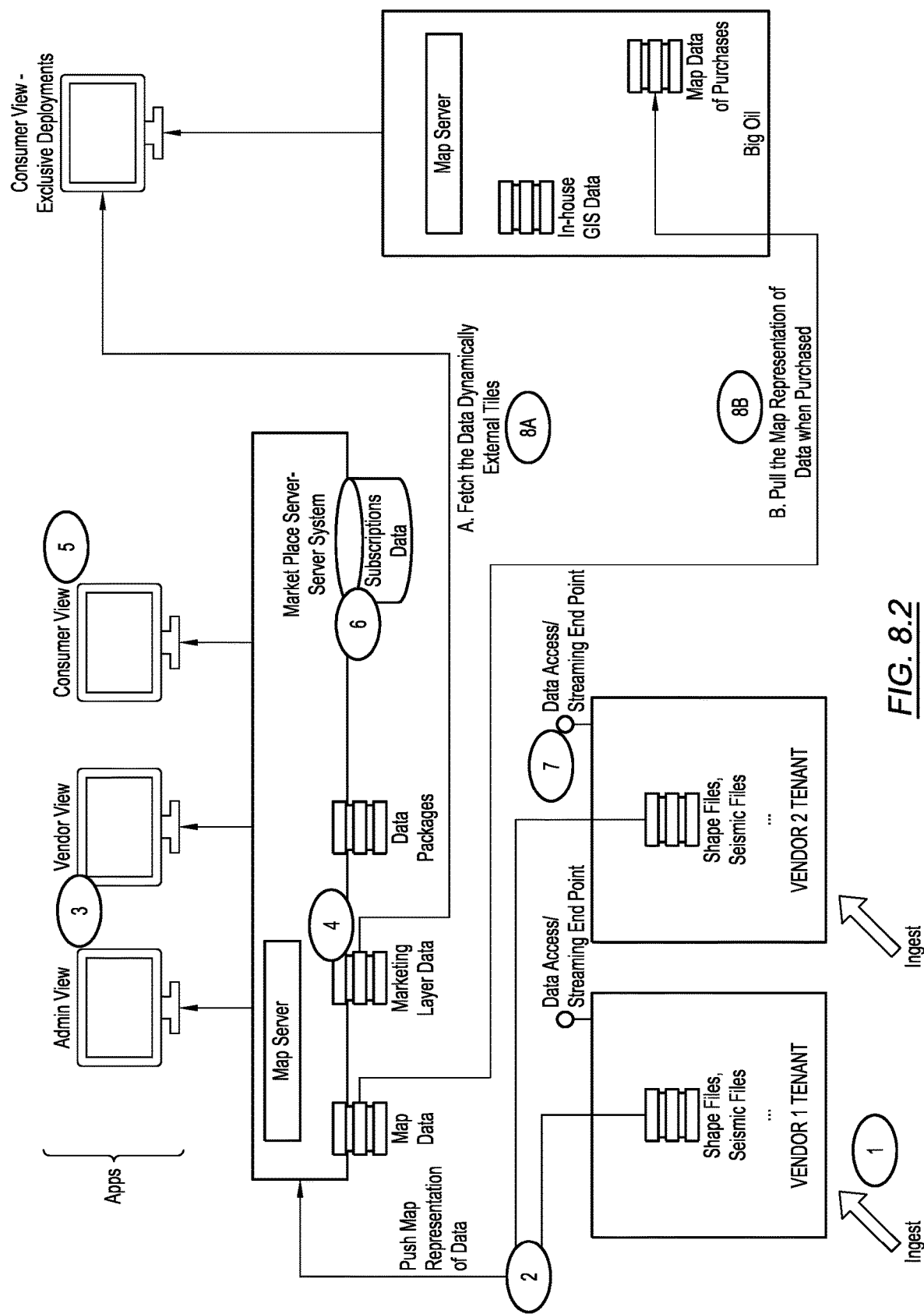
FIG. 8.2

FIG. 8.3

Exchange

DATA PACKAGES  SUBSCRIPTIONS

← Create New Subscription

801

Package Name *
[Test Package ▾]

Subscription Details *
Subscription Type: ●New ○Renew
User Quota: [Number of users] Users
Subscription Term: [Number of users] Months
Start Date: 2021-04-28
Expiry Date:
Invoice ID: [Invoice ID]
Subscription Value: [Amount in USD] USD Company Details *
Company Name: [Company Name]
Legal Entity: [Billing Account Number]
Contract ID: [Contract ID (Eg. 1234-567-890)]
Contract Manager Email Id: [johndoe@email.com]

Exchange

DATA PACKAGES  SUBSCRIPTIONS

Subscription Term: [Number of users] Months

Start Date: 2021-04-28

Expiry Date:

Invoice ID: [Invoice ID]

Subscription Value: [Amount in USD] USD

Company Details *
Company Name: [Company Name]

Legal Entity: [Billing Account Number]

Contract ID: [Contract ID (Eg. 1234-567-890)]

Contract Manager Email Id: [johndoe@email.com]

Data Admin Email Id: [johndoe@email.com]

Contract * ⓘ
Upload the agreed data contract document. This will only be visible to you and the subscriber.
[Upload]

[Cancel]  [Create Subscription]

MY SUBSCRIPTIONS   MANAGE

User Requests   Organization Subscriptions

Ongoing Requests

| Request ID | Data Package Name | Requested On | Provided By | Status | Details |
|---|---|---|---|---|---|
| ------ | ------ | ------ | ------ | ------ | View |
| ------ | ------ | ------ | ------ | ------ | View |
| ------ | ------ | ------ | ------ | ------ | View |
| ------ | ------ | ------ | ------ | ------ | View |
| ------ | ------ | ------ | ------ | ------ | View |

[Search]   5 ▾  1 - 5 of 13

Organization Subscriptions

| Data Package | Subscription ID | Provided By | Start Date | Expiry Date | Active Users | User Quota | Contract | Action |
|---|---|---|---|---|---|---|---|---|
| ------ | ------ | ------ | 2021-01-07 | 2022-01-06 | 0 | 100 | 🗎 | Details |
| ------ | ------ | ------ | 2021-01-07 | 2022-01-06 | 1 | 12 | 🗎 | Details |
| ------ | ------ | ------ | 2020-12-08 | 2022-01-06 | 0 | 10 | 🗎 | Details |
| ------ | ------ | ------ | ------ | ------ | 1 | 12 | 🗎 | Details |
| ------ | ------ | ------ | ------ | ------ | 1 | 12 | 🗎 | Details |
| ------ | ------ | ------ | ------ | ------ | 1 | 15 | 🗎 | Details |
| ------ | ------ | ------ | ------ | ------ | 0 | 9999 | 🗎 | Details |
| ------ | ------ | ------ | ------ | ------ | 1 | 200 | 🗎 | Details |
| ------ | ------ | ------ | ------ | ------ | 1 | 12 | 🗎 | Details |
| ------ | ------ | ------ | ------ | ------ | 1 | 15 | 🗎 | Details |

[Search]   10 ▾  1 - 10 of 13

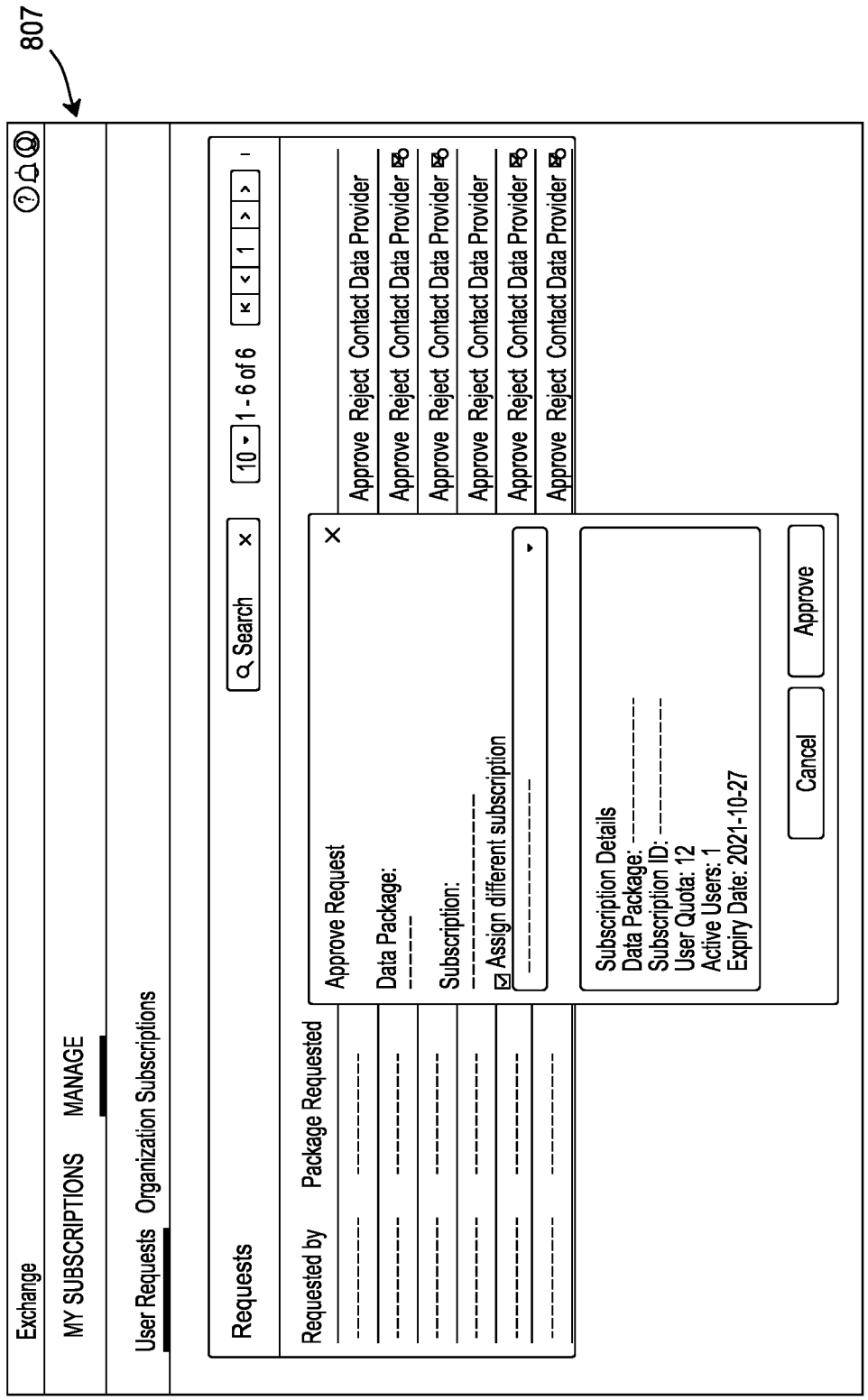
FIG. 8.6

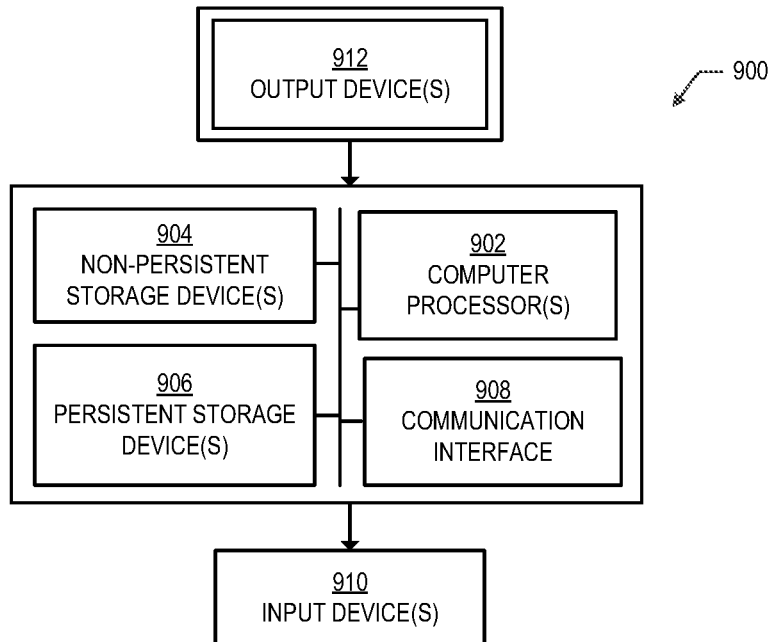
*FIG. 9.1*
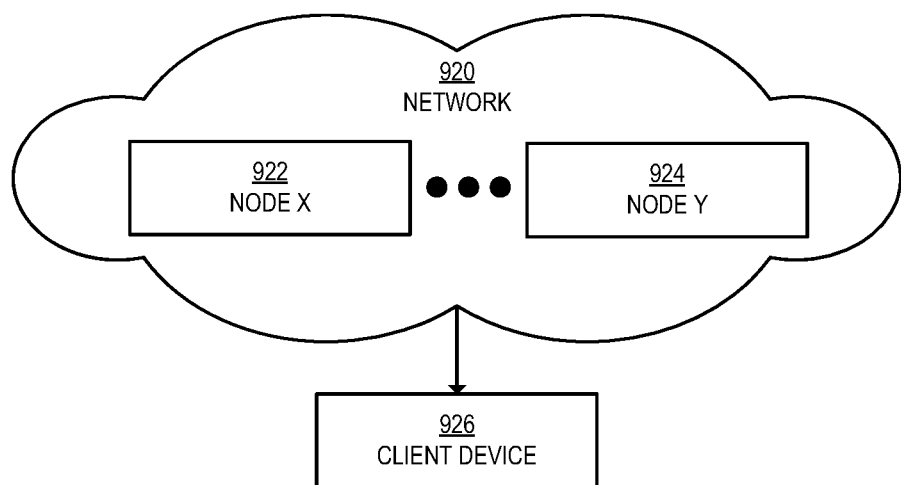
*FIG. 9.2*

SECURE PLATFORM FOR THE DISSEMINATION OF DATA

CROSS-REFERENCE TO RELATED APPLICATIONS

This application is a is a National Stage of patent cooperation treaty application PCT/US2021/031348, filed May 7, 2021, that claims priority to: U.S. Provisional Patent Application 62/704,381, filed 7 May 2020, hereby incorporated by a reference; U.S. Provisional Patent Application 62/704,382, filed 7 May 2020, hereby incorporated by reference; and U.S. Provisional Patent Application 62/704,383, filed 7 May 2020, hereby incorporated by reference.

BACKGROUND

The exploration and production (E&P) industry is data-intensive. Different kinds of measurements of subterranean structures are made at a potential drill site in order to assess whether expensive drilling operations should be undertaken at the potential drill site. A given potential drill site may have been subjected to different kinds of measurements performed by companies or organizations other than the company or organization that will engage in the drilling operation.

As a result, E&P data is a valuable commodity that is traded. However, no organized marketplace exists for drilling companies to discover, much less access, potentially available E&P data. Additionally, a vendor may desire to retain control over the valuable E&P data, and thus may wish to prevent the consumer drilling company from downloading and keeping the E&P data. However, computers are able to easily copy data. Thus, technical challenges exist with respect to the dissemination and security of valuable E&P data.

SUMMARY

The one or more embodiments provide for a method. The method includes receiving, at a data distribution platform, a selection of a data package comprising a high fidelity data package. The method also includes filtering, automatically by a filtering application of the data distribution platform, the high fidelity data package to form a marketing data package. Filtering includes removing sufficient data from the high fidelity data package such that the marketing data package is a marketing data package. The method also includes publishing the marketing data package within the data distribution platform.

Other aspects of the one or more embodiments will be apparent from the following description and the appended claims.

BRIEF DESCRIPTION OF DRAWINGS

FIG. 3.1, FIG. 3.2, FIG. 4.1, FIG. 4.2, FIG. 5.1, and FIG. 5.2 show flowcharts of computer-implemented methods, in accordance with one or more embodiments.

FIG. 6.1, FIG. 6.2, FIG. 6.3, FIG. 6.4, FIG. 6.5, FIG. 6.6, FIG. 6.7, FIG. 6.8, FIG. 6.9, FIG. 6.10, FIG. 6.11, FIG. 6.12, FIG. 6.13, FIG. 6.14, FIG. 6.15, FIG. 6.16, FIG. 7.1, FIG. 7.2, FIG. 8.1, FIG. 8.2, FIG. 8.3, FIG. 8.4, FIG. 8.5, and FIG. 8.6 show examples of a data distribution platform in use, in accordance with one or more embodiments.

FIG. 9.1 and FIG. 9.2 show a computing system and network environment, in accordance with one or more embodiments.

DETAILED DESCRIPTION

Figure 1:
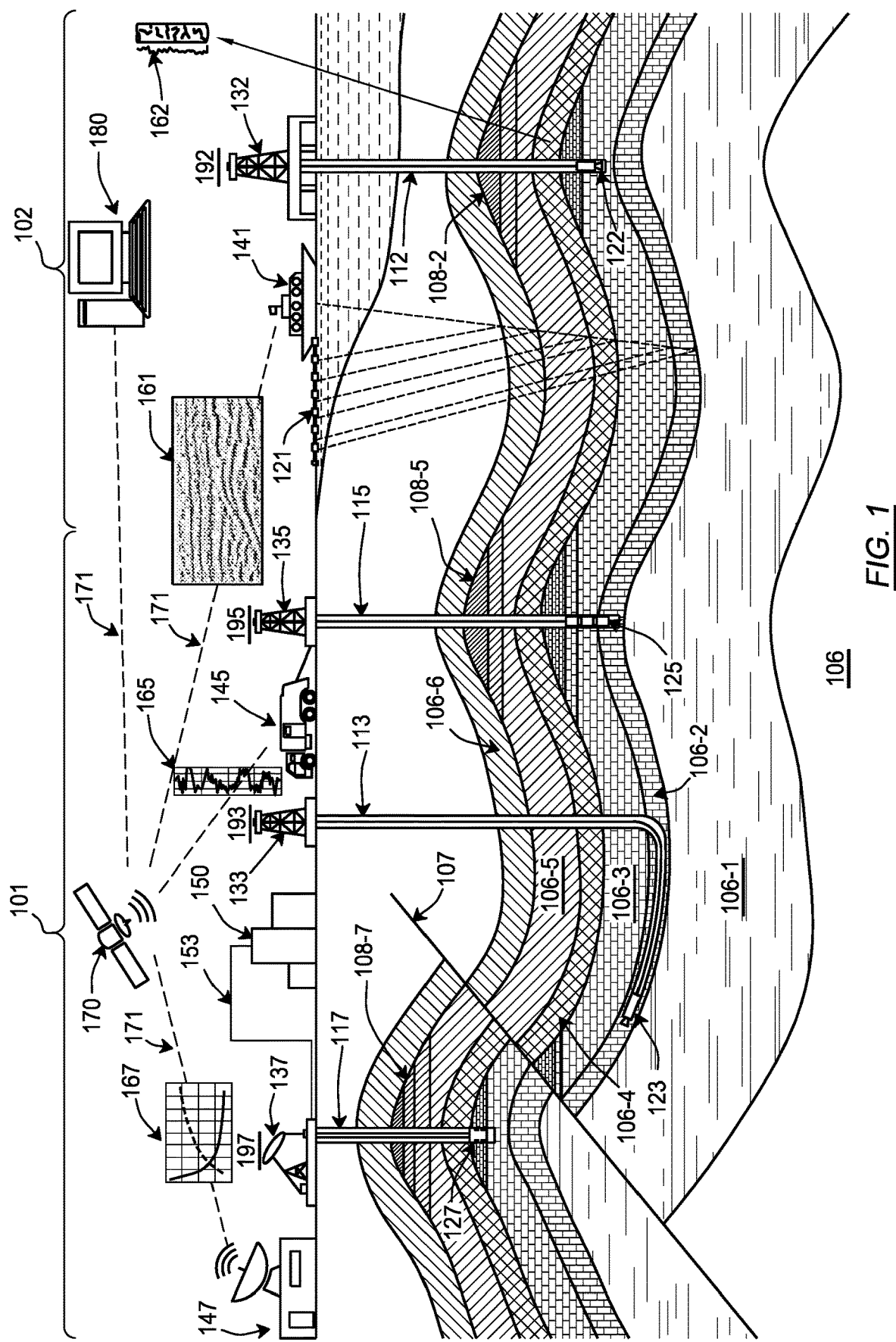
FIG. 1 shows an exploration and production system, in accordance with one or more embodiments.

In general, the one or more embodiments relate to a data distribution platform for exchanging valuable data in a secure manner that is controlled by the vendors of the data. The data distribution platform is configured for use by many different vendors and many different consumers. The data distribution platform of the one or more embodiments addresses the technical challenges involved with packaging data, permitting consumers to find relevant data packages, and granting secure access to data that is useful to the consumer without permitting the consumer to download or otherwise keep the data.

For example, as described further below, vendors package their data as suited for their consumers. The vendors prepare data for marketing on the data distribution platform and publish marketing data to consumers. The marketing data is discovered by potential consumers. The consumers request high fidelity data packages in which they are interested. The data distribution platform acts as a broker between the data consumer and the data vendor. The vendor approves a data request via the data distribution platform and, upon a satisfactory agreement, grants a subscription level to the high fidelity data to the consumer. Specifically, the vendor creates a subscription unique to the consumer's agreed-upon subscription level. Levels of access are enforced via access points imposed by the data distribution platform. The consumer can then access the data at the agreed upon subscription level via the access points.

In some embodiments, the data distribution platform grants access rights to the consumer to run an analysis program or exploration and production (E&P) application on the data without granting the consumer access to the data itself. Thus, the consumer may gain the benefit of analyzing the data without having greater access to the data, such as viewing the data or downloading the data.

Specific embodiments will now be described in detail with reference to the accompanying figures. Like elements in the various figures are denoted by like reference numerals for consistency.

In the following detailed description of embodiments, numerous specific details are set forth in order to provide a more thorough understanding of the one or more embodiments. However, it will be apparent to one of ordinary skill in the art that the one or more embodiments may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being one element unless expressly disclosed, such as by the use of the terms "before", "after", and other such terminology. Rather, the use of ordinal numbers is to distinguish between the elements. By way of an example, a first element is distinct from a second element, and the first element may encompass more than one element and succeed (or precede) the second element in an ordering of elements.

The term "about," when used with respect to a physical property that may be measured, refers to an engineering tolerance anticipated or determined by an engineer or manufacturing technician of ordinary skill in the art. The exact quantified degree of an engineering tolerance depends on the product being produced and the technical property being measured. For a non-limiting example, two angles may be "about congruent" if the values of the two angles are within ten percent. However, if an engineer determines that the engineering tolerance for a particular product should be tighter, then "about congruent" could be two angles having values that are within one percent. Likewise, engineering tolerances could be loosened in other embodiments, such that "about congruent" angles have values within twenty percent. In any case, the ordinary artisan is capable of assessing what is an acceptable engineering tolerance for a particular product, and thus is capable of assessing how to determine the variance of measurement contemplated by the term "about."

As used herein, the term "connected to" contemplates multiple meanings. A connection may be direct or indirect. For example, computer A may be directly connected to computer B by means of a direct communication link. Computer A may be indirectly connected to computer B by means of a common network environment to which both computers are connected. A connection may be wired or wireless. A connection may be temporary, permanent, or semi-permanent communication channel between two entities. An entity is an electronic device, not necessarily limited to a computer.

As shown in FIG. 1, the fields (101), (102) include a geologic sedimentary basin (106), wellsite systems (192), (193), (195), (197), wellbores (112), (113), (115), (117), data acquisition tools (121), (123), (125), (127), surface units (141), (145), (147), well rigs (132), (133), (135), production equipment (137), surface storage tanks (150), production pipelines (153), and an E&P computer system (180) connected to the data acquisition tools (121), (123), (125), (127), through communication links (171) managed by a communication relay (170).

The geologic sedimentary basin (106) contains subterranean formations.

As shown in FIG. 1, the subterranean formations may include several geological layers (106-1 through 106-6). As shown, the formation may include a basement layer (106-1), one or more shale layers (106-2, 106-4, 106-6), a limestone layer (106-3), a sandstone layer (106-5), and any other geological layer. A fault plane (107) may extend through the formations. In particular, the geologic sedimentary basin includes rock formations and may include at least one reservoir including fluids, for example, the sandstone layer (106-5). The rock formations may include at least one seal rock, for example, the shale layer (106-6), which may act as a top seal. The rock formations may include at least one source rock, for example, the shale layer (106-4), which may act as a hydrocarbon generation source. The geologic sedimentary basin (106) may further contain hydrocarbon or other fluids accumulations associated with certain features of the subsurface formations. For example, accumulations (108-2), (108-5), and (108-7) associated with structural high areas of the reservoir layer (106-5) and containing gas, oil, water or any combination of these fluids.

Data acquisition tools (121), (123), (125), and (127), may be positioned at various locations along the field (101) or field (102) for collecting data from the subterranean formations of the geologic sedimentary basin (106), referred to as survey or logging operations. In particular, various data acquisition tools are adapted to measure the formation and detect the physical properties of the rocks, subsurface formations, fluids contained within the rock matrix and the geological structures of the formation. For example, data plots (161), (162), (165), and (167) are depicted along the fields (101) and (102) to demonstrate the data generated by the data acquisition tools. Specifically, the static data plot (161) is a seismic two-way response time. Static data plot (162) is core sample data measured from a core sample of any of subterranean formations (106-1 to 106-6). Static data plot (165) is a logging trace, referred to as a well log. Production decline curve or graph (167) is a dynamic data plot of the fluid flow rate over time. Other data may also be collected, such as historical data, analyst user inputs, economic information, and/or other measurement data and other parameters of interest.

The acquisition of data shown in FIG. 1 may be performed at various stages of planning a well. For example, during early exploration stages, seismic data may be gathered from the surface to identify possible locations of hydrocarbons. The seismic data may be gathered using a seismic source that generates a controlled amount of seismic energy. In other words, the seismic source and corresponding sensors (121) are an example of a data acquisition tool. An example of seismic data acquisition tool is a seismic acquisition vessel (141) that generates and sends seismic waves below the surface of the earth. Sensors (121) and other equipment located at the field may include functionality to detect the resulting raw seismic signal and transmit raw seismic data to a surface unit, e.g., the seismic acquisition vessel (141). The resulting raw seismic data may include effects of seismic wave reflecting from the subterranean formations (106-1 to 106-6).

After gathering the seismic data and analyzing the seismic data, additional data acquisition tools may be employed to gather additional data. Data acquisition may be performed at various stages in the process. The data acquisition and corresponding analysis may be used to determine where and how to perform drilling, production, and completion operations to gather downhole hydrocarbons from the field. Generally, survey operations, wellbore operations and production operations are referred to as field operations of the field (101) or (102). These field operations may be performed as directed by the surface units (141), (145), (147). For example, the field operation equipment may be controlled by a field operation control signal that is sent from the surface unit.

Further as shown in FIG. 1, the fields (101) and (102) include one or more wellsite systems (192), (193), (195), and (197). A wellsite system is associated with a rig or a production equipment, a wellbore, and other wellsite equipment configured to perform wellbore operations, such as logging, drilling, fracturing, production, or other applicable operations. For example, the wellsite system (192) is associated with a rig (132), a wellbore (112), and drilling equipment to perform drilling operation (122). A wellsite system may be connected to a production equipment. For example, the well system (197) is connected to the surface storage tank (150) through the fluids transport pipeline (153).

The surface units (141), (145), and (147), may be operatively coupled to the data acquisition tools (121), (123), (125), (127), and/or the wellsite systems (192), (193), (195), and (197). In particular, the surface unit is configured to send commands to the data acquisition tools and/or the wellsite systems and to receive data therefrom. The surface units may be located at the wellsite system and/or remote locations. The surface units may be provided with computer facilities (e.g., an E&P computer system) for receiving, storing, processing, and/or analyzing data from the data acquisition tools, the wellsite systems, and/or other parts of the field (101) or (102). The surface unit may also be provided with, or have functionality for actuating, mechanisms of the wellsite system components. The surface unit may then send command signals to the wellsite system components in response to data received, stored, processed, and/or analyzed, for example, to control and/or optimize various field operations described above.

The surface units (141), (145), and (147) may be communicatively coupled to the E&P computer system (180) via the communication links (171). The communication between the surface units and the E&P computer system (180) may be managed through a communication relay (170). For example, a satellite, tower antenna or any other type of communication relay may be used to gather data from multiple surface units and transfer the data to a remote E&P computer system (180) for further analysis. Generally, the E&P computer system (180) is configured to analyze, model, control, optimize, or perform management tasks of the aforementioned field operations based on the data provided from the surface unit. The E&P computer system (180) may be provided with functionality for manipulating and analyzing the data, such as analyzing seismic data to determine locations of hydrocarbons in the geologic sedimentary basin (106) or performing simulation, planning, and optimization of E&P operations of the wellsite system. The results generated by the E&P computer system (180) may be displayed for a user to view the results in a two-dimensional (2D) display, three-dimensional (3D) display, or other suitable displays. Although the surface units are shown as separate from the E&P computer system (180) in FIG. 1, in other examples, the surface unit and the E&P computer system (180) may also be combined. The E&P computer system (180) and/or surface unit may correspond to a computing system, such as the computing system shown in FIGS. 5.1 and 5.2 and described below.

The figures show diagrams of embodiments that are in accordance with the disclosure. The embodiments of the figures may be combined and may include or be included within the features and embodiments described in the other figures of the application. The features and elements of the figures are, individually and as a combination, improvements to the technology of machine learning systems. The various elements, systems, components, and blocks shown in the figures may be omitted, repeated, combined, and/or altered as shown from the figures. Accordingly, the scope of the present disclosure should not be considered limited to the specific arrangements shown in the figures.

Figure 2:
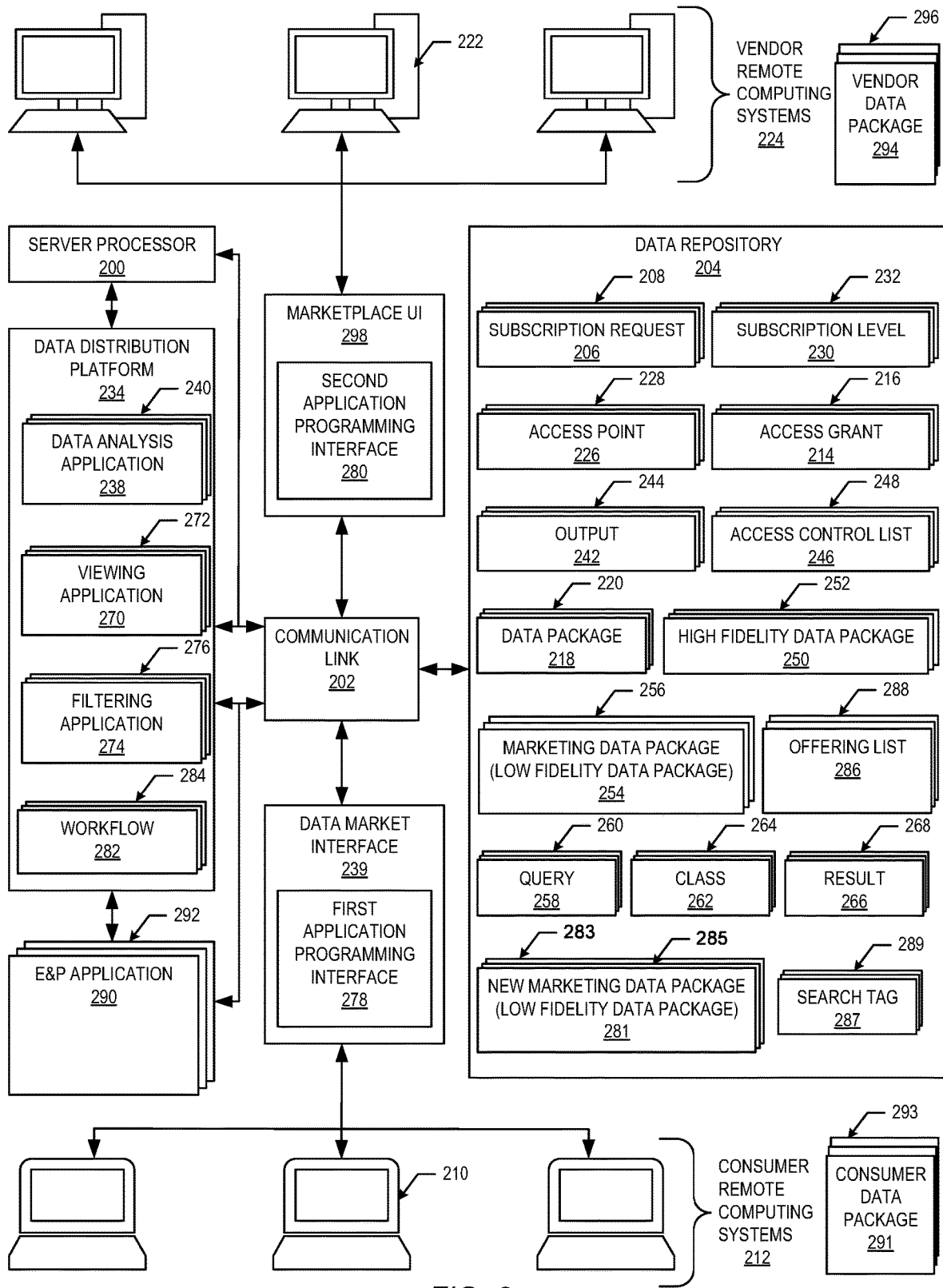
FIG. 2 shows a computing system, in accordance with one or more embodiments.

FIG. 2 shows a computing system, in accordance with one or more embodiments. The system shown in FIG. 2 is useable with respect to the exploration and production system shown in FIG. 1. Components of the system shown in FIG. 2 may be executed using the computing system and network environment described with respect to FIG. 9.1 and FIG. 9.2.

The system shown in FIG. 2 includes a server processor (200). The server processor (200) is one or more hardware processors, or logical processors supported by hardware processors, that possibly operate in a distributed computing environment. The server processor (200) may be, for example, the computer processor(s) (902) shown in FIG. 9.1.

The system shown in FIG. 2 also includes a communication link (202) in communication with the server processor (200). The communication link (202) is one or more wired and/or wireless communication channels within a data processing system, or between different data processing systems in a distributed computing environment. The network (920) in FIG. 9.2 is an example of the communication link (202).

The system shown in FIG. 2 also includes a first remote computing system (210) among possibly a number of consumer remote computing systems (212). The first remote computing system (210) is one or more computers used by a consumer of data in the one or more embodiments. The first remote computing system (210) communicates with the data distribution platform (234) (described below) via a data analysis application (238) (described below) using the communication link (202). The term "first" in the context of computing systems is a naming convention used in order to distinguish consumer computing systems from vendor computer systems belonging to different companies or individuals.

As used herein, the term "remote" means "physically or logically isolated." Thus, for example, the vendor, the consumer, and the data distribution platform computing system have isolated computing environments. The first remote computing system (210), second remote computing system (222), and data distribution platform (234) are remote from in that they are isolated. The isolation may be with respect to having separate machines and/or geographical isolation.

The first remote computing system (210) is pre-entitled to a consumer data package (291) among possibly multiple consumer data packages (293). The consumer data package (291) is data useable by one of the applications described further below, such as the data analysis application (238), the workflow (282), and the E&P application (290). The term "entitled" is defined as owning or otherwise having some level of access to a data file, whether or not stored on the data repository (204) or on a storage device local to the first remote computing system (210) or the second remote computing system (222). The term "pre-entitled" is defined as "entitled," prior to operation of the methods described with respect to FIG. 3.1 through FIG. 5.2 to obtain a new data package. For example, the "pre-entitlement" may be based on the first remote computing system having created the consumer data package or the first remote computing system having previously acquired access rights to the consumer data package.

The system shown in FIG. 2 also includes a second remote computing system (222) among possibly a number of vendor remote computing systems (224). The second remote computing system (222) and the vendor remote computing systems (224) are distinct from the first remote computing system (210) and the consumer remote computing systems (212). The term "distinct" means that the consumer remote computing systems (212) and the vendor remote computing systems (224) are on separate networks and either owned by different persons or business entities, or logically separated. In the one or more embodiments, the first remote computing system (210) and the second remote computing system (222) do not exchange a data package (218), except as facilitated by the data distribution platform (234) as described further below.

The vendor remote computing systems (224) are pre-entitled to a vendor data package (294) among possibly multiple vendor data packages (296). The vendor data package (294) is a data package that contain valuable data to which one or more of the consumer remote computing systems (212) may desire to have access. Treatment of the exchange of, or access to, the multiple vendor data packages (296) is described with respect to FIG. 3.1 through FIG. 5.2.

The system shown in FIG. 2 also includes a data distribution platform (234). The data distribution platform (234) is one or more server computing systems supported by or executed on the server processor (200). The data distribution platform (234) at least includes applications that facilitate the exchange of data between the first remote computing system (210) or consumer remote computing systems (212) and the second remote computing system (222) or the vendor remote computing systems (224). The functionality is embodied as computer readable program code reflected in the methods described with respect to FIG. 3.1 through FIG. 5.2.

The data distribution platform (234) is interposed between the first remote computing system (210) and the second remote computing system (222), different than the first remote computing system (210). The term "interposed" means that the first remote computing system (210) and the second remote computing system (222) do not directly communicate, unless facilitated by the data distribution platform (234). In some cases, the first remote computing system (210) and the second remote computing system (222) do not communicate, as data is exchanged between the first remote computing system (210) and the data distribution platform (234), or between the second remote computing system (222) and the data distribution platform (234).

The data distribution platform (234) may include a number of additional software applications or services. For example, the data distribution platform (234) may support a data analysis application (238) among possibly multiple data analysis applications (240). The data analysis application (238) is a software application designed to take a data package as input, such as data package (218) or high fidelity data package (250) described below, and output an analysis result of interest to the first remote computing system (210). For example, the data analysis application (238) may be seismic data that can be used to render underground structures at a potential drill site. However, the data analysis application (238) could be some other type of analysis not directly related to E&P, such as for example a financial analysis relevant to a particular wellsite.

In an embodiment, the data analysis application (238) may not be part of the data distribution platform (234), but may be executed on the first remote computing system (210) or the second remote computing system (222). Nevertheless, the data distribution platform (234) still acts as an intermediator of the multiple data packages (220), as defined and described below.

The data distribution platform (234) may also include a viewing application (270) among possibly multiple viewing applications (272). The viewing application (270) is a software application configured to display information contained in a marketing data package or teaser data package, such as the marketing data package (254) described further below. Thus, the viewing application (270) is useable to render sufficient information that a user of the first remote computing system (210) can determine if the corresponding high fidelity data package (250) is of interest.

The viewing application (270) presents a marketing view to the first remote computing system (210). A "marketing view" is defined as a representation of some aspect of a high fidelity data package (250) that conveys sufficient information to inform a user of the utility of the high fidelity data package (250). However, the "marketing view" representation also conveys insufficient data to grant the user the utility of the data. Thus, the marketing view is a view of the marketing data package (254) and/or the high fidelity data package (250) that prevents secure information from being displayed to the first remote computing system (210). "Secure information" is information designated by the second remote computing system (222) as being sensitive, secured, or otherwise restricted from presentation without obtaining a subscription level (230). The marketing view may be contained in the marketing data package (254).

In some embodiments, the viewing application (270) could also be the data analysis application (238) or the workflow (282) (described below). In some embodiments, the viewing application (270) may be executed on one or more of the consumer remote computing systems (212), in which case the data distribution platform (234) permits the consumer remote computing systems (212) to view the multiple marketing data packages (256).

The data distribution platform (234) may also include a filtering application (274) among possibly multiple filtering applications (276). The filtering application (274) is software application that takes, as input, the vendor data package (294), and produces as output the marketing data package (254) (described further below). In particular, the filtering application (274) removes sufficient data from the vendor data package (294) that the vendor data package (294) is no longer a high fidelity data package (250) (described further below), but is instead a new marketing data package (281) (described further below). The new marketing data package (281), which may be added to the multiple high fidelity data packages (252), may also be described as a low fidelity data package (also defined below).

In an embodiment, one or more of the multiple filtering applications (276) may be executed on the vendor remote computing systems (224). Nevertheless, the data distribution platform (234) remains the intermediator of the multiple data packages (220) as defined and described further below.

The data distribution platform (234) may also include a workflow (282) among possibly multiple workflows (284). The workflow (282) is a software application that supports the E&P process. The workflow (282) could be one or more of the multiple data analysis applications (240), or one or more of the multiple viewing applications (272), but may also include other types of software applications that are used during the E&P process.

For example, the workflow (282) could be a software application that displays a map of a region of the Earth and a list of known drilling sites and/or potential drilling sites in the region. A user of the first remote computing system (210) using the workflow (282) may be presented, as described further below with respect to FIG. 3.1 through FIG. 5.2, with one or more of the multiple marketing data packages (256) as a result of viewing the region. In this case, the multiple marketing data packages (256) relate to data that may be of interest to the user of the first remote computing system (210).

The workflow (282) also may be executed on one or more of the consumer remote computing systems (212) and/or the vendor remote computing systems (224). Nevertheless, the data distribution platform (234) remains the intermediator of the multiple data packages (220) as defined and described further below.

The system shown in FIG. 2 also may include an exploration and production (E&P) application (290) executable by the server processor (200). The E&P application (290) is an application used during the exploration and production process by an exploration and/or production company or individual. The E&P application (290) is distinct from the multiple data analysis applications (240) and/or the workflow (282) in that the E&P application (290) is dedicated solely to E&P functions. Thus, for example, while a E&P application (290) may be one of the multiple data analysis applications (240) and/or the multiple workflows (284), the converse may not be the case.

The E&P application (290) is used by the first remote computing system (210) during the exploration and/or production process. The E&P application (290) may also be used by the second remote computing system (222) in some embodiments.

One or more of the multiple E&P application (292) may be part of the data distribution platform (234) in some embodiments, but may also be logically separated from the data distribution platform (234) on some other broader platform which hosts both the E&P application (290) and the data distribution platform (234). In still other embodiments, the E&P application (290) may be hosted on the first remote computing system (210) and/or the second remote computing system (222), and not be part of the data distribution platform (234).

As indicated above, the consumer remote computing systems (212), the vendor remote computing systems (224), and the data distribution platform (234) communicate via the communication link (202). However, software, such as in the form of an application programming interface (API) may moderate the communication over the communication link (202).

Thus, for example, one or more of the consumer remote computing systems (212) communicate with the data distribution platform (234) via a data market interface (239). The data market interface (239) is one or more software applications that facilitate communication between the data distribution platform (234) and the first remote computing system (210) (and the consumer remote computing systems (212)).

The data market interface (239) includes a first application programming interface (278). An application programming interface (API) is a software interface that defines interactions between multiple software applications or mixed hardware-software intermediaries. The first application programming interface (278) defines calls or requests that can be made, data formats to be used, the conventions to follow, etc. The first application programming interface (278) can also provide extension mechanisms so that users can extend existing functionality. The first application programming interface (278) may be implemented using modular programming to permit users to use the first application programming interface (278) independently of the data distribution platform (234).

The data market interface (239) may have other programmed functions. For example, the data market interface (239) may present an access point (226) (defined below) to the first remote computing system (210). As described below, the access point (226) permits the first remote computing system (210) to access, or use without accessing, one or more of the multiple high fidelity data packages (252).

Attention is now turned to the marketplace UI application (298). The marketplace UI application (298) has a similar relationship to the second remote computing system (222) and other ones of the vendor remote computing systems (224) as the data market interface (239) has with respect to the first remote computing system (210) and the consumer remote computing systems (212).

Thus, for example, the second remote computing system (222) accesses the data distribution platform (234) over the communication link (202) via the marketplace UI application (298). The marketplace UI application (298) includes a second application programming interface (280).

The second application programming interface (280) is also an API, as defined above for the first application programming interface (278). However, first application programming interface (278) is configured to support the vendor remote computing systems (224). Thus, for example, the second application programming interface (280) may, if the user of the second remote computing system (222) desires, prevent one or more of the multiple vendor data packages (296) from being accessed directly on the data distribution platform (234). The marketplace UI application (298) may also enable the second remote computing system (222) to access the filtering application (274) in order to create one or more of the multiple marketing data packages (256). The marketplace UI application (298) may have other functions, to facilitate the functions described with respect to the methods of FIG. 3.1 through FIG. 5.2.

The one or more embodiments contemplate that the marketplace UI (298) and the data market interface (239) are a single logical application that facilitates communication between the data distribution platform (234) and the first remote computing system (210) and the second remote computing system (222). However, each set of computing systems is handled with a distinct API. Thus, for example, the first application programming interface (278) is used to communicate with the consumer remote computing systems (212) and the second application programming interface (280) is used to communicate with the vendor remote computing systems (224).

The system shown in FIG. 2 also includes a data repository (204) in communication with the server processor (200). The data repository (204) is a non-transitory computer readable storage medium which stores a variety of data used by the previously described components in FIG. 2 according to the methods described with respect to FIG. 3.1 through FIG. 5.2.

The data repository (204) stores a data package (218) among possibly multiple data packages (220). As used herein, the data package (218) is a set of logically related data that reflects valuable information that may be of interest to one or more users of the consumer remote computing systems (212). While the one or more embodiments use examples in the E&P industry (i.e., the data package (218) may be data relating to E&P), the one or more embodiments contemplate that the data package (218) could be any data set that is potentially valuable and could be traded. Thus, in different embodiments, the data distribution platform (234) could be a data broker for the pharmaceutical industry that trades data packages relating to the testing of drugs or compounds, in which case the data package (218) would relate to pharmacological data.

For the sake of reference, different types of the multiple data packages (220) are discussed herein. Thus, the data repository (204) may store a high fidelity data package (250) and possibly multiple high fidelity data packages (252). However, in some cases, one or more of the multiple high fidelity data packages (252) may be located on a second remote computing system (222), described further below, (i.e., vendor data processing systems).

In particular, a "high fidelity data package" is defined as a "data package" that contains sufficient data such that, when the high fidelity data package is provided as input to the data analysis program (238), the workflow (282), and/or the E&P application (290), the corresponding program outputs a valid result. A "valid result" is defined as an output of the corresponding program that satisfies a pre-determined criterion. Examples of the pre-determined criterion may be results deemed valid by a technician, a successful rendering of an image, a successful calculation within a pre-determined margin of error, etc.

For example, a "valid result" of the execution of the data analysis application (238) on an E&P high fidelity data package (250) could be a prediction or rendering of a distribution of an underground oilfield or other subterranean structures. Had insufficient data been present in the data package (218) that constitutes the high fidelity data package (250), then the prediction or rendering by the data analysis application (238) would not have been possible.

In contrast, the data repository (204) also stores low fidelity data packages, such as the marketing data package (254). A "low fidelity data package" is also a type of "data package." Specifically, a "low fidelity data package" is defined as a data package that contains insufficient data such that, when the low fidelity data package is provided as input to the data analysis program (238), the workflow (282), and/or the E&P application (290), the corresponding program outputs an invalid result. An "invalid result" is defined as an output of the corresponding program that fails to satisfy the pre-determined criterion described above. Thus, the multiple marketing data packages (256) cause the E&P application (290) to produce an invalid result. The invalid result does not mean that the E&P application (290) cannot use a marketing data package to display some information to a user (i.e., the intended low fidelity data), but rather the E&P application (290) will not produce a valid result with respect to a data analysis, object location, etc. for which the high fidelity data package (250) would be used.

As indicated above, one form of a low fidelity data package is a marketing data package (254). Thus, the data repository (204) also stores a marketing data package (254) and possibly multiple marketing data packages (256). A "marketing data package" is defined as a low fidelity data package that may also contain additional marketing materials such as the search tag (287), teasers (e.g., sufficient data for a partially valid result), polygons that show general but not specific well sites, etc.).

Examples of invalid results include: Failure to render an image, failure to perform a calculation, failure to be able to locate a specific well site, and/or outputting a calculation outside of a pre-determined range of error. Many other invalid results are contemplated, but may be assessed by a technician.

The multiple marketing data packages (256) may be on a one-for-one basis to the multiple high fidelity data packages (252). In other words, in one example, the marketing data package (254) corresponds to one high fidelity data package (250).

However, in another example, the multiple marketing data packages (256) may correspond to multiple ones of the multiple high fidelity data packages (252). For example, the marketing data package (254) may correspond to more than one of the multiple high fidelity data packages (252), such as when a vendor decides to market a collection of data packages.

In still another example, the multiple marketing data packages (256) may represent one high fidelity data package (250). For example, a vendor may wish to market a high fidelity data package (250) differently to different users, and thus present different multiple marketing data packages (256) to the different users.

The one or more embodiments contemplate at least the three relationships. Thus, the one or more embodiments contemplate a one-to-one mapping between the marketing data package (254) and the high fidelity data package (250), or a one-to-many mapping between the marketing data package (254) and the multiple high fidelity data packages (252), or a many-to-one mapping between the multiple marketing data packages (256) and the high fidelity data package (250).

Reference is also made to a new marketing data package (281) among possibly multiple new marketing data packages (283), of which may exist a subset of new marketing data packages (285). The subset of new marketing data packages (285) is a portion of the multiple new marketing data packages (283). A new marketing data package (281) is a marketing data package (254); however, the new marketing data package (281) is newly created by the second remote computing system (222). The new marketing data package (281) is added to the multiple marketing data packages (256).

The data repository (204) also stores other types of data. For example, the data repository (204) also stores an offering list (286). The offering list (286) is a list of one or more of the multiple marketing data packages (256) which the first remote computing system (210) may read in order to learn what multiple high fidelity data packages (252) are available. Thus, the offering list (286) includes a list of a subset of the marketing data packages (256). In one or more embodiments, the offering list (286) includes unique identifiers and descriptions of at least a subset of the marketing data packages (256).

The data repository (204) also stores a subscription request (206) among possibly multiple subscription requests (208). A subscription request (206) is a data file that the data distribution platform (234) can use to process a request from the first remote computing system (210) or others of the consumer remote computing systems (212) to access one of the high fidelity data package (250) (described further below). The subscription request (206) is generated by the first remote computing system (210) when the first remote computing system (210) uses the data market interface (239) to attempt to access the high fidelity data package (250). The subscription request (206) may be generated, in part, in response to the first remote computing system (210) using the viewing application (270) to view a marketing data package (254), and the user of the first remote computing system (210) deciding to purchase access to the high fidelity data package (250).

Related to the subscription request (206) is a subscription level (230). The subscription level (230) is a degree of access to a high fidelity data package (250). The subscription level (230) is determined by a subscription agreement between the first remote computing system (210) and the second remote computing system (222). The subscription agreement may also be facilitated by the data distribution platform (234), but in some cases may be arranged directly between the first remote computing system (210) and the second remote computing system (222).

Many different examples of the subscription level (230) exist. For example, the subscription level (230) permits access to part of the high fidelity data package (250), such as in the case where a specific type of measurement data in the high fidelity data package (250) is to be accessed. In another example, the subscription level (230) permits the first remote computing system (210) to use the high fidelity data package (250) with respect to data analysis application (238), the workflow (282), and/or the E&P application (290), but prevent the first remote computing system (210) from downloading or otherwise viewing the high fidelity data package (250). The subscription level (230) may also grant the first remote computing system (210) downloading and/or viewing privileges of the high fidelity data package (250). The subscription level (230) may be a number of users, a type of access, a length of time of access, and other restrictions. Other examples are possible.

The data repository (204) may store multiple subscription levels (232). The multiple subscription levels (232) may exist with respect to one high fidelity data package (250). Thus, for example, one user among the consumer remote computing systems (212) may have a first subscription level in the multiple subscription levels (232), but another user among the consumer remote computing systems (212) may have a second, different subscription level in the multiple subscription levels (232).

The multiple subscription levels (232) also contemplate that different ones of the multiple subscription levels (232) apply to different ones of the multiple subscription requests (208). A subscription request (206) which is approved may have a corresponding subscription level (230) or possibly multiple subscription levels (232).

Once access is granted by one of the vendor remote computing systems (224), the data repository (204) may store data related to facilitating the transaction of the high fidelity data package (250). For example, the data repository (204) stores an access point (226) among possibly multiple access points (228). The access point (226) is a software or hardware-established secured portal that permits the first remote computing system (210) to access the high fidelity data package (250) at the subscription level (230). The access point (226) is uniquely assigned to the first remote computing system (210) for a particular high fidelity data package (250) at the subscription level (230). Thus, for example, if the first remote computing system (210) requests multiple high fidelity data packages (252), then multiple access points (228) are assigned to the first remote computing system (210).

The access point (226) may not necessarily grant direct access to the high fidelity data package (250). As explained above, the access point (226) may grant the first remote computing system (210) the option of loading the high fidelity data package (250) into, for example, the data analysis application (238) while concurrently preventing the first remote computing system (210) from downloading or viewing or otherwise directly accessing the high fidelity data package (250). By grating indirect access, the combination of the data analysis application and the access points secures the high fidelity data while granting consumers use of the high fidelity data. However, if arranged according to the subscription agreement, the access point (226) could grant full access to the high fidelity data package (250) by the first remote computing system (210).

Related to the access point (226) is an access grant (214) among possibly multiple access grants (216). The access grant (214) is a data file that provides an indication from the second remote computing system (222) to the data distribution platform (234) that the first remote computing system (210) is granted access to the high fidelity data package (250) at the subscription level (230). The access grant (214) is also stored on the data repository (204). When the access grant (214) is generated, the data distribution platform (234) will facilitate access of the first remote computing system (210) to the high fidelity data package (250) via the access point (226), as described with respect to FIG. 3.1 through FIG. 5.2.

The data repository (204) also may store an access control list (246) among possibly multiple access control lists (248). The access control list (246) is a list of user identifiers which have access to the high fidelity data package (250) at the subscription level (230). The access control list (246) may also specify different subscription levels to different users. The access control list (246) may apply to multiple users of one organization. Thus, for example, multiple users at one organization may have differing levels of access to the high fidelity data package (250). Thus, the access control list (246) may be used to establish multiple access points (228) for the multiple different users. In another embodiment, the access control list (246) may specify multiple users in different organizations, in which case the data distribution platform (234) and/or the second remote computing system (222) are able to view the access control list (246).

The data repository (204) also may store an output (242) among possibly multiple outputs (244). The output (242) is one or more data files generated as an output of executing the data analysis application (238) or the multiple data analysis applications (240).

The output (242) is to be distinguished from a result (266). The data repository (204) may store a result (266) among possibly multiple results (268). The result (266) is the output of a query (258) among possibly multiple queries (260).

The query (258) is a computerized search for ones of the multiple marketing data packages (256) that match a class (262) or possibly multiple classes (264) of the multiple marketing data packages (256). Thus, for example, the first remote computing system (210) may submit a query (258) for a particular class (262) of the multiple marketing data packages (256). The term "class" (262) refers to a type or category. Examples of the class (262) may include multiple marketing data packages (256) that include seismic data, multiple marketing data packages (256) that describe subterranean structures, multiple marketing data packages (256) that describe geologic studies, etc. Other examples of data packages include basin data packages (including basin outlines, plays and petroleum systems, geological and exploration history, etc.); oil and gas midstream data packages (including transportation and processing data sets, pipelines, and facilities, etc.); oil and gas wells data packages; hydraulic fracturing data packages; and marine controlled source electromagnetic data packages. Many other examples of data packages exist.

The data repository (204) also stores a search tag (287) among possibly multiple search tags (289). The search tag (287) is metadata, or possibly a separate data file logically associated with a marketing data packages (254). The search tag (287) includes keywords, identifiers, etc. that facilitate the execution of the query (258) for a class (262) of the marketing data package (254).

While FIG. 2 shows a configuration of components, other configurations may be used without departing from the scope of the one or more embodiments. For example, various components may be combined to create one component. As another example, the functionality performed by one component may be performed by two or more components.

FIG. 3.1, FIG. 3.2, FIG. 4.1, FIG. 4.2, FIG. 5.1, and FIG. 5.2 show flowcharts of computer-implemented methods, in accordance with one or more embodiments. The methods of FIG. 3.1 through FIG. 5.2 may be executed using the system shown in FIG. 2 in the context of the exploration and production environment shown in FIG. 1. The methods of FIG. 3.1 through FIG. 5.2 are flows that are encodable into computer readable program code executable by one or more processors in a networked environment, such as the computing system and network environment shown with respect to FIG. 9.1 and FIG. 9.2.

Attention is first turned to FIG. 3.1 and FIG. 3.2. The method of FIG. 3.1 may be characterized as a method of presenting an offering list to a first remote computing system. The method of FIG. 3.2 may be characterized as a method of providing a subscription level to the first remote computing system.

Block 300 includes executing, by a server processor, an exploration and production (E&P) application in communication with a data distribution platform executed by the server processor. The E&P application is accessed by a first remote computing system external to the data distribution platform. The E&P application may be executed by the data distribution platform or a processor supporting the data distribution platform. The E&P application may be executed directly by the first remote computing system. The E&P application may be executed on an external server different than the server that supports the data distribution platform and also different than some processor that supports the first remote computing system.

Block 302 includes comparing, automatically by the data distribution platform, use of the E&P application to marketing data packages published on the data distribution platform by a second remote computing system external to the data distribution platform and different than the first remote computing system. The marketing data packages are low fidelity data packages and correspond to high fidelity data packages useable by the E&P application. Comparing generates an offering list including a subset of the marketing data packages.

The data distribution platform compares use of the E&P application to the marketing data packages according a number of different technique. For example, the E&P application may compare first attributes of the marketing data packages to second attributes of a consumer data package that is pre-entitled to the first remote computing system and usable by the E&P application. The subset of the marketing data packages are related to the consumer data package. For example, a search tag may of the marketing data package may be compared to one or more attributes of the consumer data package.

In a related example, comparing may further include visually overlaying first information from the marketing data packages with second information from the consumer data package In other words, while viewing a rendering of information from the consumer data package, an overlay or side-window of information from one or more of the marketing data packages may be presented concurrently with the information from the consumer data package.

Steps 300, 302, and 304 provide a solution to the technical challenge of allowing consumers of data to find relevant data, but satisfy the desire of data vendors to keep data secure. The marketing data package allow the discovery of valuable data, but the access controls by the data distribution platform prevent the consumers from viewing or downloading the high fidelity data packages without an appropriate agreement.

In another example, the data distribution platform may compare use of the E&P application to the marketing data packages by comparing the marketing data packages to a type of the E&P application. For example, if the E&P application analyzes seismic data, then marketing data packages including seismic data may be presented to the first remote computing system.

In yet another example, the data distribution platform may compare use of the E&P application to the marketing data packages by comparing the marketing data packages to an identity of the first remote computing system. For example, if the first remote computing system uses the E&P application as part of a natural gas exploration operation, then the data distribution platform may offer marketing data packages pertinent to the natural gas exploration operation.

In still another example, the data distribution platform may compare use of the E&P application to the marketing data packages by comparing the marketing data packages to physical locations of sites being analyzed by the E&P application. For example, if the E&P application is being used to analyze well sites in the State of Texas in the United States of America, then the data distribution platform may present marketing data packages relevant to well sites local to the State of Texas.

In another example, the data distribution platform may compare use of the E&P application to the marketing data packages by comparing the marketing data packages to a request for marketing data packages submitted by the first remote computing system to the data distribution platform. For example, while operating the E&P application, the first remote computing system may specifically request the data distribution platform to search for marketing data packages that are of interest to the user of the first remote computing system. In this case, the request is made outside the E&P application, such as through a workflow.

In still another example, the data distribution platform may compare use of the E&P application to the marketing data packages by comparing the marketing data packages to a request for marketing data packages submitted by the first remote computing system via the E&P application. In other words, the request for marketing data packages may be performed through a command of the E&P application.

The above examples do not limit other techniques for comparing use of the E&P application to the marketing data packages. For example, combinations of the above examples may be used, or other examples are possible.

Returning to FIG. 3.1, block 304 includes presenting the offering list to the first remote computing system. Presenting is performed using a number of methods, including showing the user a display of a marketing data package, storing a marketing data package on the first remote computing system for later use, or one of the display methods described above.

In one embodiment, the method of FIG. 3.1 may terminate thereafter. However, other variations are possible. For example, FIG. 3.2, may be a continuation of FIG. 3.1 (i.e., after Block 304). FIG. 3.2 also may be executed independently of the method of FIG. 3.1, such as when the offering list already exists.

Block 306 includes receiving, at the data distribution platform from the first remote computing system, a subscription request to a high fidelity data package, in the high fidelity data packages, corresponding to a marketing data package in the offering list. The high fidelity data package is entitled to the second remote computing system. The subscription request may be performed via a first application programming interface of a data market interface. The subscription request may be performed from within a data analysis application, workflow, or E&P application.

Block 308 includes receiving, at the data distribution platform from the second remote computing system, a subscription level for the high fidelity data package, the subscription level assigned to the first remote computing system. An approval is generated at the second remote computing system (222), and then provided to the data distribution platform. For example, the subscription level may be received from the second remote computing system (222) via a second application programming interface of a marketplace UI.

Block 310 includes providing, at the subscription level, the high fidelity data package as input to the E&P application. The input may also be provided to a workflow or to a data analysis application.

Steps 306, 308, and 310 provide a solution to the technical challenge of allowing consumers of data to subscribe to high fidelity data packages, but satisfy the desire of data vendors to keep data secure. The access point allows the data distribution platform to secure when and how and the quantity data (among possibly other terms) permitted to a consumer. In some cases, the data distribution platform created access point allows a vendor to retain total control and ownership of data, but still allow consumers access to the data in a manner meaningful to the user.

Providing the high fidelity data package may be performed by permitting the E&P application to access the vendor data package on the vendor remote computing systems. In another embodiment, the E&P application may access a high fidelity data package that the vendor permits to be stored on a data repository of the data distribution platform.

Access may be granted by establishing, by the data distribution platform, a unique access point from the data distribution platform to the second remote computing system. Then, access is provided by granting, via the unique access point to the first remote computing system, access to a high fidelity data package, in the high fidelity data packages, that corresponds to a marketing data package in the marketing data packages.

Access may be a read-only access. Thus, the application may read the high fidelity data package or vendor data package, but not write or download the information. The read-only access is enforced by using a read-only data structure to contain the high fidelity data package or vendor data package. A read-only data structure is a data structure which includes instructions that prevent a computing system from performing a write operation or a download operation on the read-only data structure.

Access may be a blind access. A blind access means that the application can receive the data as input, but the first remote computing system is restricted to accessing an output of the application. The first remote computing system does not see, and cannot download, the high fidelity data package or the vendor data package.

Access may be a full access. In this case, the first remote computing system may download or see the high fidelity data package or the vendor data application and use the data as desired with respect to the application or any other process desired by the consumer of the data.

The one or more embodiments described with respect to FIG. 3.1 may be further varied. Additional blocks or variations of the above-described blocks are possible.

For example, either the method of FIG. 3.1 or the method of FIG. 3.2, or a combination thereof, may include executing, by the server processor, a marketplace user interface (UI) application in communication with the data distribution platform. The second remote computing system accesses the data distribution platform via an application programming interface of the marketplace UI application. Thus, the data distribution platform is responsible for executing the marketplace UI, which permits the second remote computing system to communicate with the data distribution platform.

Continuing the example, the method of FIG. 3.1 or the method of FIG. 3.2, or a combination thereof, may then include receiving a vendor data package from the second remote computing system via the marketplace UI application. For example, the second remote computing system may upload the vendor data package to the data repository of the data distribution platform. In another embodiment, the data distribution platform may access the vendor data package on the second remote computing system or may pull the vendor data package from the second remote computing system to the data repository.

Continuing the example, the method of FIG. 3.1 or the method of FIG. 3.2, or a combination thereof, may include generating, by a filtering application on the data distribution platform, a new marketing data package from the vendor data package. Filtering includes removing sufficient data from the vendor data package that the vendor data package is no longer a high fidelity data package, but rather becomes a marketing data packages. For example, locations may be generalized from specific coordinates to a relatively wide area. Raw data may be stripped from the data package. Many different filtering techniques are contemplated.

Continuing the example, the method of FIG. 3.1 or the method of FIG. 3.2, or a combination thereof, may include adding the new marketing data package to the marketing data packages. Adding may be accomplished by indexing the new marketing data package and possibly adding one or more search tags to the new marketing data package.

Continuing the example, other operations may be performed. For example, the method of FIG. 3.1 or the method of FIG. 3.2, or a combination thereof, may include grouping a subset of new marketing data packages from the new marketing data packages; and adding, as one new marketing data package, the subset of new marketing data packages to the marketing data packages. In other words, a marketing data packages may be packaged by combining multiple marketing data packages.

Other variations of the method of FIG. 3.1 and the method of FIG. 3.2 are possible. For example, the method of FIG. 3.1 or the method of FIG. 3.2, or a combination thereof, may include executing, by the server processor, a marketplace user interface (UI) application in communication with the data distribution platform. The second remote computing system accesses the data distribution platform via an application programming interface of the marketplace UI application.

In this case, the method of FIG. 3.1 or the method of FIG. 3.2, or a combination thereof, may include executing, by the server processor, a data market interface application in communication with the data distribution platform. The first remote computing system accesses the data distribution platform via an application programming interface of the data market interface application. The method of FIG. 3.1 or the method of FIG. 3.2, or a combination thereof, may then include receiving, at the data distribution platform via the application programming interface from the first remote computing system, a subscription request to a high fidelity data package corresponding to a marketing data package in the offering list. The high fidelity data package is entitled to the second remote computing system. The subscription request may be submitted as described above with respect to FIG. 3.2.

Additional security may be provided to the method of FIG. 3.1, the method of FIG. 3.2, or a combination thereof. For example, the method of FIG. 3.1, the method of FIG. 3.2, or a combination thereof may include receiving, at the data distribution platform, an authentication from the first remote computing system. The authentication request may be received a security layer of the first remote computing system before the first remote computing system can access the data distribution platform. Then, additional blocks may be performed, as described with respect to the method of FIG. 3.1, the method of FIG. 3.2, a combination thereof, or the variations described above.

Attention is now turned to FIG. 4.1 and FIG. 4.2, which show other methods of the one or more embodiments. The method of FIG. 4.1 may be characterized as a method of publishing a marketing data package. The method of FIG. 4.2 may be characterized as a method of retrieving a high fidelity data package.

Block 400 includes receiving, at a data distribution platform, a selection of a data package including a high fidelity data package. The selection may be received from the second remote computing system via a marketplace UI. The selection may be received from within an E&P application, a data analysis application, or some other workflow of the data distribution platform. The selection may also be received independent of the execution of applications on the data distribution platform (i.e., directly from the second remote computing system). For example, the vendor remote computing systems may be used to select one or more multiple vendor data packages and/or multiple high fidelity data packages.

Block 402 includes filtering, automatically by a filtering application of the data distribution platform, the high fidelity data package to form a marketing data package. Filtering includes removing sufficient data from the high fidelity data package such that the marketing data package becomes a low fidelity data package. Examples of filtering include filtering a block of data, filtering a well location, filtering a report, filtering a log, filtering information on a licensing round, filtering an attribute, hiding an attribute, replacing a location with a polygon larger than the location, and combinations thereof. Other examples of filtering are possible.

Block 404 includes publishing the marketing data package within the data distribution platform. Publishing is accomplished by permitting the first remote computing system or the consumer computing systems to be able to view the marketing data package. Publishing may also be accomplished by automatically suggesting the marketing data package when a consumer is using a workflow, data analysis application, or E&P application on the data distribution platform.

The filtering aspect of the one or more embodiments provides a technical solution to the technical issue of how to present sufficient information to a consumer to enable the consumer to decide to purchase data, and yet retain enough control of the data that the vendor does not lose control of the data. Thus, the filtering and publishing of the marketing data packages permits concurrent discovery and security of the high fidelity data packages.

The method of FIG. 4.1 may be extended to include the method of FIG. 4.2. However, FIG. 4.2 may stand as an independent method, such as when the marketing data package is already accessible to the data distribution platform.

Block 406 includes receiving, at the data distribution platform, a subscription request from a first remote computing system, the subscription request based on the marketing data package. The subscription request may be received directly from a first remote computing system, or from within a workflow, data analysis application, or E&P application executed on the data distribution platform. The subscription request is delivered to the second remote computing system for approval. The second remote computing system transmits an approval, such as in the form of a subscription level or an access grant, to the data distribution platform.

Block 408 includes retrieving the high fidelity data package from a second remote computing system, separate from the data distribution platform. The high fidelity data package may be retrieved by the data distribution platform for later use. In another embodiment, the second remote computing system may maintain control of the high fidelity data package, and grant access to the high fidelity data package via an access point granted via the data distribution platform.

Variations of the methods of FIG. 4.1 and FIG. 4.2 are possible. For example, the method of FIG. 4.1, the method of FIG. 4.2, or a combination thereof may include storing the marketing data package on the data distribution platform. In this case, the method of FIG. 4.1, the method of FIG. 4.2, or a combination thereof may also include preventing the marketing data package from being downloaded external to the data distribution platform. Prevention may be accomplished by granting read-only access to a first remote computing system, or by displaying the marketing data packages in a workflow, data analysis program, or E&P application executed on the data distribution platform.

The marketing data packages may be searched. For example, the method of FIG. 4.1, the method of FIG. 4.2, or a combination thereof may include receiving, at the data distribution platform from a first remote computing system separate from the data distribution platform, a query to search for a class within the marketing data packages. The query may be performed directly from the first remote computing system to the data repository hosting the marketing data package. In another embodiment, the query may be performed from within a data analysis program, workflow, or E&P application while the first remote computing system is using the program, workflow, or application.

After receiving the query, the method of FIG. 4.1, the method of FIG. 4.2, or a combination thereof may include determining, by the data distribution platform, a result of the query. The result is a set of marketing data packages that satisfies the class. The method of FIG. 4.1, the method of FIG. 4.2, or a combination thereof may then include presenting, by a viewing application executed by the data distribution platform, a marketing view of the marketing data package to the first remote computing system. In this manner, the data consumer may decide for which high fidelity data packages the data consumer wishes to purchase a subscription level.

Additional security may also be added. For example, the method of FIG. 4.1, the method of FIG. 4.2, or a combination thereof may include permitting a first remote computing system that has been authenticated by the data distribution platform to view the marketing data package. Thus, the marketing data packages are not distributed to the public, but rather restricted to authenticated users known to be legitimate consumers of E&P data.

After publication of the marketing data package, the data distribution platform may facilitate distribution of the high fidelity data packages. For example, the method of FIG. 4.1, the method of FIG. 4.2, or a combination thereof may include receiving, at the data distribution platform and from a first remote computing system, a subscription request to access the high fidelity data package. Receipt of the subscription request is described above. Then, the method(s) may also include receiving, at the data distribution platform and from a second remote computing system after receiving the subscription request, an access grant to access the high fidelity data package. Receipt of the access grant is described above.

Then, the method(s) may include facilitating, by the data distribution platform, access by the first remote computing system to the high fidelity data package. Facilitating may be accomplished by generating an access point and permitting the first remote computing system to access the high fidelity data package via the access point. Facilitating may also be accomplished by transmitting, from the data distribution platform to the first remote computing system, the high fidelity data package. Facilitating may also be accomplished by granting a workflow, data analysis application, or E&P application used by the first remote computing system to have access to the high fidelity data package, but preventing the first remote computing system from viewing the high fidelity data package.

Stated differently, facilitating may be permitting the first remote computing system to access the high fidelity data package stored on the data distribution platform. Facilitating also may be permitting the first remote computing system to access the high fidelity data package stored on the second remote computing system. Facilitating also may be permitting the first remote computing system to execute a data analysis application on the high fidelity data package while preventing the high fidelity data package from being downloaded by the first remote computing system. Facilitating also may be executing a data analysis application by the data distribution platform on the high fidelity data package and presenting an output of the data analysis application to the first remote computing system.

Still other variations are possible. For example, assume a first remote computing system accesses the data distribution platform via a first application programming interface of the data distribution platform, and the high fidelity data package is provided by a second remote computing system via a second application programming interface of the data distribution platform. In this case, the method of FIG. 4.1, the method of FIG. 4.2, or a combination thereof may include permitting the first remote computing system to access a workflow executed on the data distribution platform. Access is permitted as described above. Then, the method of FIG. 4.1, the method of FIG. 4.2, or a combination thereof may include publishing by permitting the first remote computing system to view the marketing data package via the workflow.

FIG. 5.1 and FIG. 5.2 show other methods of the one or more embodiments. FIG. 5.1 may be characterized as a method for controlling access of a first remote computing system to a data package. FIG. 5.2 may be characterized as a method for controlling access at block 506 in FIG. 5.1.

Block 500 includes receiving, at a data distribution platform, a subscription request by a first remote computing system to access a data package controlled by a second remote computing system. The data distribution platform is interposed between the first remote computing system and the second remote computing system. The subscription request may be received via a first application programming interface of a data market interface.

Block 502 includes establishing, on the data distribution platform, an access point including a secured portal accessible by the first remote computing system. The access point is uniquely associated with the data package. The access point may be established by the data distribution platform to the data distribution platform or by the data distribution platform to one or more of the vendor remote computing systems (224). In a variation, the data distribution platform may cause the first remote computing system to enter authentication information to open the access point.

Block 504 includes assigning, by the data distribution platform, a subscription level to the access point for the data package. Assigning the subscription level is performed by one or more of the second remote computing systems. Assigning the subscription level may also be performed by the data distribution platform according to one or more policies or rules.

Block 506 includes controlling, by the data distribution platform via the access point, access of the first remote computing system to the data package according to the subscription level. Controlling access may be performed by any of the control techniques described at Block 310 of FIG. 3.2. For example, controlling access may include permitting a program to access the data package, and permitting the first remote computing system to view a result of the program. Controlling access may include granting read-only access by the first remote computing system to the data package. Controlling access may include granting full access by the first remote computing system to the data package. Other examples of controlling access are possible.

The method of FIG. 5.1 is a technical solution to the technical issue of maintaining data security in a data distribution platform that is also designed to make valuable data discoverable. The access point allows the data distribution platform to specifically target specific users and/or specific computers and grant high specific and differing levels of access to the different users and computers. Thus, data security is maintained for the data vendors, but the data consumers retain the usability of the high fidelity data packages with respect to using the desired data analysis applications, workflows, E&P applications, etc.

The method of FIG. 5.1 may be varied. For example, the method of FIG. 5.1 may also include establishing a data market interface between vendor computing systems that provide data packages and consumer computing systems that consume the data packages. The data market interface is then used by the first remote computing systems to access the data packages via access points.

The method of FIG. 5.1 may also include establishing, on the data distribution platform, a second access point to a third remote computing system. The second access points grants a different subscription level to the data package. Thus, for example, a second remote computing system may grant different companies, users, or computing systems potentially differing levels of access to the same data package.

For example, the first remote computing system may be accessed by a first user of a first entity. In this case, the third remote computing system is accessed by a second user of the first entity. In another embodiment, the third remote computing system is accessed by a second user of a second entity, different than the first entity. Thus, the data processing system may grant access to a data package to many different subscription levels by many different consumers.

Other variations of the method of FIG. 5.1 are also possible. For example, the method of FIG. 5.1 may also include executing a data analysis application on the data distribution platform. In this case, controlling includes granting the first remote computing system authorization to view an output of a data analysis of the data package as performed by the data analysis application.

Another variation of the method of FIG. 5.1 is the method of FIG. 5.2. FIG. 5.2 is an example of controlling access at block 506 of FIG. 5.1. The method of FIG. 5.2 is executed by a data distribution platform.

Block 508 includes permitting the first remote computing system to order execution of a data analysis application on the second remote computing system. Permitting may be accomplished by authenticating a user's access to the data distribution platform via the first remote computing system. The data analysis application outputs an output.

Block 510 includes permitting the first remote computing system to view the output via the access point. For example, the first remote computing system can view a result of a calculation or a map generated from seismic data, or some other output. However, the first remote computing system is prevented from directly accessing the data package or is denied access to the data package. In this manner, the data package is secured, as desired by the second remote computing system (the vendor), but still useful to the first remote computing system (the consumer).

In another variation, the data distribution platform might not have access to the data package. For example, the data package may be maintained on the second remote computing system. In this case, the second remote computing system grants a level of access to the data distribution platform in order to provide a subscription level to the data package to one or more consumer remote computing systems. However, the one or more embodiments also contemplate receiving the data package at the data distribution platform and maintaining the data package on the data distribution platform.

In another variation of FIG. 5.1, controlling at block 506 may include use of an access control list. In this case, the block 506 may include receiving an access control list including different user identifications of different users of the first remote computing system. The access control list may be received from the first remote computing system as part of a subscription request, from the second remote computing system as part of restrictions on the use of the data package, or generated automatically by the data distribution platform as part of generating an access point.

In any case, controlling access may include granting differing levels of access to the different users of the access control list. Thus, for example, a first user of an organization may be granted full access to the data package. However, in another example, a second user of the same organization may be granted permission to cause a data analysis application, workflow, or E&P application to access the data package, but not to otherwise view or download the data package.

While the various blocks in the flowcharts are presented and described sequentially, one of ordinary skill will appreciate that the blocks may be executed in different orders, may be combined or omitted, and the blocks may be executed in parallel. Furthermore, the blocks may be performed actively or passively. For example, some blocks may be performed using polling or be interrupt driven in accordance with one or more embodiments. By way of an example, determination blocks may not cause a processor to process an instruction unless an interrupt is received to signify that condition exists in accordance with one or more embodiments. As another example, determination blocks may be performed by performing a test, such as checking a data value to test whether the value is consistent with the tested condition in accordance with one or more embodiments. Thus, the one or more embodiments are not necessarily limited by the examples provided herein.

FIG. 6.1 through FIG. 8.2 present specific examples of the techniques described above with respect to FIG. 2 through FIG. 5.2. The following examples are for explanatory purposes and not intended to limit the scope of the one or more embodiments.

Attention is first turned to FIG. 6.1 through FIG. 6.16, which show examples of a data distribution platform in use, in accordance with one or more embodiments. In particular, FIG. 6.1 through FIG. 6.16 show screenshots and different architectures for the data distribution platform and system shown in FIG. 2. Thus, FIG. 6.1 through FIG. 6.16 show in-use examples of both the system of FIG. 2 and the methods of FIG. 3.1 through FIG. 5.2, in the context of the exploration and production system shown in FIG. 1.

Turning to FIG. 6.1, shown is a data flow between an consumer (600) and a content provider (602). The consumer (600) is an E&P company determining whether to begin drilling operations at a potential drill site. The content provider (602) has valuable E&P data of interest to the consumer (600).

An explorationist (604) is a technician responsible for data discovery and analysis. The explorationist (604) performs data discovery (606), data selection (608), data package selection (610) and requests data package access (612).

An administrator of the same company to which the explorationist (604) belongs vies the data package access request (614). The administrator views current company subscriptions (616) to data. A determination is made whether a data package subscription exists (618) for the data package. If "no", then the administrator approves contacts a producer (620) of the data. In another embodiment, the administrator contacts a vendor, who may not have produced the data package but who has the right to sell the use of the data package.

On the content provider (602) side, the request from the administrator is received and the request is viewed (622). The provider initiates an agreement (624). Optionally, negotiations are performed as to the terms of the subscription agreement. However, the subscription agreement may be automatically performed by a data distribution platform, in some cases.

Once the agreement is finalized (626), a subscription is created (628) for the consumer (600). A subscription for the finalized data packages is created (630). The subscription is returned by the data distribution platform to the administrator of the consumer (600), who again views the subscription at (616). The administrator then assigns, at (632), the data package access at the subscription level to users, such as the explorationist (604).

Returning to decision (618), once the data package subscription exists, the administrator approves the request to access the data package (634). The explorationist (604) then views the data (636) and accesses the data package (638) according to the terms of the subscription level, as enforced by the data distribution platform.

A different presentation of the one or more embodiments is now described. Currently in the E&P industry, there are technical several challenges when providing access of available data to data consumers and learning the insights from the data. From a consumer perspective, the time spent on finding data can range from weeks to months, which can be an undesirable constraint when looking for new drilling or production sites.

In such scenarios, decisions are made with the inadequate, but available data. Although additional useful data may be available somewhere in the world, the awareness of the existence of the data and the accessibility of the data remain a technical challenge. For example, if an operator is interested in a basin and desires data to evaluate exploration of the basin, the operator will identify and contact various data providers before starting to evaluate the purchase of data.

For the E&P content providers, the challenges are global awareness and visibility to the interested market. The following lists down the various challenges faced by the data providers and data consumers in the E&P industry today. The challenges for E&P data consumers include a fragmented market: the consumer is unable to find available data in one place. The E&P data consumers also suffer from a lack of awareness of potentially valuable information, long lead times to procure E&P data, difficult in maintaining relevant and up-to-date data, difficulty in determining the quality of data before purchase, difficulty in handling multiple formats of data when consuming data, and/or managing subscriptions across an organization and more.

The E&P data providers also face their own technical challenges. The E&P data providers have difficulty with global market exposure, because due to the difficulties in marketing data without exposing the valuable data. The E&P data providers also have difficulties with maintaining data versioning and updates, data delivery and formatting for consumption, controlling derivatives, sales lifecycle and contract management, and keeping up with industry digital evolutions.

The one or more embodiments address this and other technical challenges by bringing the data providers and the data consumers on one data distribution platform. The data distribution platform closes the gap of the market silos created due to a fragmented E&P data market. In particular, the data distribution platform brings the content providers in one place and bringing the global data in one platform for the customers for easy access.

The data distribution platform of the one or more embodiments is built on a secure, reliable, and robust digital foundation with a user-centric design to accelerate client's performance and business in the E&P industry. The data distribution platform reduces the time from data discovery and enables immediate data delivery with digital delivery mechanism enabled by the access via entitlements. A consumer can use the data distribution platform to manage subscriptions in one place and perform subscription management for data packages.

The content providers control their data derivates and updates on the data distribution platform with data updates. The content providers enable immediate delivery, thereby reducing the time to get access to current data. The data distribution platform shortens the sales lifecycle and reduces the time to achieve the sales goals.

The data distribution platform provides a digital platform for E&P content providers to connect with potential clients globally, enabling the discovery of their data and their company to showcase their value. The data distribution platform enables the above functions by enabling potential customers of the content providers to quickly discover E&P data and content faster in the context of workflows executed on the data distribution platform. The data distribution platform highlight the differentiation of content provider data via marketing data packages. The data distribution platform reduces the turnaround time from clients decision-making to purchase with a shortened sales cycle and reduced cost of sales, as available data is searchable and presented automatically. The data distribution platform enables content providers to have a fully controlled and secured mechanism to deliver data immediately and manage the updates as frequently as desired, but without sacrificing control over the data. The data distribution platform enables an end to end workflow of data discovery to data delivery based on digital foundation.

The data distribution platform may be described as operating according to a number of steps. At block 1, content providers package their data as suited for their customers. The content providers view available data. The content provider chooses the content the content provider has right to sell via subscription. The content provider packages the content into data packages, possibly without making multiple copies of data.

At block 2, content providers prepare data for marketing on a digital platform and publish the marketing data to users. The content providers market the data packages using a marketing profile associated with the marketing data package (details, images, videos, documents) to showcase the value of the data. The content providers define a marketing representation for the data package. The representation is restricted to containing marketing information until a consumer subscribes to a corresponding high fidelity data package. The content provider publishes the marketing data package when ready.

At block 3, data is discovered by the potential data consumers. The data consumers read through the marketing information provided by the content providers (text, videos, documents, images), etc., in the form of the marketing data packages. Upon publication, marketing data and marketing package profiles are available for discovery to users of the data distribution platform. Users are able to discover the marketing data available from multiple content providers across the globe. The consumers are able to filter and sort through the marketing data packages as desired.

At block 4, the data consumers request the data in which the data consumers are interested. A data consumer may, optionally, read through the information and view the supporting material of videos and documents to understand the data better before requesting the high fidelity data package (s). Optionally, the request is sent for approval within the company.

At block 5, the request is processed by an administrator within the company. If the company has the subscription, the approver has the ability to approve the subscription. If the company does not have a subscription, the company (the data consumer) contacts the content provider for further discussions.

At block 6, optionally, the administrator contacts the content provider to negotiate and finalize the agreement. End users can contact the content providers from the data distribution platform to initiate the discussion by sending a request with a message to provide any additional information. A content provider receives the request and acknowledges the request with a message. The content provider contacts the requestor and provides any desired information about data and negotiates terms for sale of data packages. Upon agreement, both the parties sign legal documents (data specific contracts) to proceed with data delivery. The documents may be uploaded in the system.

At block 7, once the agreement is reached, a content provider creates a subscription on the data distribution platform. The subscription enables the access to data via entitlements that enforce a subscription level. Upon creation of the subscription, the data package is available to the customer company as a subscription.

At block 8, the data consumer organization receives the subscription and can assign or approve users to access data. Once the subscription is available to the customer organization, the approver is able to grant subscriptions to users within the company by either approving their request or assigning the subscription on their own. Upon granting a user access to a subscription, the user is able to consume data in workflows used by the users.

Thus, for example, the content provider starts on a vendor-owned cloud based data environment with full access to vendor data. The vendor data is loaded into the data environment of the content vendor.

The data distribution platform permits the vendor to create a data offering as a data package with a minimum of information: name, contents, price, and marketing details: text, images, videos, documents, map marketing shapes. The contents selected in the package define the data that are shared with the consumer when a subscription is created.

When a data package is created, the data distribution platform might not make a copy of the contents, but rather may create a reference from the parent data package. Thus, the same content can be made present in different data offerings based on target client size, market environment, etc.

For example, a content vendor creates a data offering for the State of Texas in the United States of America to serve a small customer looking in the specific region. However, a content vendor may also create a data offering covering the United States of America for another, large size customer market.

As another example, a vendor creates a time based data offering for an upcoming license round. The vendor uses the data distribution platform to combine specific data items at a specific price. Once the license round is finished, the vendor can take the marketing data package off the data distribution platform. In any case, no data is replicated in the system, thereby permitting content providers to manage one, latest version of the high fidelity data package.

Once the data package is created and published, the data is available for discovery in their data environments with the details (overview with text, image, documents, videos, map image) and an ability to request the data package. Later, if the package is not desired, the data package can be revoked from the data distribution platform or deleted without making changes to the underlying data.

Attention is turned to FIG. 6.2. FIG. 6.2 shows a different, high-level component view of the data distribution platform. The data distribution platform (601) brings the data vendors (603) and consumers (605) closer using the services provided by the data distribution platform (601) that are specifically oriented towards them. Users are given personalized and context specific features, based on user profiles.

The data distribution platform provides a way to scan the vendor data packages (607) just enough to give a marketing representation (609) without replicating the full dataset. The data distribution platform mechanism is also further utilized to create multiple packages with different criteria, subsets, and price models. The data distribution platform therefore permits the data vendor (603) to fine tune what is published for sale, and permit the consumer to view enough features and subsets that will help the consumer make an informed decision to purchase the data. Such a design grants the user the ability to create, manage and utilize content to scale and permit the data to grow organically. Data tenants (611) are used to enforce security so that the data distribution platform prevents the consumer (605) from accessing the vendor data packages (607) at more than an agreed upon subscription level.

FIG. 6.3 shows a deployment view representation (613) of the data distribution platform. A cloud-hosted marketplace server (615) acts as a data repository for the data distribution platform. A marketplace application (617) faces data consumers. Second and third party applications (619) that consume the data packages can be used with a marketplace widget (621) within the Second and third party applications (619) to discover the data packages.

The marketplace application (617) provides a high fidelity and rich experience of the features of the data distribution platform. The marketplace application (617) renders and personalizes the user experience based on a user profile, whether data vendor, data consumer, and or an administrator of the data distribution platform.

The marketplace widget (621) may be referred to as an embedded mode for the data distribution platform. The marketplace widget (621) is a miniature version of the data distribution platform that is instantiated inside a second or third-party domain application (619). The marketplace widget (621) permits the data distribution platform to be omnipresent and be the tool of choice by data consumers to explore data that is available, purchased, or both.

FIG. 6.4 is an example screenshot a user may see when logging into the data distribution platform. The screenshot (623) contains widgets for interacting with the data distribution platform. For example, new data package widget (625) permits a vendor to manage data packages and data subscriptions. Profiles may be managed with profile widget (627). Packages may be listed in window (629). Published marketing data packages are shown in window (631).

FIG. 6.5 is an example screenshot a user may see when defining a data package. The screenshot (633) shows information describing a test package (635), which may be a high fidelity data package. Various information about the data package is shown, including a description of contents (637), a package profile (639), a price scheme (641), and a marketing representation (643) of the data package.

FIG. 6.6 and FIG. 6.7 shows screenshots related to a consumer selecting content. FIG. 6.6 shows screenshot (645) which displays a map (647) of a region of the Earth. Layers of information in control window (649) may be selected to show more or fewer details, such as fields, platforms, seismic surveys, etc.

FIG. 6.7 shows a changed screen after selection of content in FIG. 6.6. Screenshot (651) shows selected content (653) based on a search performed in search bar (655). The map (657) shows various fields and wells.

FIG. 6.8 shows a screenshot (659) of a user using the data distribution platform to perform filtering and selection of available marketing data packages associated with the fields and wells shown in the map (657) of FIG. 6.7. The contents (661) of the categories is shown, as are summaries of seismic surveys in the map areas, as shown in window (663). Highlighting is used to show the selected contents (665) to be displayed in the window (663).

FIG. 6.9 shows a screenshot (667) of how a vendor that uses the data distribution platform can set marketing details, such as a description of package details, features and contents, supporting documents, videos, and price. Overlapping windows, such as window (669), window (671), and window (673) are used to present a window with interactive widgets and inputs so that the vendor can enter the information shown. The content provider can also provide additional tags for the data distribution platform for better discovery of the resulting marketing data package. The content provider can also identify particular workflows, data analysis programs, and E&P applications where the data can be consumed. The data distribution platform can then filter the information to create a marketing data package with the tags.

FIG. 6.10 shows how a vendor user of the data distribution platform can define a marketing image and previews of the offering. Thus, the screenshot (675) shows an example of a marketing data package. Thus, for example, the marketing data package shown in FIG. 8J shows a map (677) showing well site locations (695) for which the vendor has geological surveys.

FIG. 6.11 shows another example of a marketing data package. The screenshot (679) shows a map (681), a list of data items offered (683), and summaries of high fidelity data packages (693) that correspond to the marketing data package.

The content provider can create multiple offerings with the same data based on their customers and market and publish concurrently. The offerings are available to the customers, who can select and request subscriptions, at various different subscription levels, to the high fidelity data packages based as desired.

FIG. 6.12 shows a screenshot (685) of what a data consumer might see while using a workflow. A map (687) generated by the workflow shows potential well sites being explored by the data consumer, such as potential well site (689). The user may engage a widget (691) to engage category filters to see data that is available in the data distribution platform that may be of interest to the data consumer.

When the content providers have published data offerings, the marketing data is available to customers across the globe. The consumer in FIG. 6.12 is working in the consumer's own data environment (e.g., the first remote computing system) with a consumer data package.

Today, in the industry, customers have to visit different websites from different content providers to identify what data is available in the market, and then the consumer can request data from the different vendor data environments. While searching for data in this manner, the consumer cannot see the data from marketplace in the context of the consumer's pre-entitled consumer data package. Thus, the consumer cannot make a comparison between the available data offering and the pre-entitled consumer data package in order to make an informed decision.

The data distribution platform of the one or more embodiments addresses the above-described challenge by permitting consumers to switch on the marketplace directly from a local current workflows connected to the local data environment (e.g., the first remote computing system). Thus, using the data distribution platform of the one or more embodiments, a consumer sees the data available in marketplace in juxtaposition to the pre-entitled consumer data package, together with any vendor data to which the consumer is already subscribed. Thus, an explorationist may have improved information on areas of interest, with available data in one place from different locations on the Earth. The explorationist can identify what data is missing and can order the data accordingly from within the consumer's own data processing system.

The marketplace data from the content providers across the globe is both available from the marketplace application, and can be accessed directly from any other application available for execution on the data distribution platform. Thus, the customers can access the marketplace from any available workflows, data analysis program, or E&P application. Accordingly, if a user is working in a field development planning application, the data distribution platform has the connectors and application programming interfaces for the applications to connect with the data distribution platform. In this manner, a field development planning user can look for field development assets in the data distribution platform from within the application, in the context of their workflow and the type of the data sought.

FIG. 6.13 through FIG. 6.16 provide additional details regarding the operation of the data distribution platform. Attention is first turned to FIG. 6.13.

Before a data content provider creates a data package, the data is ingested in a content provider tenant A tenant enforces a physical separation of the data between different data content providers. The steps involved in the data ingestions may include the following steps shown in FIG. 6.13.

Before a data content provider starts ingesting data, the content provider requests access to the system and provisions a tenant, as shown at "1" in FIG. 6.13. Once access is granted, the data vendor uses a UI or an API of a data services program by requesting an authentication token, as shown at "2" in FIG. 6.13.

The data services provides a set of APIs for the data vendor to ingest data in the tenant established for that data vendor, as shown at "3" in FIG. 6.13. The data service also validates user authentication and authorization. In the ingestion process, the data is stored in data service storage, with proper authorization, as also shown at "3" in FIG. 6.13.

After ingestion, the event is published to a control plane global information service (GIS), as shown at "4" in FIG. 6.13. Upon receiving the event, the GIS service creates index of GIS information associated with data in the map server, as shown at "5" in FIG. 6.13. The Map Server is used to display data in the map.

Attention is turned to FIG. 6.14. FIG. 6.14 shows an example of data package creation, marketing data sharing, and discovery workflows in the data distribution platform of the one or more embodiments.

A data tenant provides the data content provider and data consumer a secure environment in which to store E&P Data. A tenant includes a data storage (to store E&P Data) and a Map-Server (to visualize the GIS representation of the data in the map).

A marketplace UI provides a user interface for the content provider to accomplish workflows, such as data package creation, publishing of marketing data, subscription creation, etc. A control plane provides services around cross-cutting concerns such as authentication, authorization, GIS data discovery, role management, user management, etc.

A data marketplace sub-system provides APIs to accomplish the workflows performed by the content provider. The data marketplace also provides operational stores to persist the data package and marketing data. The map-server component of data marketplace stores GIS information related to the marketing data.

A map-server provides APIs to read and query GIS data. When E&P data is ingested in the vendor tenant, GIS information associated with the data is extracted and indexed into the map-server. The map-server stores GIS data in the memory (for faster access) as well as in the data repository.

Data services provides APIs for ingestion and the management of the content provider data. Data services also provides APIs to index the data (based on the desired attributes) to make data searchable.

A data consumer application is a GIS-based UI application. The data consumer application permits the consumer to visualize E&P data on the map.

With the above definitions, attention is turned to data package creation. First, the data vendor logs in to the marketplace application by providing username, password, and/or other security credentials (biometric information, captcha challenges, etc.). The control plane's authentication service validates user authentication and returns user token, as shown at "1" in FIG. 6.14.

Then, the data marketplace backend service validates the user token, as shown at "2" in FIG. 6.14. Validation is performed before permitting a call to the backend APIs.

The data marketplace backend service calls the control plane's GIS service, as shown at "3" in FIG. 6.14. Calling the GIS service enables the backend service to know details of the map server deployment and to acquire the map server token by passing a valid user token.

The data marketplace UI reads data from the vendor map server and passes identifiers of packaged data to the data marketplace service, as shown at "4" in FIG. 6.14. The data marketplace backend service persists, in a database, the identifiers associated with the data package, as shown at "5" in FIG. 6.14. The data marketplace backend service then creates an entitlement role (e.g., an access control list), which can be assigned to users later, as shown at "6" in FIG. 6.14.

Attention is now turned to FIG. 6.15. FIG. 6.15 shows an example of marketing content creation and publication. Initially, the content provider ingests E&P data in that content provider's tenant Ingestion is performed using APIs provided by the data services.

As shown at "1" in FIG. 6.15, the content provider logs in to he data marketplace UI application. The login is performed by providing a username, password, and/or other security credentials (biometric information, captcha challenges, etc.). The control plane's authentication service validates the user authentication and returns user token.

As shown at "2" in FIG. 6.15, the data marketplace backend service validates validate user token. Validation is performed before permitting a call to the backend APIs.

As shown at "3" in FIG. 6.15, the data content provider is assigned a proper role to create the marketing data package. The role is set up at the time of tenant provisioning and users are assigned to the role. The data marketplace backend service validates the user role by calling a role management service.

As shown at "4" in FIG. 6.15, the data marketplace backend service calls the control plane's GIS service to know details of the map-server deployment. The call may also be used to acquire a map-server token by passing a valid user token.

As shown at "5" in FIG. 6.15, the content provider creates a low fidelity version of data offering (i.e., the marketing data package) by applying filtering based on the attributes or geospatial query. The data is read from the content provider map-server.

As shown at "6" in FIG. 6.15, once the content provider finalizes the marketing data, the marketing data package is stored in the data marketplace sub-system operational store. Then, the marketing data package is published to the data marketplace map-server using an API provided by the map-server.

As shown at "7" in FIG. 6.15, the data consumer logs into the GIS-based UI application. The login is accomplished by providing a username, password, and/or other security credentials (biometric information, captcha challenges, etc.). The control plane's authentication service validates user authentication and returns a user token.

As shown at "8" in FIG. 6.15, the data consumer UI application calls the control plane's GIS service to obtain details of the data marketplace map-server deployment. The UI application also acquires map-server tokens by passing valid user tokens.

As shown at "9" in FIG. 6.15, the data consumer UI application displays its data. The UI application may display data by passing the map-server token.

As shown at "10" in FIG. 6.15, the data consumer UI application displays marketing data by connecting to data marketplace map data. The consumer application has a read-only access privilege.

FIG. 6.16 shows an example of a subscription creation. The subscription creation is performed by the data distribution platform.

As shown at "1" in FIG. 6.16, the data content provider logs in to the data marketplace UI application. The login is performed by providing a username, password, and/or other security credentials (biometric information, captcha challenges, etc.). The control plane's authentication service validates the user authentication and returns a user token.

As shown at "2" in FIG. 6.16, the data marketplace backend service validates validate the user token. Validation is performed before permitting a call to the backend APIs.

As shown at "3" in FIG. 6.16, the data content provider is assigned a role to create the marketing data. The role is set up at the time of tenant provisioning, and users are assigned to the role. The data marketplace backend service validates the user role by calling a role management service.

As shown at "4" in FIG. 6.16, the content provider creates a data subscription for a consumer organization. The marketplace backend service updates an access control list of the data record to include a new viewer role by using the APIs of the data services.

As shown at "5" in FIG. 6.16, the data consumer logs into the marketplace UI application. The data consumer logs in by providing a username, password, and/or other security credentials (biometric information, captcha challenges, etc.). The control plane's authentication service validates the user authentication and returns a user token.

As shown at "6" in FIG. 6.16, the data consumer sees the data subscription. The data consumer assigns a particular user identifier to the subscription.

As shown at "7" in FIG. 6.16, the data marketplace backend service adds users to the data access control list. Adding the users to the access control list grants, to the users in the access control list, access to the data.

In addition to the other variations described above, the one or more embodiments provide security at multiple levels.

At a first level, user authentication is used for the applications and the data distribution platform. Users are authenticated using the authentication credentials to login into the data environment.

At a second level, marketing data is made read-only. The consumer application has read-only access privileges to the marketing data. As marketing data is public, any data distribution platform user with a valid user token can visualize the marketing data (read-only operation).

At a third level, write access of marketing data is restricted. Write access of the marketing data is controlled by the marketplace backend service. The write access token is secured by cryptography keys controlled by the data vendor.

At a fourth level, entitlements are placed on the data. The content providers can read their own data while creating marketing data. The content provider data is protected by a role-based access control list. Thus, users with an owner role can modify or read the high fidelity data packages. Furthermore, the data marketplace APIs are also protected based on the assigned role.

Still other variations are possible. Thus, the one or more embodiments are not necessarily limited by the techniques and screenshots shown with respect to FIG. 6.1 through FIG. 6.16.

Attention is now turned to FIG. 7.1 and FIG. 7.2, which show examples of a data distribution platform in use, in accordance with one or more embodiments. In particular, FIG. 7.1 and FIG. 7.2 show in-use examples of both the system of FIG. 2 and the methods of FIG. 3.1 through FIG. 5.2, in the context of the exploration and production system shown in FIG. 1. Still more particularly, FIG. 7.1 and FIG. 7.2 show examples of content packaging and treatment on a data distribution platform, in accordance with one or more embodiments.

As shown at "1" in FIG. 7.1, a content provider identifies marketing data. The content provider has an individual data environment where the vendor data packages (i.e., high fidelity data packages) reside. The content provider does not want to expose the full data without consumers having paid for the full data.

Using the one or more embodiments, the content provider can identify the marketing data to expose using the high fidelity data package, as described above. The resulting marketing data packages can be made available as teasers. The data distribution platform provides a discovery mechanism for customers to find the marketing data packages, and request full data accordingly. The marketing data can be metadata with selected attributes, low fidelity data, or any information that a content provider decides to expose to the data distribution platform for discovery.

As shown at "2" in FIG. 7.1, the content provider publishes marketing data. The content provider publishes the marketing data when ready. Publishing pushes the data into a central marketing environment, which makes the marketing data packages available for discovery by consumers.

As shown at "3" in FIG. 7.1, a centralized marketing environment securely keeps the marketing data. Thus, accessing, updating, deleting, or changing the marketing data packages is restricted to the owning content providers, except to the degree permitted by the content providers.

As shown at "4" in FIG. 7.1, data is organized by their types in a central marketing environment. The organization improves the discoverability of the marketing data packages for the consumers. For example, a customer that is interested in a basin may view marketing data packages relating to wells available in the basin.

As shown at "5" in FIG. 7.1, consumers may combine, by type, marketing packages during consumption. For example, a consumer may desire to access marketing data packages at a first remote computing system via the data distribution platform, but perform the access in the context of pre-entitled consumer data packages. Comparing the data offerings to the pre-entitled consumer data package enables the consumer to assess the value of the high fidelity data packages. Thus, for a given data type, marketing data may be combined with consumer data to make available data in context.

As shown at "6" in FIG. 7.1, marketing data is made available for discovery. Consumers are able to discover the data coming from the central marketing data environment without making a copy to their own data environment. (However, in some cases, a vendor may arrange to transfer purchased data to the consumer data processing system.) Consumers can filter marketing data from their own data, if desired, from their own computing systems external to the central marketing environment.

FIG. 7.2 shows a component diagram showing security aspects of the one or more embodiments. FIG. 7.2 shows data tenant access boundaries for the vendor and the consumer. The data tenants provide the data content provider and the data consumer a secure environment to store E&P Data. Access to the data is tightly governed by control planes that face the respective external remote computing systems. Thus, a vendor control plane (700) is provided for the data vendors, a consumer control plane (702) is provided for the data consumers, and an administrator control plane (705) is provided for administrators of the data distribution platform to control the data distribution platform. The control planes handle user authentication and access to various functions of the data distribution platform.

The system shown in FIG. 7.2 also includes vendor oriented services (704). The vendor oriented services (704) are service that are tailored for the vendor. The vendor oriented services (704) include a package management service (706). The packet management service configures data packages, uploads new content, customizes views of data packages, and may provide a subset of data that is available for purchase. The vendor oriented services (704) also include entitlement configurations (708). The entitlement configurations (708) are used to configure policies, grant or approve purchase requests, set expiry dates, and pricing.

The vendor oriented services (704) also includes discovery or search services (710). The discovery or search services (710) provide a toolset to search and view data in the registry.

The system shown in FIG. 7.2 also includes consumer oriented services (712). The consumer oriented services (712) are services that are used by the data consumer.

The consumer oriented services (712) include package management services (714). The package management services (714) is used to preview packages, terms and conditions, to raise a request, and see the list of entitled packages.

The consumer oriented services (712) also include discovery or search services (716). The discovery or search services (716) include a toolset to search and view data in the registry.

The consumer oriented services (712) also includes data delivery services (718). The data delivery services (718) includes endpoint services to provide exclusive and time-bound access to the underlying data.

The system shown in FIG. 7.2 also includes platform services (720). The platform services (720) form the core of the data distribution platform. The platform services (720) hosts the vendor oriented services (704) and the consumer oriented services (712), in addition to providing administrative functions to manage the data distribution platform. The platform services (720) includes services such as vendor or consumer setup services (722), preview or discovery services (724), map or GIS encoder services (726), and entitlement services (728). The functions of these services are described with respect to FIG. 2 through FIG. 5.2. The platform services (720) may also store a package registry (730) and a map store (732).

The system shown in FIG. 7.2 also includes a system control plane (734). The system control plane (734) provides services with respect to cross-cutting concerns such as authentication, authorization, GIS data discovery, role management, user management, etc. The system control plane (734) interacts with other aspects of the system shown in FIG. 7.2 via the use of APIs, which output privileged access tokens.

Using the system shown in FIG. 7.2, data is bound within the vendor or consumer context. Data is restricted from being exposed or copied outside of the data distribution platform, unless explicitly authorized by the data vendor or (with the permission of the data vendor) the administrator. The marketing data packages are extracted from the vendor-owned high fidelity data packages by the vendor using the vendor oriented services (704). The marketing data packages are then available on the data distribution platform. The marketing data packages act as advertisers of the high fidelity data packages.

In summary, the data distribution platform enables discovery of data that is outside of a consumer's own realm in a dynamic and automated way. Upon purchase and entitlements, a conduit is generated to fetch data for the consumer. The conduit may be through a secure representational state transfer (REST) API endpoint, may be timebound, and is unique to a data subscription.

The data distribution platform provides multiple layers of security and abstraction, as the request for data is routed through the control plane and platform services. The platform services evaluate and validate the requests in a dynamic manner Access is privileged and time-bound. Various factors such as ownership labels, entitlements, and company or group policies can be dynamically configured to grant or revoke access through the data distribution platform.

Attention is now turned to FIG. 8.1 through FIG. 8.6. FIG. 8.1 through FIG. 8.6 show examples of a data distribution platform in use, in accordance with one or more embodiments. In particular, FIG. 8.1 through FIG. 8.6 show in-use examples of both the system of FIG. 2 and the methods of FIG. 3.1 through FIG. 5.2, in the context of the exploration and production system shown in FIG. 1. Still more particularly, FIG. 8.1 through FIG. 8.6 show examples of a security system for delivering secure access to data packages on a data distribution platform, in accordance with one or more embodiments.

FIG. 8.1 shows an example of granting subscriptions from content providers to data consumers. As shown at "1" in FIG. 8.1, content provider data packages are packaged in multiple groupings based on their business models and customer agreements. For example, the content provider "CP1" has well data across the globe and has created 3 packages: i) "US Wells" with the well data in the United States, ii) "Global Wells Package" with wells in the United States as well as international wells, and iii) "International Wells" with non-United States wells. In this example, the shown arrangement of data packages is the content provider desires to sell well data to their various customers.

As shown at "2" in FIG. 8.1, a subscription is created to generate access points for a given data package. The access point enables the users assigned to the subscription to access the data from a corresponding package to which a subscription has been acquired. If a user is added to the package, the user will be able to access the well data from that package.

In the example shown, there are two oil companies: "OC1" and "OC2" with different sets of users in their respective companies. When a content provider creates a subscription for "OC1," an access point is generated which permits "OC1" to access data packages with United States wells. Another subscription is created for "OC2" so the OC2 users also can access the data package with United States wells. However, since no subscription is created for the international package, neither OC1 nor OC2 can access the international package.

The arrangement shown enables the content provider to also revoke the subscription when the subscription is expired. The content provider may also restrict how many users can be added to the access point by simply disconnecting the access point for the subscription.

As shown at "3" in FIG. 8.1, once the subscription is created, the users can be added to the subscription to grant access to data in the package. The user information remains with the content provider, in this example, and hence the content provider can control who will use the data. Additionally, the content provider can control how many users can be added to an access point by restricting the number of users, while creating the subscription as agreed between the parties. Once the user is added to a subscription, the user will be able to access the data from the content provider data environment.

In the example of FIG. 8.1, no data is copied to the consumer data environment. The high fidelity data package remains in content provider's data environment. A controlled access is established between the provider and consumer that prevents downloading or viewing of the data, except as permitted by the data provider.

The consumers who have access are able to access the data across the data environment for the subscribed package. In the example, the "user3" from "OC1" does not have a subscription, so the user will not be able to access data from the content provider. However, "user4" from "OC2" has access to both the data packages (the US wells and the International Wells) from the content provider. Thus, "user4" can access both the US wells data and the International well data from content provider "CP1."

Because the high fidelity data package remains in the content provider's data environment, any updates to the data can be directly made to the data. As a result, the users automatically have access to the new data in the package as the new data becomes available.

Similarly, if any new data is added to any of the packages, users will immediately have access to new data as the entitlements is granted at the data package level. New material added to the package automatically will be accessible to the subscribed users and available for immediate use. For example, if there are new United States wells in the content provider's data environment, the content provider can simply add the new wells to the selected high fidelity data packages. The subscribed users from both companies "OC1" and "OC2" will then have immediate access to the new data.

Attention is now turned to FIG. 8.2. FIG. 8.2 shows another example of sharing data between data environments without copying data or using more than one copy of data.

As described above, customers and content providers have their own data environments with pre-entitled data. When the content provider creates a subscription, the data access to the customer is provided without making any copies into customer environment. Thus, the customers receive access to evergreen data without making and managing multiple copies. FIG. 8.2 highlights how the data is shared between the different data environments without making any copies into customer environment, or otherwise exposing the data without explicit vendor authorization.

As shown at "1" in FIG. 8.2, a vendor registers high fidelity data packages inside the second remote computing system. In this example, the high fidelity data packages include seismic and bulk data.

As shown at "2" in FIG. 8.2, map and GIS representations of the data are extracted and pushed into an Xchange service sub-system.

As shown at "3" in FIG. 8.2, the vendor previews the data, along with the map. The vendor also assess data that is relevant for a marketing data package.

As shown at "4" in FIG. 8.2, the vendor creates marketing data packages and stores the marketing data packages in the Xchange server system. Modifications to the GIS, if available, are also stored here.

As shown at "5" in FIG. 8.2, the marketing data packages are now discoverable by the consumer. A consumer requests access to one or more of the high fidelity data packages corresponding to the marketing data packages.

As shown at "6" in FIG. 8.2, once access is granted, the subscription and entitlement information is recorded.

As shown at "7" in FIG. 8.2, the data distribution platform now makes the high fidelity data packages available for use by exposing an exclusive and protected endpoint to the consumers.

As shown at "8" in FIG. 8.2, as a different workflow, the map data can also be exclusively made available and instantiated in a local computing environment of the consumer. The flows shown at "8A" and "8B" indicate such variations.

Attention is now turned to FIG. 8.3 through FIG. 8.6. FIG. 8.3 through FIG. 8.6 relate to a specific example of a content provider user workflow for establishing a data subscription to share a high fidelity data package.

FIG. 8.3 shows a screenshot (801) of beginning the process of creating a subscription. To create a subscription, the content provider creates a subscription by selecting the high fidelity data package and providing customer billing information, customer data environment information, and/or transaction information. The contentment provider also uploads contractual documents.

As shown in the screenshot (803) of FIG. 8.4, subscription term, company restrictions, and user restrictions may be entered. As shown in the screenshot (805) of FIG. 8.5, once created, subscriptions may be organized in one place in order to administrate the subscriptions efficiently. The screenshot (805) also shows that a subscription may be recorded for a specified number of users and a specified period of time.

Once the subscription is created, the process of creating the access points, setting up the access control list, and creating a group for the users to be added is handled internally by the system. Once the system completes the steps, the subscription becomes active for the consumer.

FIG. 8.6 shows a screenshot (807) of approval of a request for a subscription. Once approved by the data provider, an access point is created for the given user at the given subscription level, and the data consumer may use the data as agreed, in the manner described above with respect to FIG. 3.1 through FIG. 5.2.

FIG. 9.1 and FIG. 9.2 are examples of a computing system and a network, in accordance with one or more embodiments. The one or more embodiments may be implemented on a computing system specifically designed to achieve an improved technological result. When implemented in a computing system, the features and elements of the disclosure provide a significant technological advancement over computing systems that do not implement the features and elements of the disclosure. Any combination of mobile, desktop, server, router, switch, embedded device, or other types of hardware may be improved by including the features and elements described in the disclosure. For example, as shown in FIG. 9.1, the computing system (900) may include one or more computer processor(s) (902), non-persistent storage device(s) (904) (e.g., volatile memory, such as random access memory (RAM), cache memory), persistent storage device(s) (906) (e.g., a hard disk, an optical drive such as a compact disk (CD) drive or digital versatile disk (DVD) drive, a flash memory, etc.), a communication interface (908) (e.g., Bluetooth interface, infrared interface, network interface, optical interface, etc.), and numerous other elements and functionalities that implement the features and elements of the disclosure.

The computer processor(s) (902) may be an integrated circuit for processing instructions. For example, the computer processor(s) (902) may be one or more cores or micro-cores of a processor. The computing system (900) may also include one or more input device(s) (910), such as a touchscreen, a keyboard, a mouse, a microphone, a touchpad, an electronic pen, or any other type of input device.

The communication interface (908) may include an integrated circuit for connecting the computing system (900) to a network (not shown) (e.g., a local area network (LAN), a wide area network (WAN) such as the Internet, a mobile network, or any other type of network) and/or to another device, such as another computing device.

Further, the computing system (900) may include one or more output device(s) (912), such as a screen (e.g., a liquid crystal display (LCD), a plasma display, a touchscreen, a cathode ray tube (CRT) monitor, a projector, or other display device), a printer, an external storage, or any other output device. One or more of the output device(s) (912) may be the same or different from the input device(s) (910). The input and output device(s) (910 and 912) may be locally or remotely connected to the computer processor(s) (902), the non-persistent storage device(s) (904), and the persistent storage device(s) (906). Many different types of computing systems exist, and the aforementioned input and output device(s) (910 and 912) may take other forms.

Software instructions in the form of computer readable program code to perform the one or more embodiments may be stored, at least in part, temporarily or permanently, on a non-transitory computer readable medium such as a CD, a DVD, a storage device, a diskette, a tape, flash memory, physical memory, or any other computer readable storage medium. Specifically, the software instructions may correspond to computer readable program code that, when executed by a processor(s), is configured to perform the one or more embodiments.

The computing system (900) in FIG. 9.1 may be connected to or be a part of a network. For example, as shown in FIG. 9.2, the network (920) may include multiple nodes (e.g., node X (922), node Y (924)). A node may correspond to a computing system, such as the computing system (900) shown in FIG. 9.1, or a group of nodes combined may correspond to the computing system (900) shown in FIG. 9.1. By way of an example, the one or more embodiments may be implemented on a node of a distributed system that is connected to other nodes. By way of another example, the one or more embodiments may be implemented on a distributed computing system having multiple nodes, where portions of the one or more embodiments may be located on a different node within the distributed computing system. Further, one or more elements of the aforementioned computing system (900) may be located at a remote location and connected to the other elements over a network.

Although not shown in FIG. 9.2, the node may correspond to a blade in a server chassis that is connected to other nodes via a backplane. By way of another example, the node may correspond to a server in a data center. By way of another example, the node may correspond to a computer processor or micro-core of a computer processor with shared memory and/or resources.

The nodes (e.g., node X (922), node Y (924)) in the network (920) may be configured to provide services for a client device (926). For example, the nodes may be part of a cloud computing system. The nodes may include functionality to receive requests from the client device (926) and transmit responses to the client device (926). The client device (926) may be a computing system, such as the computing system (900) shown in FIG. 9.1. Further, the client device (926) may include and/or perform the one or more embodiments.

The computing system (900) or group of computing systems described in FIGS. 9.1 and 9B may include functionality to perform a variety of operations disclosed herein. For example, the computing system(s) may perform communication between processes on the same or different system. A variety of mechanisms, employing some form of active or passive communication, may facilitate the exchange of data between processes on the same device. Examples representative of these inter-process communications include, but are not limited to, the implementation of a file, a signal, a socket, a message queue, a pipeline, a semaphore, shared memory, message passing, and a memory-mapped file. Further details pertaining to a couple of these non-limiting examples are provided below.

Based on the client-server networking model, sockets may serve as interfaces or communication channel endpoints enabling bidirectional data transfer between processes on the same device. Foremost, following the client-server networking model, a server process (e.g., a process that provides data) may create a first socket object. Next, the server process binds the first socket object, thereby associating the first socket object with a unique name and/or address. After creating and binding the first socket object, the server process then waits and listens for incoming connection requests from one or more client processes (e.g., processes that seek data). At this point, when a client process wishes to obtain data from a server process, the client process starts by creating a second socket object. The client process then proceeds to generate a connection request that includes at least the second socket object and the unique name and/or address associated with the first socket object. The client process then transmits the connection request to the server process. Depending on availability, the server process may accept the connection request, establishing a communication channel with the client process, or the server process, busy in handling other operations, may queue the connection request in a buffer until server process is ready. An established connection informs the client process that communications may commence. In response, the client process may generate a data request specifying the data that the client process wishes to obtain. The data request is subsequently transmitted to the server process. Upon receiving the data request, the server process analyzes the request and gathers the requested data. Finally, the server process then generates a reply including at least the requested data and transmits the reply to the client process. The data may be transferred, more commonly, as datagrams or a stream of characters (e.g., bytes).

Shared memory refers to the allocation of virtual memory space in order to substantiate a mechanism for which data may be communicated and/or accessed by multiple processes. In implementing shared memory, an initializing process first creates a shareable segment in persistent or non-persistent storage. Post creation, the initializing process then mounts the shareable segment, subsequently mapping the shareable segment into the address space associated with the initializing process. Following the mounting, the initializing process proceeds to identify and grant access permission to one or more authorized processes that may also write and read data to and from the shareable segment. Changes made to the data in the shareable segment by one process may immediately affect other processes, which are also linked to the shareable segment. Further, when one of the authorized processes accesses the shareable segment, the shareable segment maps to the address space of that authorized process. Often, one authorized process may mount the shareable segment, other than the initializing process, at any given time.

Other techniques may be used to share data, such as the various data described in the present application, between processes without departing from the scope of the one or more embodiments. The processes may be part of the same or different application and may execute on the same or different computing system.

Rather than or in addition to sharing data between processes, the computing system performing the one or more embodiments may include functionality to receive data from a user. For example, in one or more embodiments, a user may submit data via a graphical user interface (GUI) on the user device. Data may be submitted via the graphical user interface by a user selecting one or more graphical user interface widgets or inserting text and other data into graphical user interface widgets using a touchpad, a keyboard, a mouse, or any other input device. In response to selecting a particular item, information regarding the particular item may be obtained from persistent or non-persistent storage by the computer processor. Upon selection of the item by the user, the contents of the obtained data regarding the particular item may be displayed on the user device in response to the user's selection.

By way of another example, a request to obtain data regarding the particular item may be sent to a server operatively connected to the user device through a network. For example, the user may select a uniform resource locator (URL) link within a web client of the user device, thereby initiating a Hypertext Transfer Protocol (HTTP) or other protocol request being sent to the network host associated with the URL. In response to the request, the server may extract the data regarding the particular selected item and send the data to the device that initiated the request. Once the user device has received the data regarding the particular item, the contents of the received data regarding the particular item may be displayed on the user device in response to the user's selection. Further to the above example, the data received from the server after selecting the URL link may provide a web page in Hyper Text Markup Language (HTML) that may be rendered by the web client and displayed on the user device.

Once data is obtained, such as by using techniques described above or from storage, the computing system, in performing one or more embodiments of the one or more embodiments, may extract one or more data items from the obtained data. For example, the extraction may be performed as follows by the computing system (900) in FIG. 9.1. First, the organizing pattern (e.g., grammar, schema, layout) of the data is determined, which may be based on one or more of the following: position (e.g., bit or column position, Nth token in a data stream, etc.), attribute (where the attribute is associated with one or more values), or a hierarchical/tree structure (consisting of layers of nodes at different levels of detail-such as in nested packet headers or nested document sections). Then, the raw, unprocessed stream of data symbols is parsed, in the context of the organizing pattern, into a stream (or layered structure) of tokens (where a token may have an associated token "type").

Next, extraction criteria are used to extract one or more data items from the token stream or structure, where the extraction criteria are processed according to the organizing pattern to extract one or more tokens (or nodes from a layered structure). For position-based data, the token(s) at the position(s) identified by the extraction criteria are extracted. For attribute/value-based data, the token(s) and/or node(s) associated with the attribute(s) satisfying the extraction criteria are extracted. For hierarchical/layered data, the token(s) associated with the node(s) matching the extraction criteria are extracted. The extraction criteria may be as simple as an identifier string or may be a query presented to a structured data repository (where the data repository may be organized according to a database schema or data format, such as eXtensible Markup Language (XML)).

The extracted data may be used for further processing by the computing system. For example, the computing system (900) of FIG. 9.1, while performing the one or more embodiments, may perform data comparison. Data comparison may be used to compare two or more data values (e.g., A, B). For example, one or more embodiments may determine whether A>B, A=B, A !=B, A<B, etc. The comparison may be performed by submitting A, B, and an opcode specifying an operation related to the comparison into an arithmetic logic unit (ALU) (i.e., circuitry that performs arithmetic and/or bitwise logical operations on the two data values). The ALU outputs the numerical result of the operation and/or one or more status flags related to the numerical result. For example, the status flags may indicate whether the numerical result is a positive number, a negative number, zero, etc. By selecting the proper opcode and then reading the numerical results and/or status flags, the comparison may be executed. For example, in order to determine if A>B, B may be subtracted from A (i.e., A−B), and the status flags may be read to determine if the result is positive (i.e., if A>B, then A−B>0). In one or more embodiments, B may be considered a threshold, and A is deemed to satisfy the threshold if A=B or if A>B, as determined using the ALU. In one or more embodiments, A and B may be vectors, and comparing A with B means comparing the first element of vector A with the first element of vector B, the second element of vector A with the second element of vector B, etc. In one or more embodiments, if A and B are strings, the binary values of the strings may be compared.

The computing system (900) in FIG. 9.1 may implement and/or be connected to a data repository. For example, one type of data repository is a database. A database is a collection of information configured for ease of data retrieval, modification, re-organization, and deletion. Database Management System (DBMS) is a software application that provides an interface for users to define, create, query, update, or administer databases.

The user, or software application, may submit a statement or query into the DBMS. Then the DBMS interprets the statement. The statement may be a select statement to request information, update statement, create statement, delete statement, etc. Moreover, the statement may include parameters that specify data, data containers (a database, a table, a record, a column, a view, etc.), identifiers, conditions (comparison operators), functions (e.g. join, full join, count, average, etc.), sorts (e.g. ascending, descending), or others. The DBMS may execute the statement. For example, the DBMS may access a memory buffer, a reference or index a file for read, write, deletion, or any combination thereof, for responding to the statement. The DBMS may load the data from persistent or non-persistent storage and perform computations to respond to the query. The DBMS may return the result(s) to the user or software application.

The computing system (900) of FIG. 9.1 may include functionality to present raw and/or processed data, such as results of comparisons and other processing. For example, presenting data may be accomplished through various presenting methods. Specifically, data may be presented through a user interface provided by a computing device. The user interface may include a GUI that displays information on a display device, such as a computer monitor or a touchscreen on a handheld computer device. The GUI may include various GUI widgets that organize what data is shown as well as how data is presented to a user. Furthermore, the GUI may present data directly to the user, e.g., data presented as actual data values through text, or rendered by the computing device into a visual representation of the data, such as through visualizing a data model.

For example, a GUI may first obtain a notification from a software application requesting that a particular data object be presented within the GUI. Next, the GUI may determine a data object type associated with the particular data object, e.g., by obtaining data from a data attribute within the data object that identifies the data object type. Then, the GUI may determine any rules designated for displaying that data object type, e.g., rules specified by a software framework for a data object class or according to any local parameters defined by the GUI for presenting that data object type. Finally, the GUI may obtain data values from the particular data object and render a visual representation of the data values within a display device according to the designated rules for that data object type.

Data may also be presented through various audio methods. In particular, data may be rendered into an audio format and presented as sound through one or more speakers operably connected to a computing device.

Data may also be presented to a user through haptic methods. For example, haptic methods may include vibrations or other physical signals generated by the computing system. For example, data may be presented to a user using a vibration generated by a handheld computer device with a predefined duration and intensity of the vibration to communicate the data.

The above description of functions presents a few examples of functions performed by the computing system (900) of FIG. 9.1 and the nodes (e.g., node X (922), node Y (924)) and/or client device (926) in FIG. 9.2. Other functions may be performed using one or more embodiments.

While the one or more embodiments have been described with respect to a limited number of embodiments, those skilled in the art, having benefit of this disclosure, will appreciate that other embodiments can be devised which do not depart from the scope of the one or more embodiments as disclosed herein. Accordingly, the scope of the one or more embodiments should be limited only by the attached claims.

What is claimed is:
1. A method comprising:
   receiving, at a data distribution platform, a subscription request by a first remote computing system to access a data package controlled by a second remote computing system, the data distribution platform interposed between the first remote computing system and the second remote computing system;

establishing, on the data distribution platform, (i) an access point comprising a secured portal accessible by the first remote computing system, wherein the access point is uniquely associated with the data package, and (ii) a second access point to a third remote computing system;

assigning, by the data distribution platform, a subscription level to the access point for the data package, wherein the second access point grants a different subscription level to the data package; and controlling, by the data distribution platform via the access point, access of the first remote computing system to the data package according to the subscription level, wherein the first remote computing system is accessed by a first user of a first entity, and wherein the third remote computing system is accessed by a second user of the first entity.

2. The method of claim 1, further comprising:
establishing a data market interface between a plurality of vendor computing systems of a plurality of data packages and a plurality of consumer computing systems of the plurality of data packages.

3. The method of claim 1, further comprising:
executing a data analysis application on the data distribution platform, and
wherein controlling comprises granting the first remote computing system authorization to view an output of a data analysis of the data package as performed by the data analysis application.

4. The method of claim 1, wherein controlling access comprises:
permitting the first remote computing system to order execution of a data analysis application on the second remote computing system, wherein the data analysis application outputs an output; and
permitting the first remote computing system to view the output via the access point, and wherein the first remote computing system is prevented from directly accessing the data package.

5. The method of claim 1, wherein controlling access comprises:
granting, to the first remote computing system via the access point, read-only access to the data package.

6. The method of claim 1, wherein controlling access comprises:
granting, to the first remote computing system via the access point, download access to the data package.

7. The method of claim 1, further comprising:
causing the first remote computing system to enter authentication information to open the access point.

8. The method of claim 1, further comprising:
denying access to the data package to the data distribution platform.

9. The method of claim 1, further comprising:
receiving an access control list comprising different user identifications of different users of the first remote computing system, and wherein controlling access comprises granting differing levels of access to the different users of the access control list.

10. The method of claim 1, further comprising:
receiving the data package at the data distribution platform; and
maintaining the data package on the data distribution platform.

11. A system comprising:
a server processor;
a communication link in communication with the server processor;
a data repository in communication with the server processor and storing:
a subscription request transmitted via the communication link from a first remote computing system,
an access grant for a data package controlled by a second remote computing system,
an access point comprising a secured portal accessible by the first remote computing system, wherein the access point is uniquely associated with the data package, and
a subscription level;
a data distribution platform interposed between the first remote computing system and the second remote computing system, the data distribution platform configured to:
receive the subscription request to access the data package;
establish, on the data distribution platform, the access point;
establish, on the data distribution platform, a second access point to a third remote computing system;
assign the subscription level to the access point for the data package, wherein the second access point grants a different subscription level to the data package; and
control, via the access point, access to the data package according to the subscription level and the access grant,
wherein the first remote computing system is accessible by a first user of a first entity, and
wherein the third remote computing system is accessible by a second user of the first entity.

12. The system of claim 11, wherein the data distribution platform further comprises:
a data market interface between a plurality of vendor computing systems of a plurality of data packages and a plurality of consumer computing systems of the plurality of data packages.

13. The system of claim 11, further comprising:
a data analysis application executable on the data distribution platform, and
wherein controlling access comprises granting the first remote computing system authorization to view an output of a data analysis of the data package as performed by the data analysis application.

14. The system of claim 11, wherein the access grant assigns the subscription level to the data package via the access point, but denies access to the data package by the data distribution platform.

15. The system of claim 11, wherein the access grant causes the data package to be stored on the data distribution platform.

16. The system of claim 11, wherein the data distribution platform is further configured to:
receive an access control list comprising different user identifications of different users of the first remote computing system, and wherein controlling access comprises granting differing levels of access to the different users of the access control list.

17. A method comprising:
receiving, at a data distribution platform, a subscription request by a first remote computing system to access a data package controlled by a second remote computing system, the data distribution platform interposed between the first remote computing system and the second remote computing system;

establishing, on the data distribution platform, (i) an access point comprising a secured portal accessible by the first remote computing system, wherein the access point is uniquely associated with the data package, and (ii) a second access point to a third remote computing system;

assigning, by the data distribution platform, a subscription level to the access point for the data package, wherein the second access point grants a different subscription level to the data package; and controlling, by the data distribution platform via the access point, access of the first remote computing system to the data package according to the subscription level, wherein the first remote computing system is accessed by a first user of a first entity, wherein the third remote computing system is accessed by a second user of a second entity, and wherein the second entity is different than the first entity.

18. The method of claim 17, further comprising:
establishing a data market interface between a plurality of vendor computing systems of a plurality of data packages and a plurality of consumer computing systems of the plurality of data packages.

19. The method of claim 17, further comprising:
receiving the data package at the data distribution platform; and
maintaining the data package on the data distribution platform.

20. The method of claim 17, wherein controlling access comprises:
granting, to the first remote computing system via the access point, read-only access to the data package.

* * * * *